April 19, 1938.　　　B. L. GREEN　　　2,114,294
MEANS FOR PREPARING A CONTROL RECORD
Filed Feb. 19, 1934　　　23 Sheets-Sheet 11

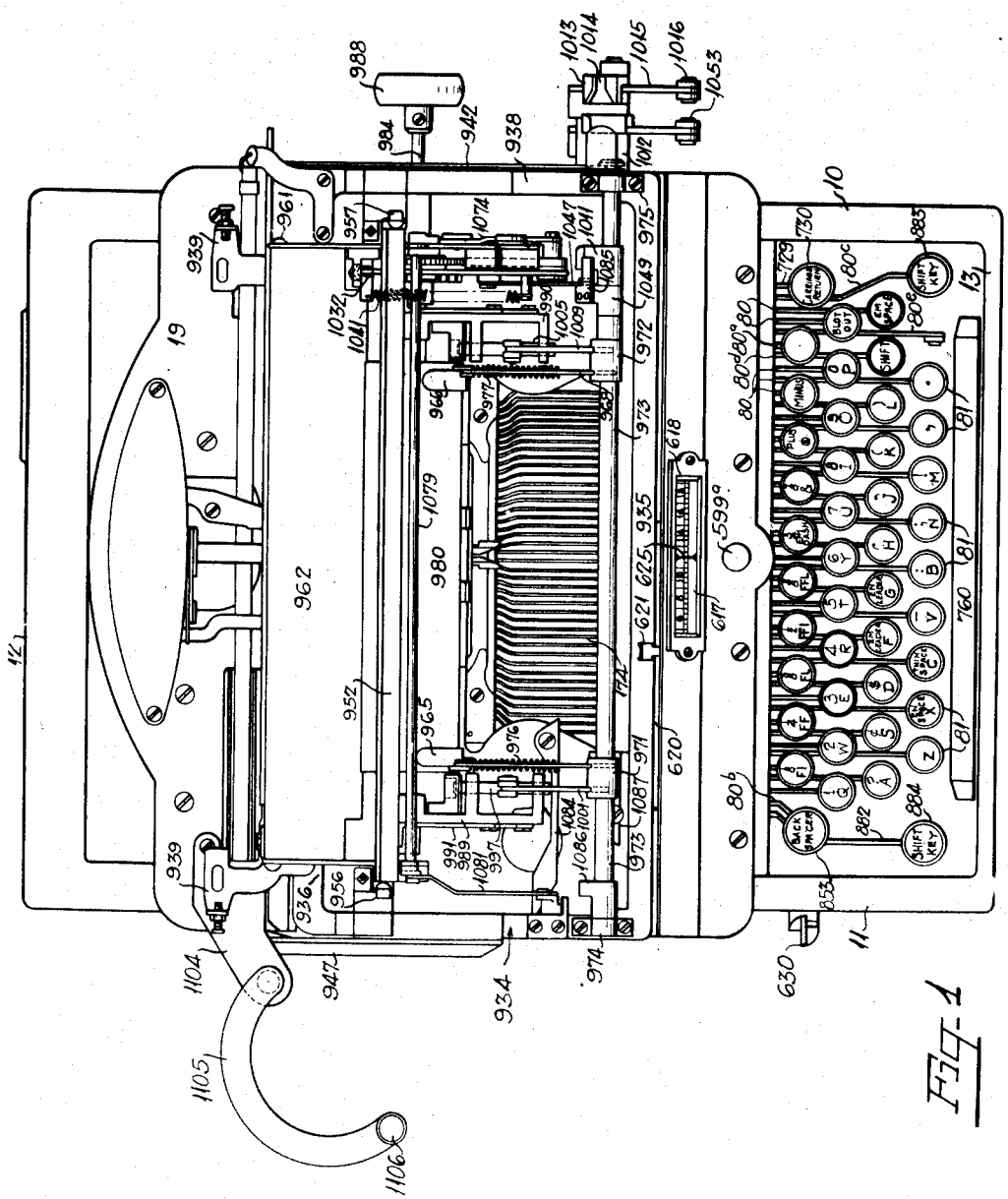

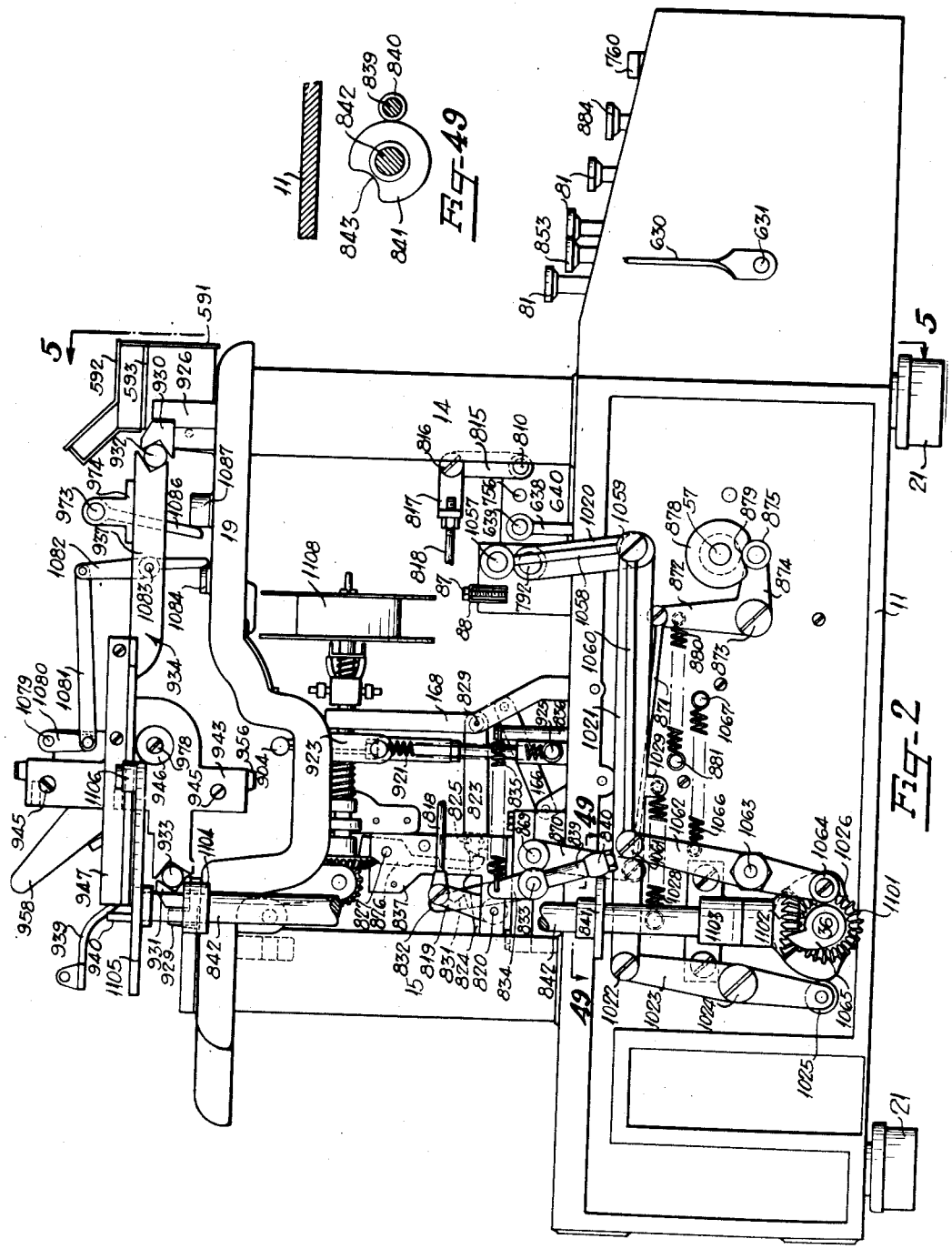

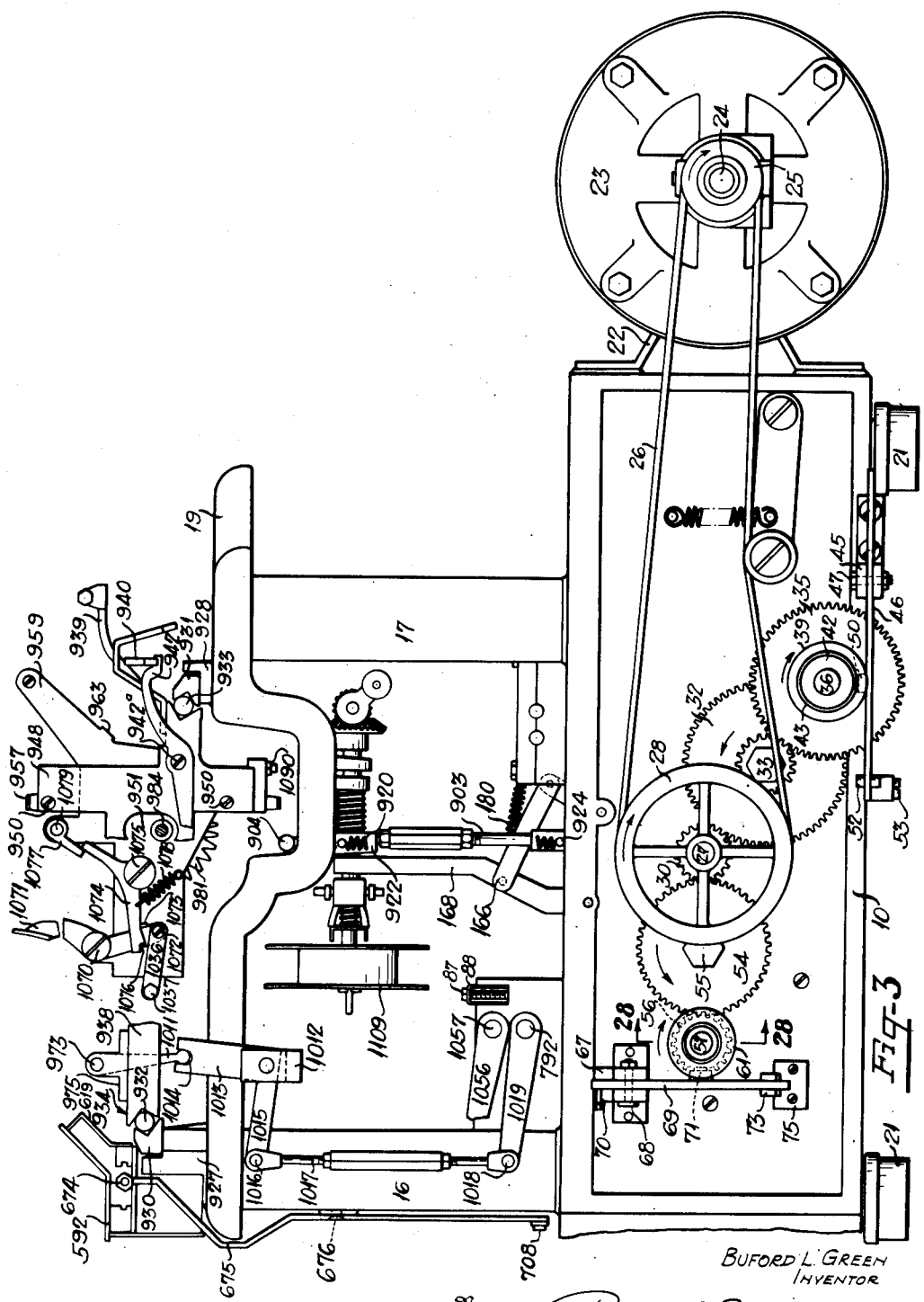

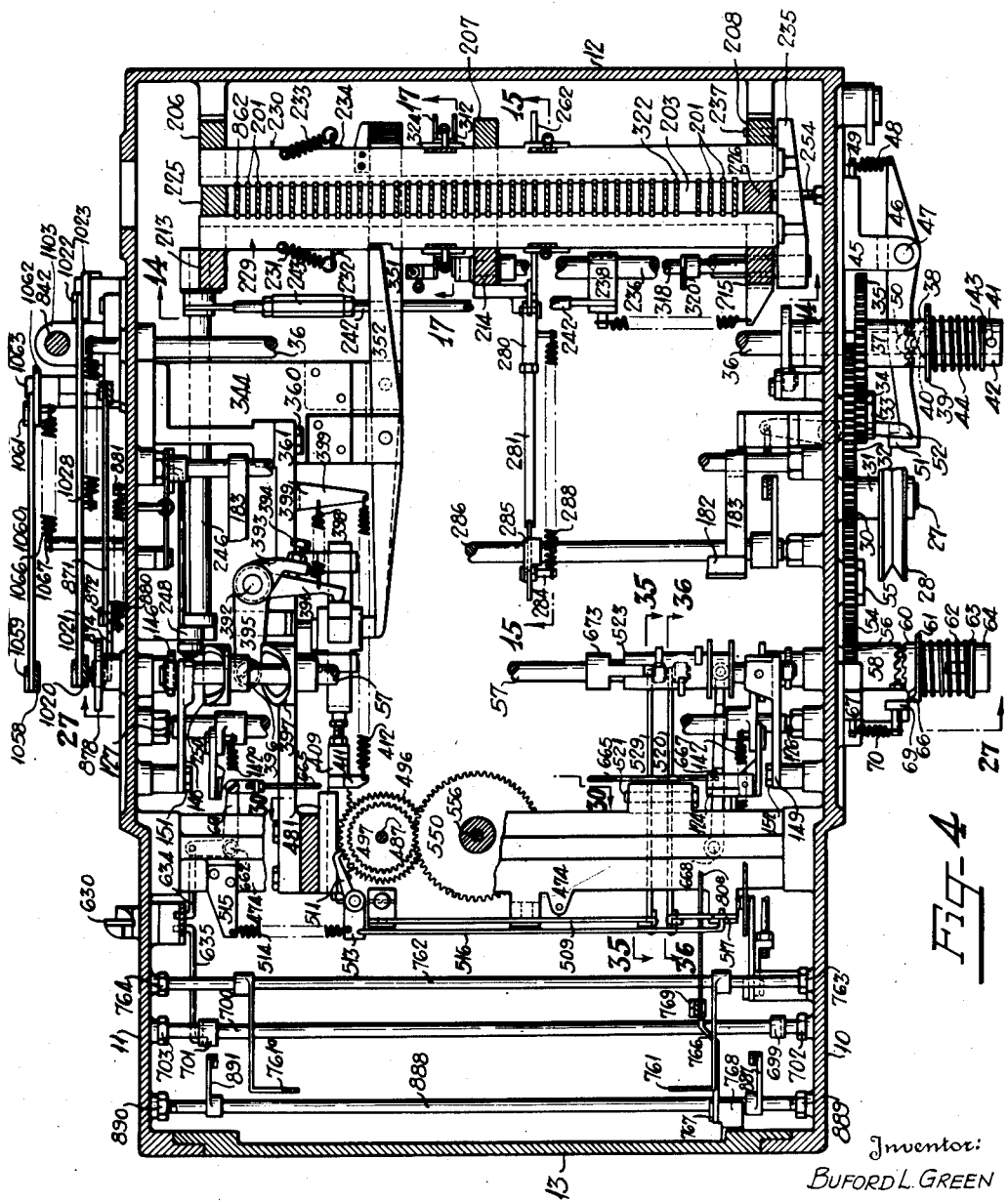

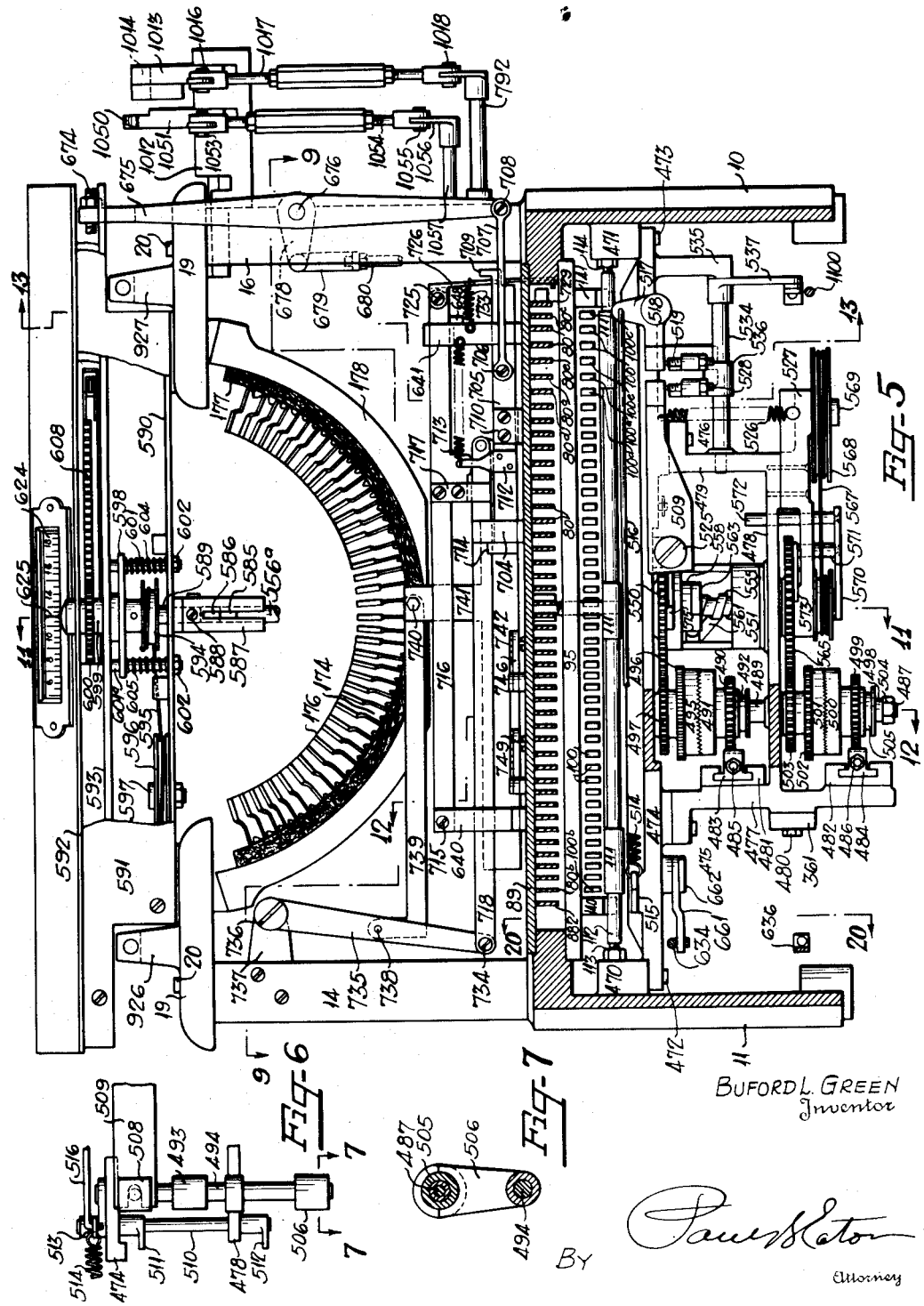

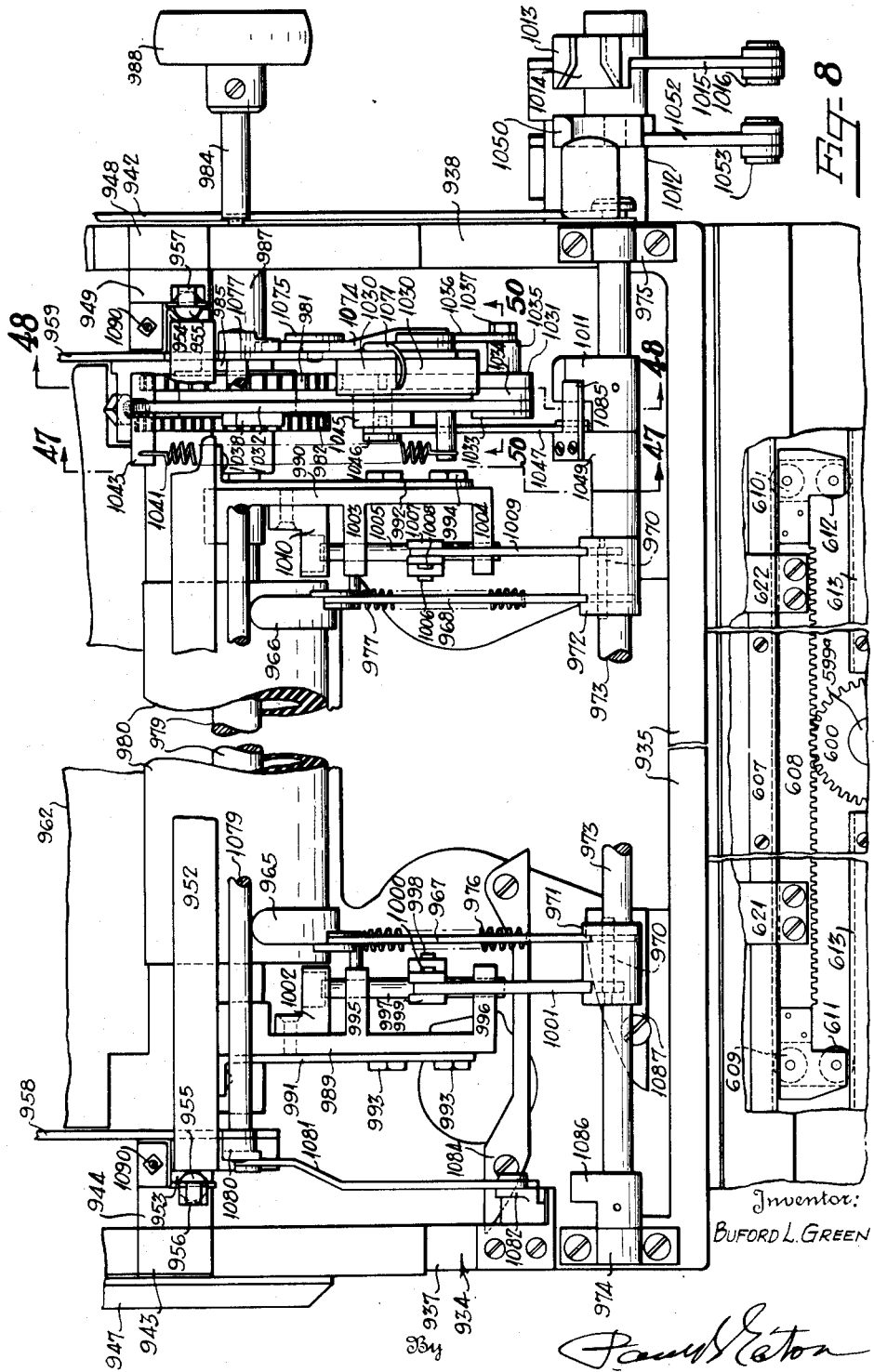

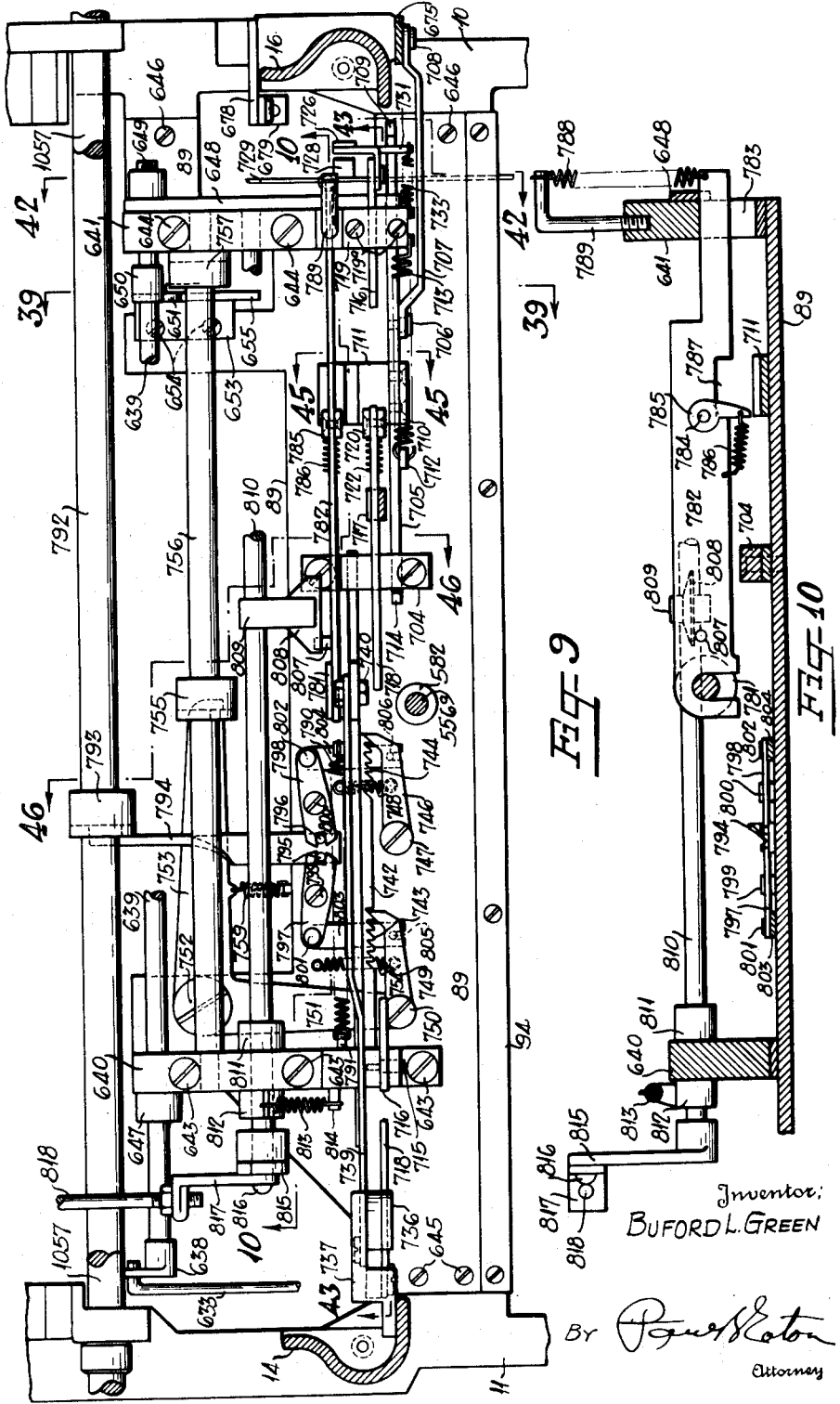

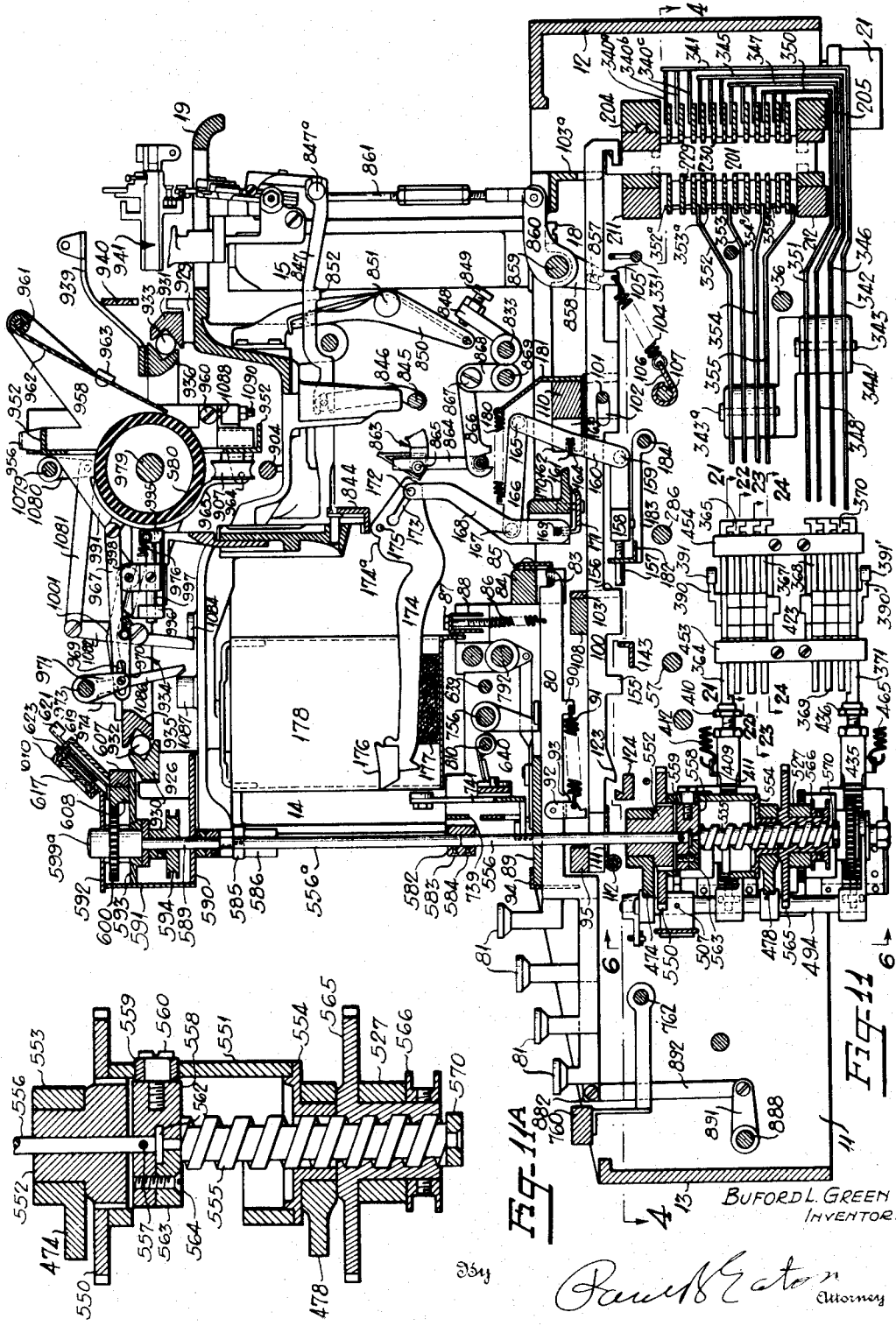

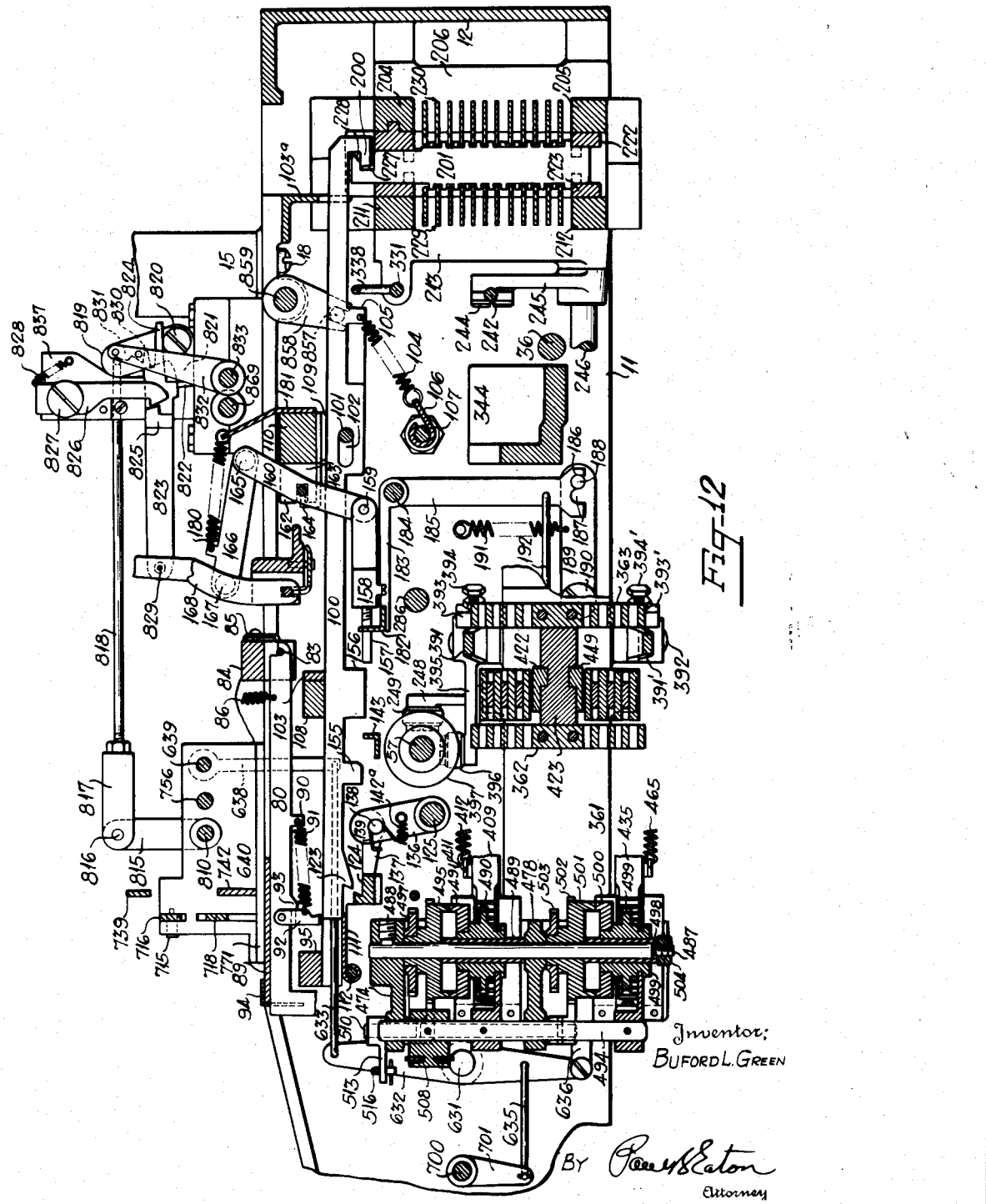

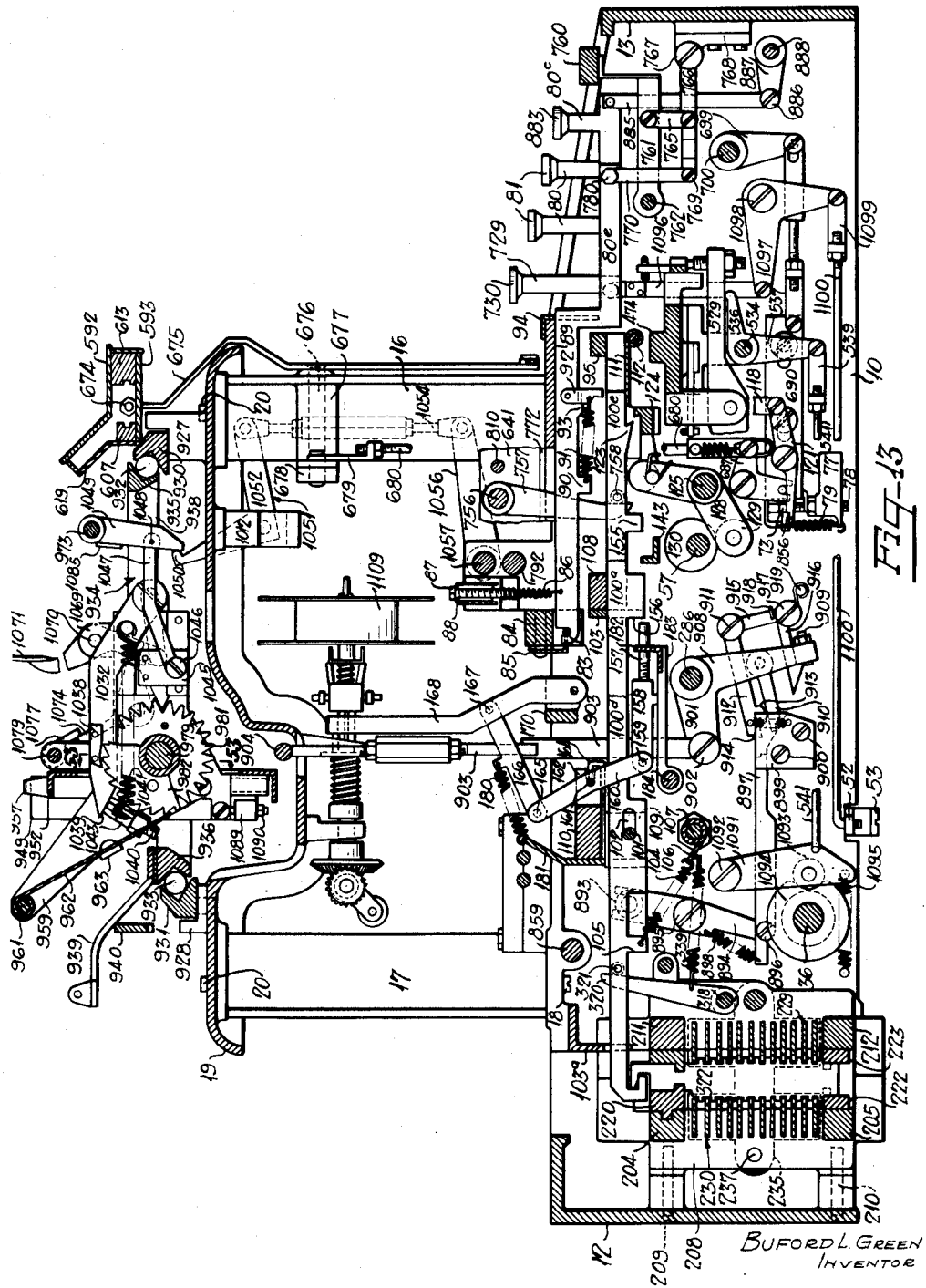

BUFORD L. GREEN
Inventor
By [signature] Paul S. Eaton
Attorney

April 19, 1938. B. L. GREEN 2,114,294
MEANS FOR PREPARING A CONTROL RECORD
Filed Feb. 19, 1934 23 Sheets-Sheet 12
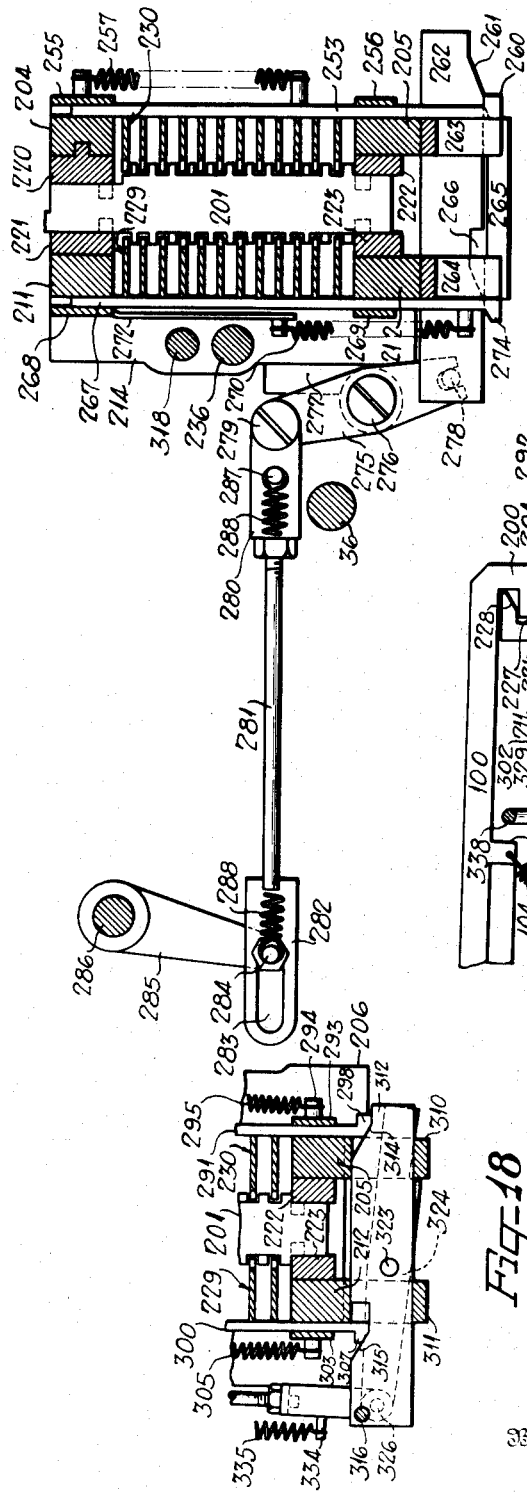
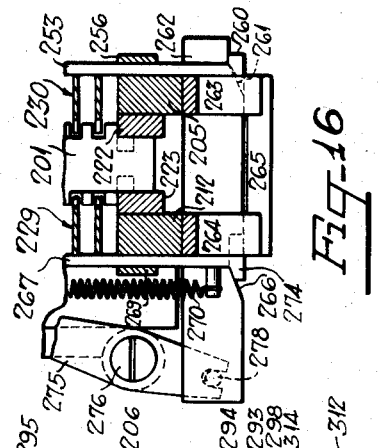
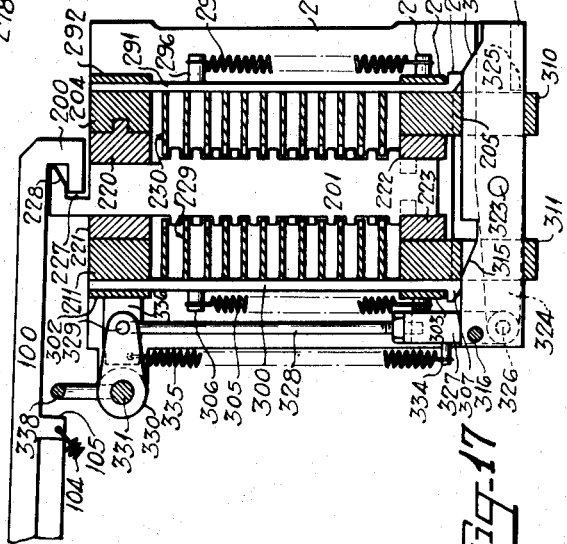
Buford L. Green
Inventor
By Paul S. Eaton
Attorney April 19, 1938.  B. L. GREEN  2,114,294
MEANS FOR PREPARING A CONTROL RECORD
Filed Feb. 19, 1934  23 Sheets-Sheet 13
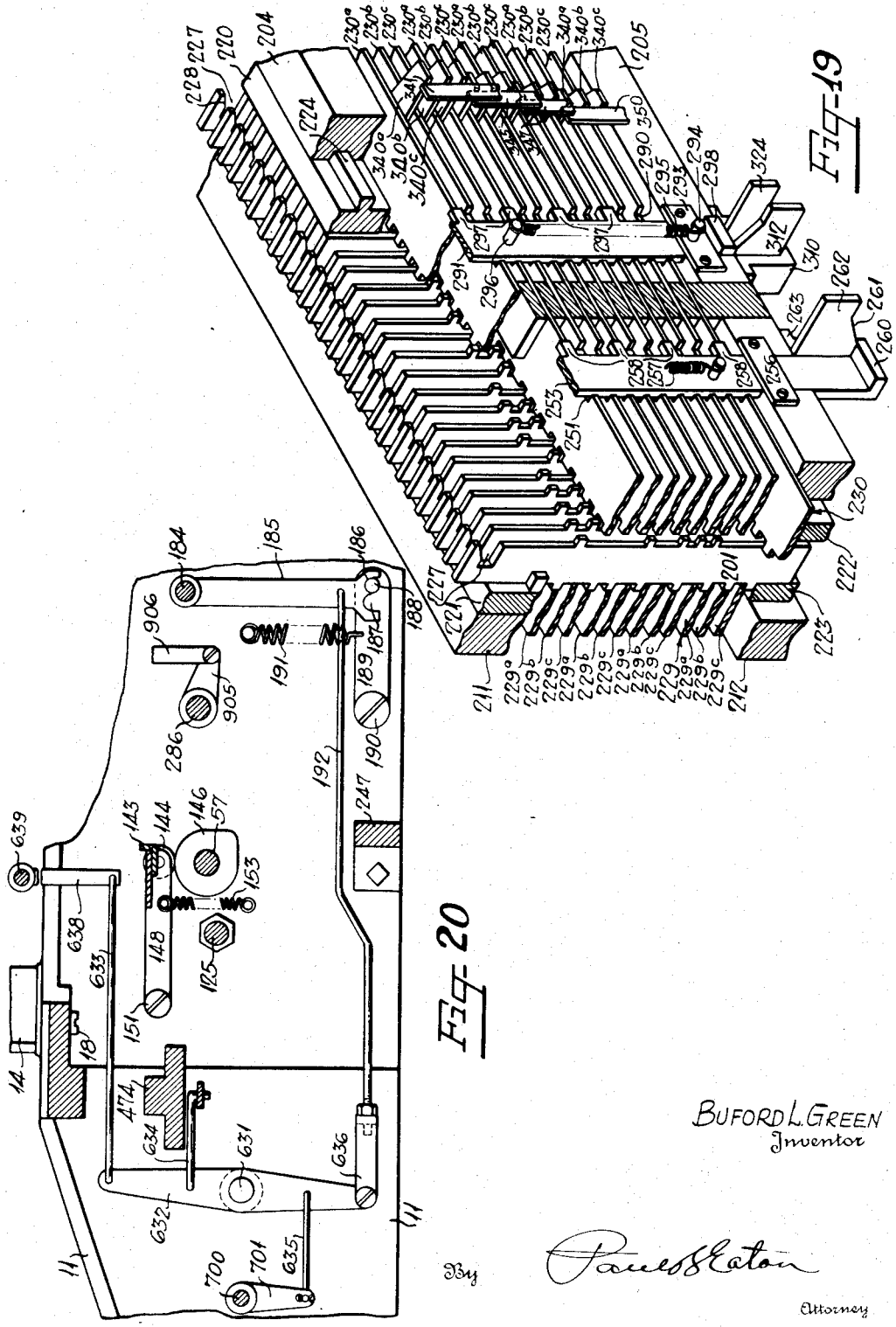
BUFORD L. GREEN
Inventor
By Paul S. Eaton
Attorney

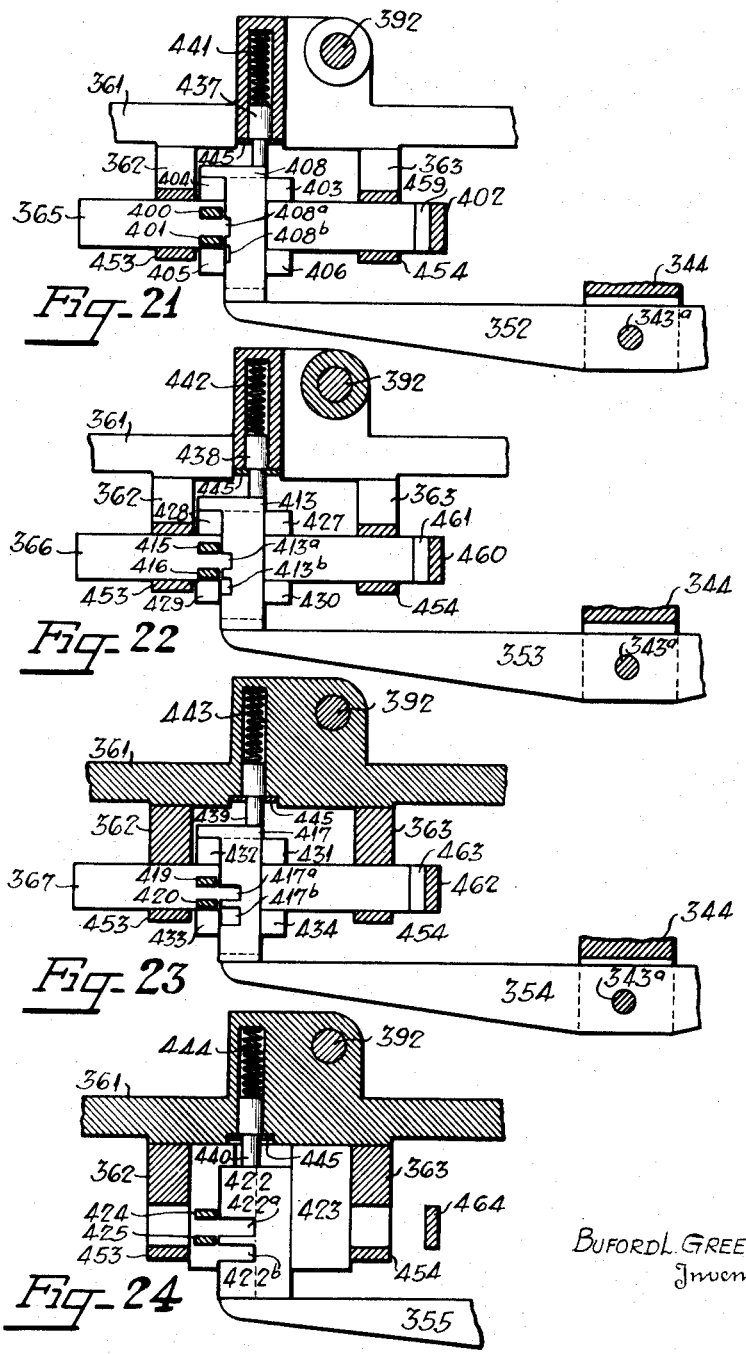

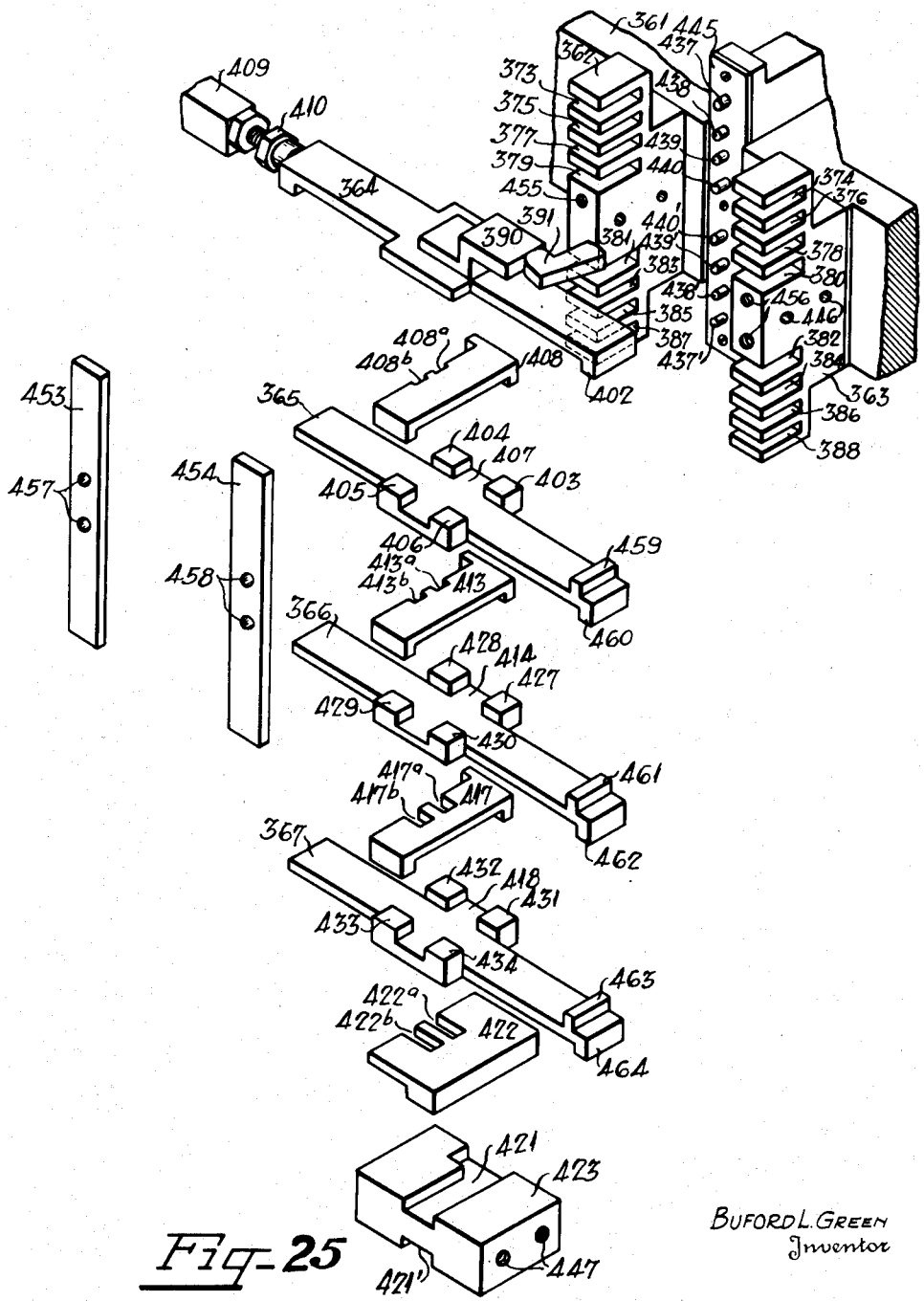

April 19, 1938.　　　B. L. GREEN　　　2,114,294
MEANS FOR PREPARING A CONTROL RECORD
Filed Feb. 19, 1934　　　23 Sheets-Sheet 16

BUFORD L. GREEN
Inventor

By Paul H Eaton
Attorney

April 19, 1938.   B. L. GREEN   2,114,294
MEANS FOR PREPARING A CONTROL RECORD
Filed Feb. 19, 1934   23 Sheets-Sheet 17
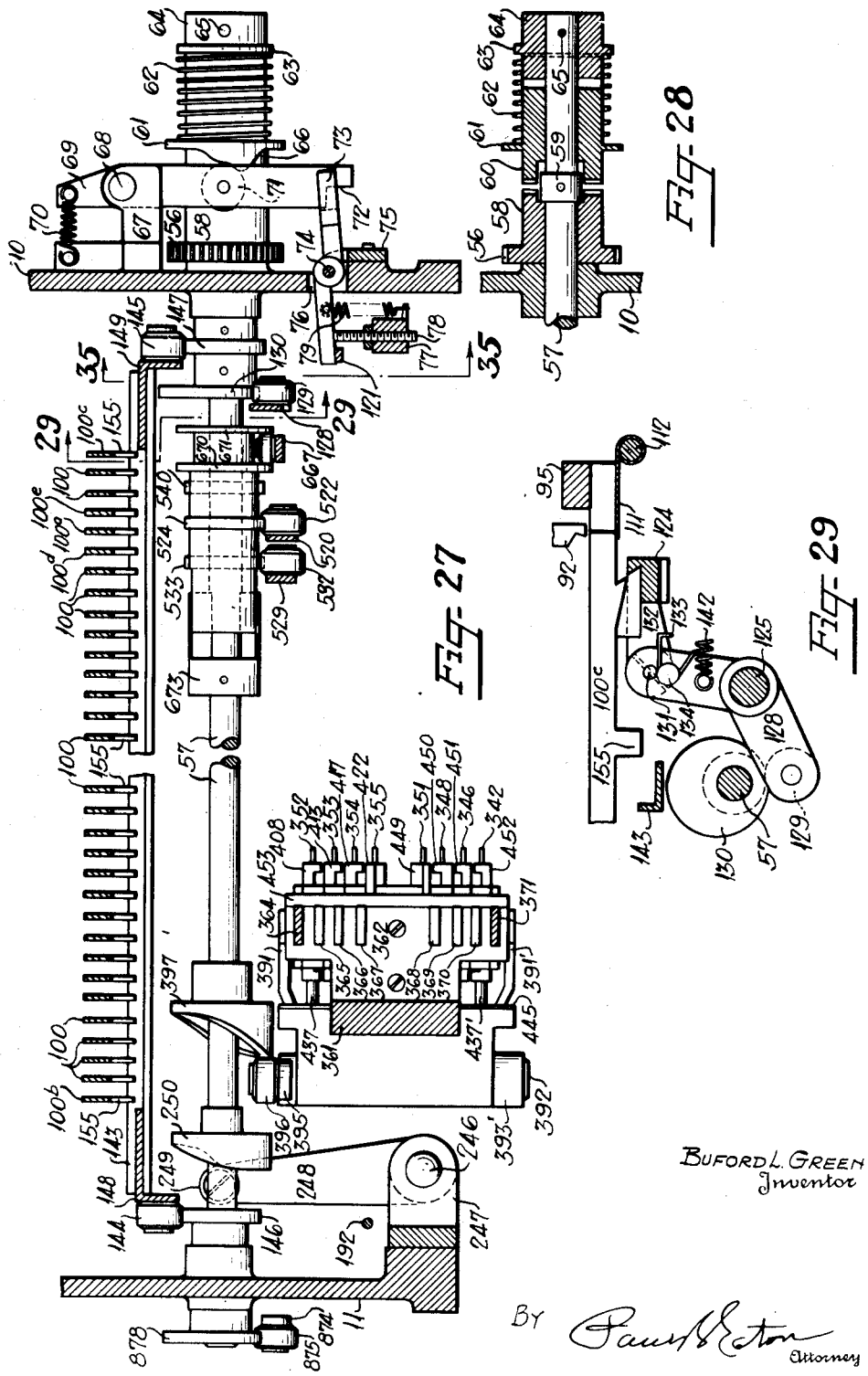
BUFORD L. GREEN
Inventor
BY Paul S Eaton
Attorney April 19, 1938. B. L. GREEN 2,114,294
MEANS FOR PREPARING A CONTROL RECORD
Filed Feb. 19, 1934 23 Sheets-Sheet 18
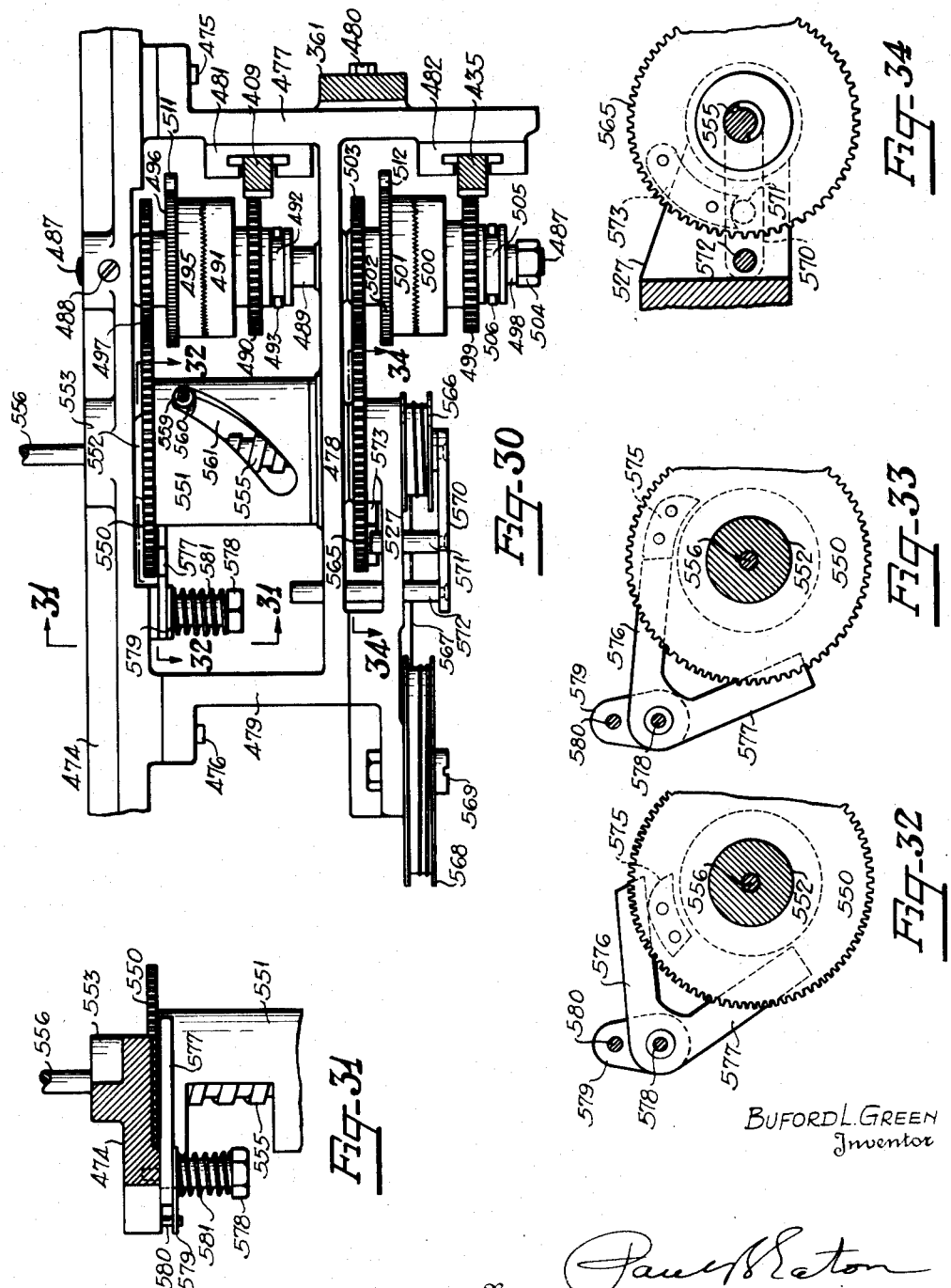
BUFORD L. GREEN
Inventor
By Paul W. Eaton
Attorney

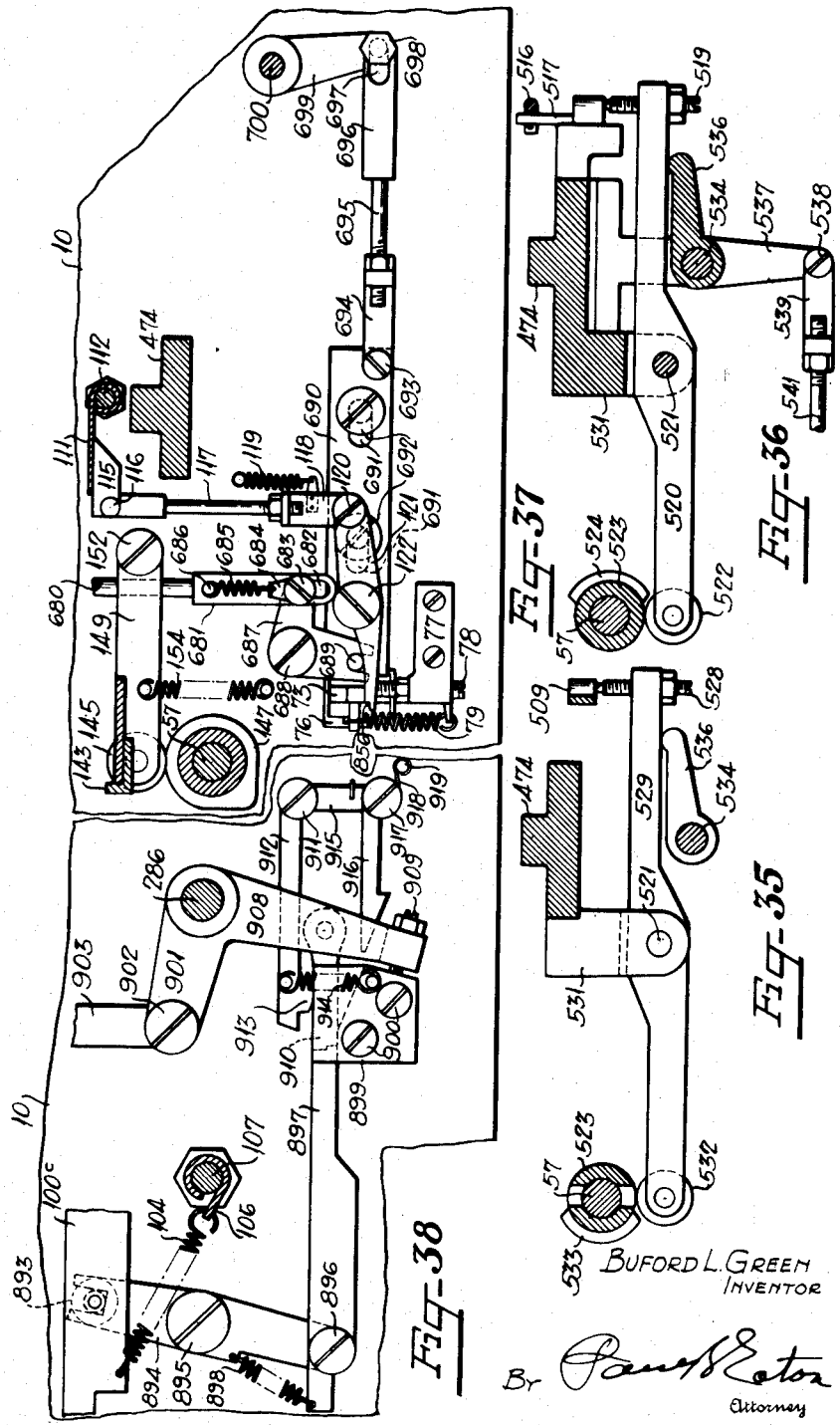

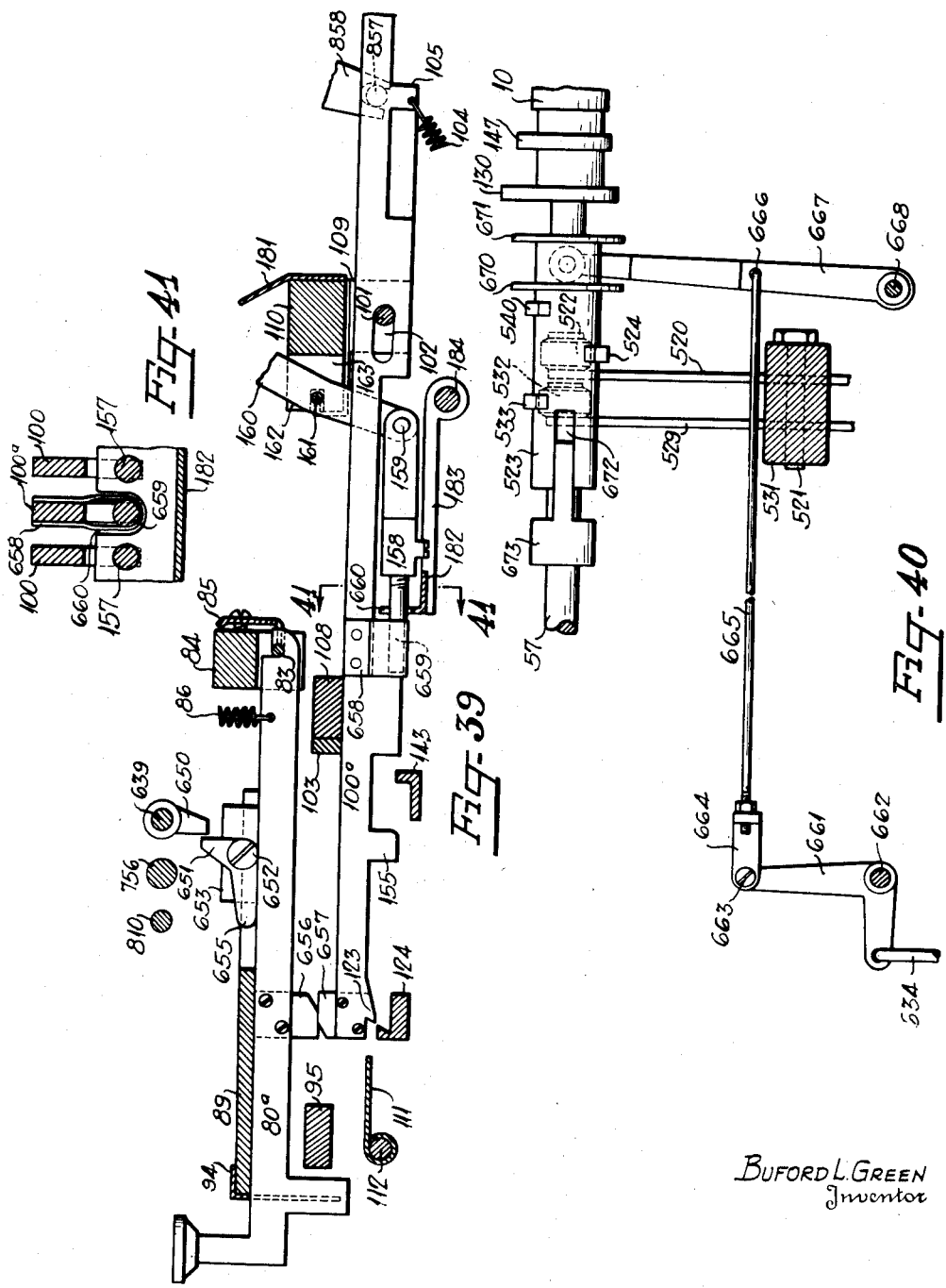

April 19, 1938.　　　B. L. GREEN　　　2,114,294
MEANS FOR PREPARING A CONTROL RECORD
Filed Feb. 19, 1934　　　23 Sheets-Sheet 21
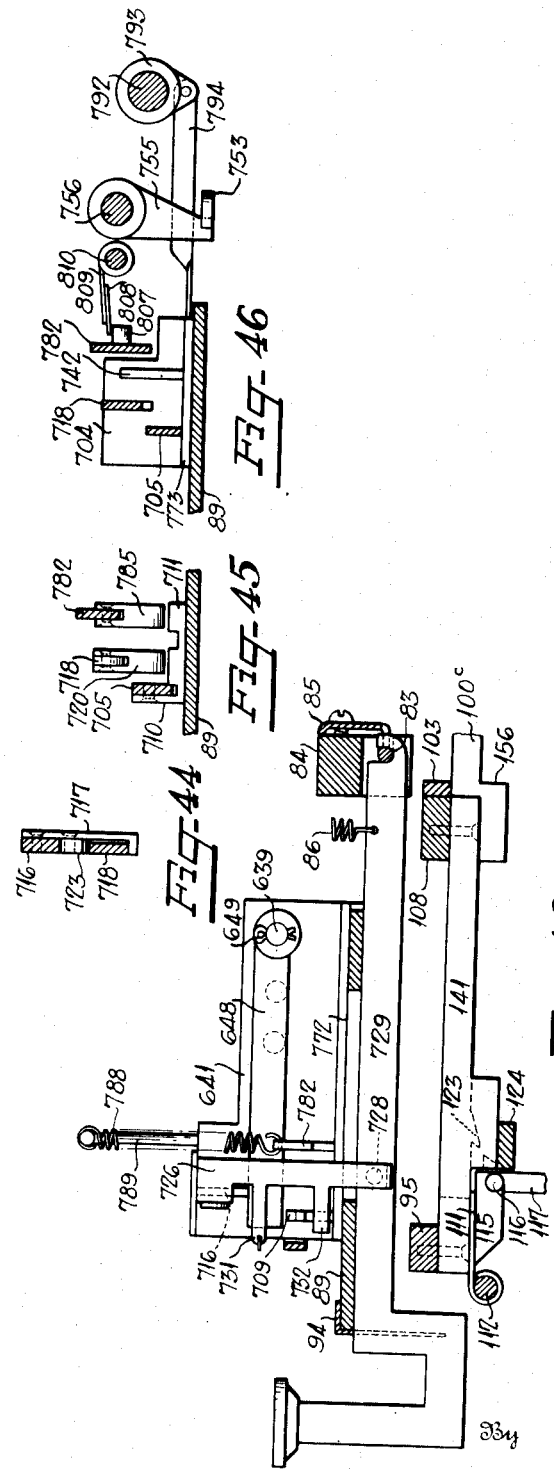
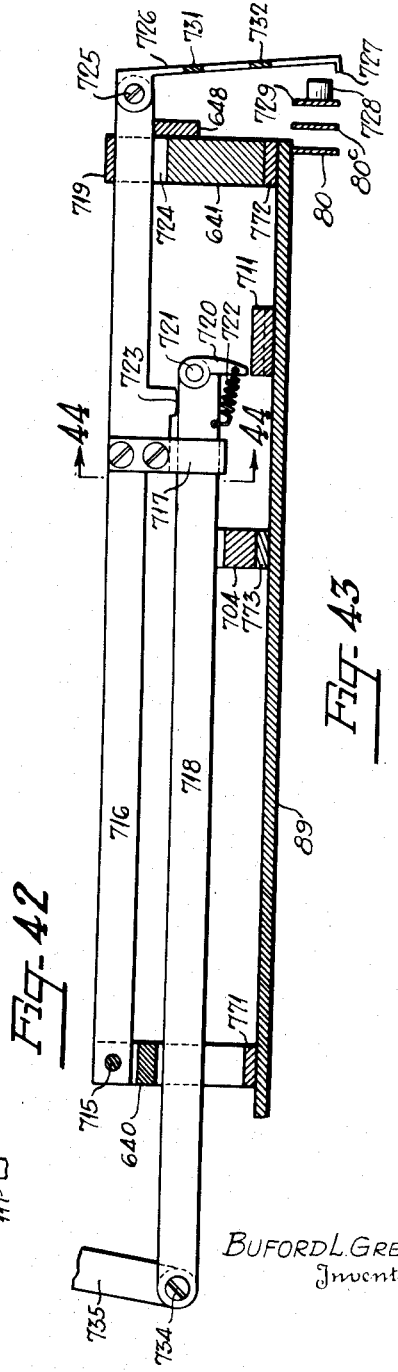
BUFORD L. GREEN
Inventor April 19, 1938.  B. L. GREEN  2,114,294
MEANS FOR PREPARING A CONTROL RECORD
Filed Feb. 19, 1934    23 Sheets-Sheet 22
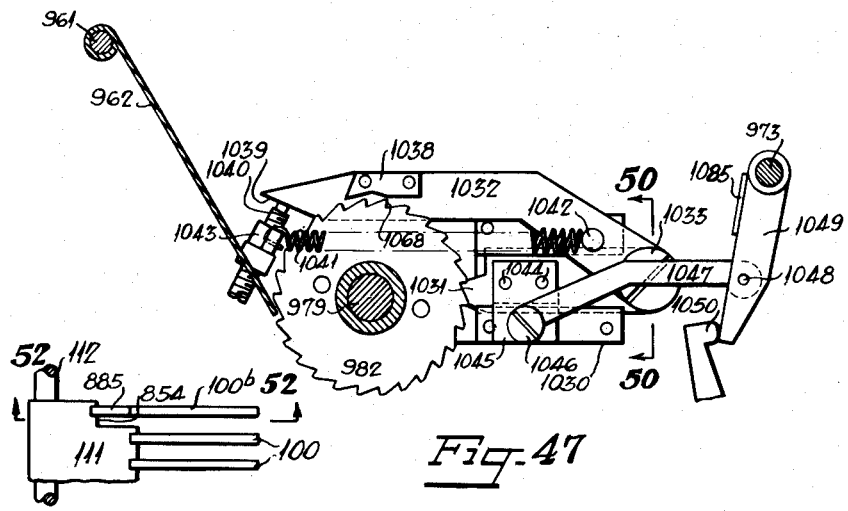
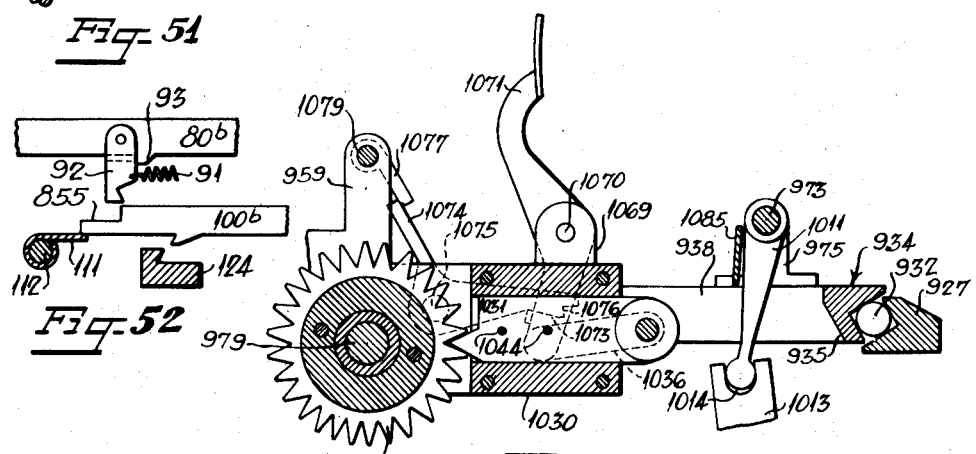
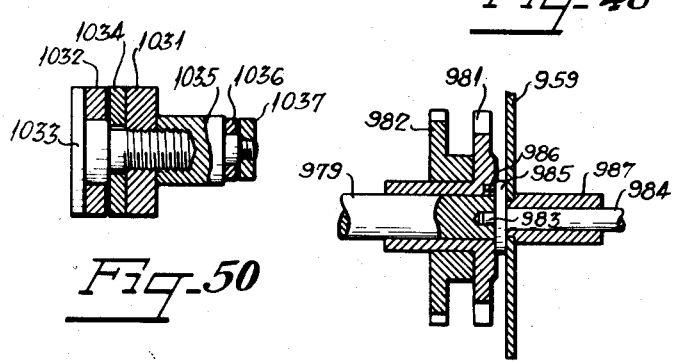
Buford L. Green
Inventor
By Paul B. Eaton
Attorney April 19, 1938.  B. L. GREEN  2,114,294
MEANS FOR PREPARING A CONTROL RECORD
Filed Feb. 19, 1934  23 Sheets-Sheet 23
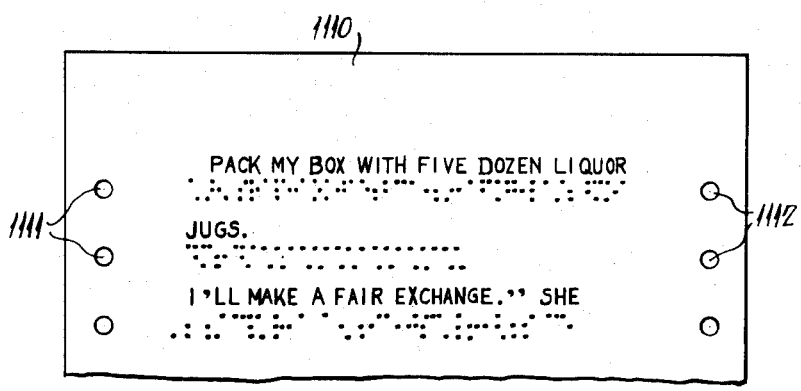
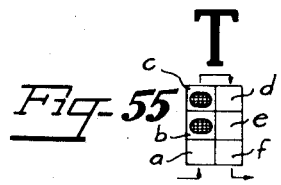
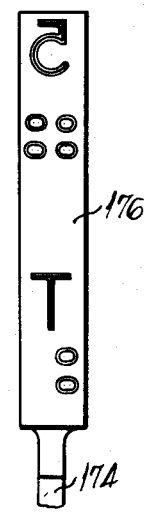
BUFORD L. GREEN
Inventor Patented Apr. 19, 1938

2,114,294

UNITED STATES PATENT OFFICE 2,114,294

MEANS FOR PREPARING A CONTROL RECORD

Buford L. Green, Charlotte, N. C.

Application February 19, 1934, Serial No. 712,065

57 Claims. (Cl. 197—1)

REISSUED
JUL 9 - 1940

This invention relates to a typewriter and more especially to a typewriter having special type bars thereon for printing at the same time, both a legible character and a plurality of cell controls so that the sheet prepared by the typewriter can be used by a scanning mechanism to scan the cell controls associated with each character for selectively operating a plurality of work performing instrumentalities, such as typesetting, linecasting machines, typewriters, and for the transmission of signals for either telegraph or wireless machines.

It is an object of this invention to provide a typewriter having key bars and drive bars controlled by the key bars with means for actuating the drive bars and means whereby the type bars are actuated by the drive bars, the drive bars also actuating a selecting and measuring mechanism for measuring the amount of space a character printed by a type bar will occupy in regular line printing.

It is a further object of this invention to provide a typewriter for preparing a control sheet by printing on the control sheet a plurality of lines arranged one above the other and whose lines correspond to the lines to be set by a typesetting machine, said typewriting mechanism having means for taking an accurate measurement of the amount of space an actuated character will occupy in regular line printing.

The typewriter also is equipped with means which are movable in accordance with the number of space band code cell controls which are to be put in the line and also having other means which are moved also by the number of space band codes which are put into a line but at a greater rate and these two mechanisms move in accordance with the number of times the space bar of the typewriter is actuated, to control the carriage return mechanism and prevent return thereof if the line is under-set or over-set and not having enough characters therein to be filled out to proper length by the expandibility of the space bands in the line together with extra spaces which may be placed in the line.

It is a further object to provide a typewriter equipped with a type bar having a special code character thereon for indicating extra spaces so that if extra spaces are needed when the carriage is returned in order to fill out the line to proper length when the control sheet actuates a typesetting machine and the like, then the type bar having the extra space characteristics thereon is automatically operated to print in the beginning margin of the sheet, in advance of the line already written, a code character which will automatically cause the typesetting machine and the like to place extra spaces in the line of type as it is set by the typesetting machine in accordance with the control mechanism being operated by the control sheet when the control sheet is used in association with a typesetting machine and the like.

It is a further object of this invention to provide a typewriter for preparing a control sheet for actuation of typesetting machines and the like and having means for measuring the amount of space the characters will occupy in regular line printing and also having means for blotting out the characters in a line or a portion of the same when a typographical error occurs or a line is overset, together with means associated with the automatic blot-out, which automatically subtracts from the indicator the measurement of the blotted out characters, this being brought about by disconnecting the type bars from their actuating means by manipulation of the automatic blot-out mechanism and when a key bar for a character to be blotted out is actuated, instead of actuating the type bar associated with said key bar, the automatic blot-out mechanism will automatically operate the automatic key bar to blot the desired characters and at the same time a reversal of the measuring means and indicating means is brought about whereby the measuring means operates positively in its usual manner but the indicating means are reversed to subtract the indication of the width of said blotted out character from the line which is written by the typewriter.

It is a further object of this invention to provide a typewriter having key bars and type bars and drive bars controlled by the key bars and actuated by the drive bars, a first selector operated by the drive bars, a second selector controlled by the first selector, a third selector set by the movement of the second selector, indicator moving means moved in accordance with the setting of the third selector, an indicating member moved by the indicator moving means, means for counting space bands in a line. Means are also provided which are movable in accordance with the means for indicating the space bands in a line for measuring the expansibility of the space bands in the line and means controlled by both of said means for adding an extra space code character at the beginning of the line already written if necessary, when the carriage is returned. There are also provided means for preventing the return of the carriage mechanism if the line is not of sufficient length to be filled out by space bands, their expansibility and extra space or if the line has too many characters therein together with means for automatically cutting off the source of motive power from the typewriter when the line is overset beyond the length of characters which will make a complete line on the typesetting machine and the like. The third selector is in two parts, one part transmitting large units of measurement and the other part transmitting small units of measurement to the indicator moving means. Means are provided for locking a portion of the selector against operation at all times, including cap-shift mechanism and carriage shift mechanism. Means are provided for disconnecting all type bars from actuation except the automatic blot-out bar when the automatic blot-out mechanism is actuated. There are means for releasing the indicator from its operating means to allow independent movement thereof for setting the beginning point of a line, together with means for latching the cap shift in position and automatically releasing the same upon actuation of any type character. I also have means for actuating the carriage shift by depression of a key controlling the same and the carriage shift is returned to normal position by another actuation of the same key which is used for moving it out of normal position. I also have means for punching holes in the marginal edges of the control sheet before the characters are printed thereon and holding the punches in penetrating position with relation to the control sheet at all times except when the control is shifted to new line position.

It is a further object of this invention, to provide a type measuring device, capable of making micrometric measurements, which is operated by a very short stroke of the racheting mechanism, and allows high speed operation of the same.

Some of the objects of the invention having been stated, other objects will appear as the description proceeds, when taken in connection with the accompanying drawings, in which—

Figure 1 is a top plan view of the typewriter mechanism for preparing a control sheet for selective operation of a plurality of work-performing instrumentalities;

Figure 2 is a left side elevation of a typewriter with motor removed;

Figure 3 is a right side elevation of the typewriter with the front portion broken away;

Figure 4 is a sectional plan view taken along the line 4—4 in Figure 11;

Figure 14:
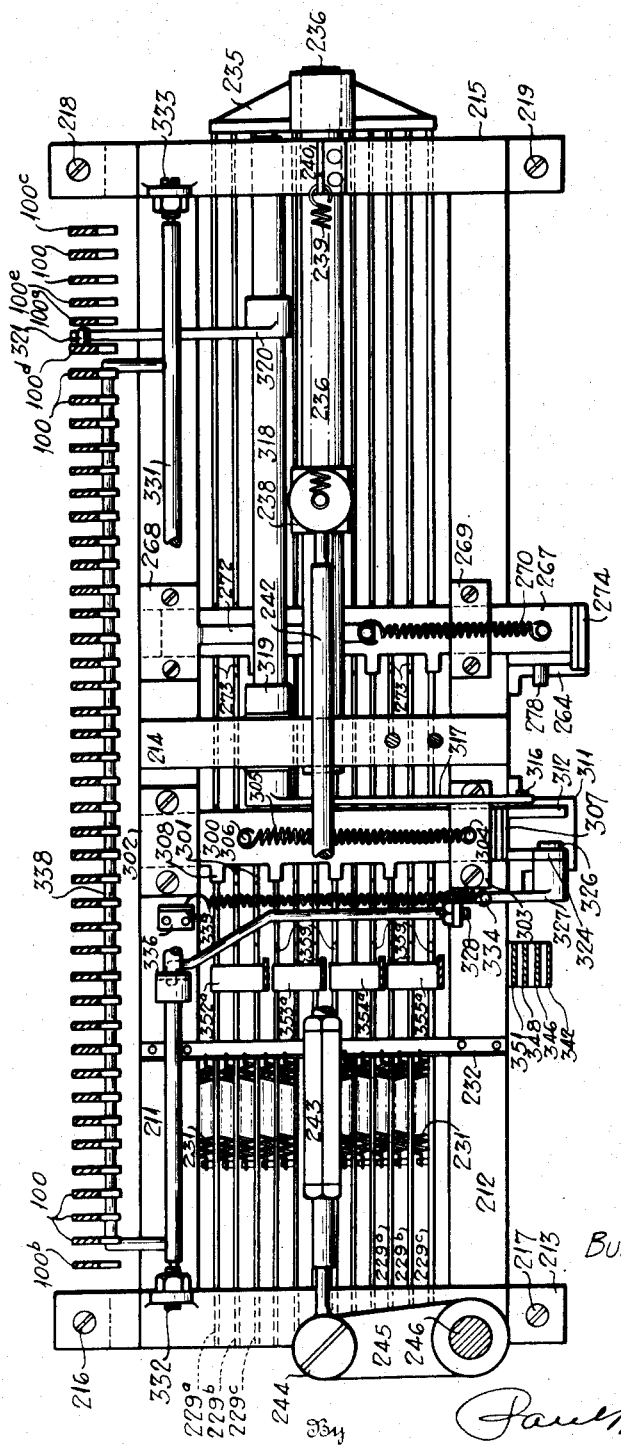
Figure 26:
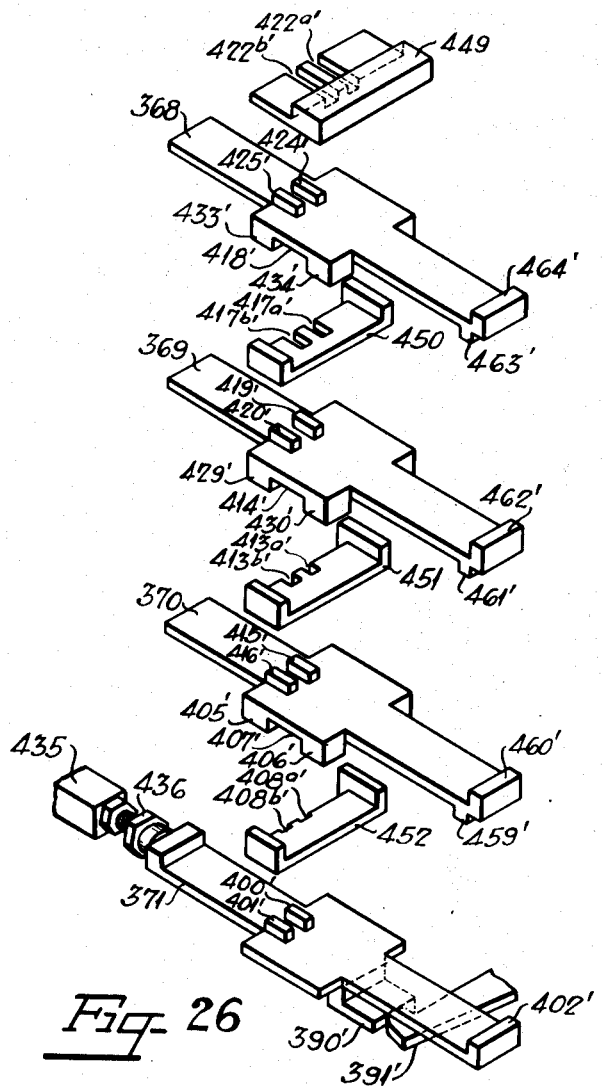

partially in section, taken along the line 5—5 in Figure 5 is a view partially in elevation and Figure 2;

Figure 6 is an elevational detail taken along the line 6—6 in Figure 11;

Figure 7 is a transverse sectional view taken along the line 7—7 in Figure 6;

Figure 8 is an enlarged top plan view of the carriage mechanism and associated parts;

Figure 9 is an enlarged top plan view, partially in section, taken along the line 9—9 in Figure 5;

Figure 10 is a sectional view taken along the line 10—10 in Figure 9;

Figure 11 is a vertical sectional view taken along the line 11—11 in Figure 5, with the line being bent along the lower portion of the typewriter to pass through the roller;

Figure 11a is an enlarged sectional detail of a portion of the lower left hand portion of Figure 11;

Figure 12 is a vertical sectional view taken along the line 12—12 in Figure 5;

Figure 13 is a vertical sectional view taken along the line 13—13 in Figure 5;

Figure 14 is an elevation taken along the line 14—14 in Figure 4;

Figure 15 is a vertical sectional view taken along the line 15—15 in Figure 4;

Figure 16 is a vertical sectional view showing the lower portion of the Figure 15 with the parts in a different position from that shown in Figure 15;

Figure 17 is a vertical sectional view taken along the line 17—17 in Figure 4;

Figure 18 is a vertical sectional view showing the lower portion of Figure 17 with the parts in a different position from that shown in Figure 17;

Figure 19 is an isometric rear view of the permutation bars forming the first and second selectors;

Figure 20 is a vertical sectional view taken immediately behind the part in which the left hand portion of Figure 12 is taken and approximately along the line 20—20 in Figure 5;

Figure 21 is a horizontal sectional view taken along the line 21—21 in Figure 11;

Figure 22 is a horizontal sectional view taken along the line 22—22 in Figure 11;

Figure 23 is a horizontal sectional view taken along the line 23—23 in Figure 11;

Figure 24 is a horizontal sectional view taken along the line 24—24 in Figure 11;

Figure 25 is an exploded isometric view of one of the third selectors and showing a portion of the other of the third selectors;

Figure 26 is an exploded isometric view of the other of the twin selectors which operate with the mechanism shown in the upper portion in Figure 25;

Figure 27 is a vertical sectional view taken along the line 27—27 in Figure 4;

Figure 28 is a vertical sectional view taken along the line 28—28 in Figure 3;

Figure 29 is a vertical sectional view taken along the line 29—29 in Figure 27;

Figure 30 is an elevation taken along the line 30—30 in Figure 4;

Figure 31 is a sectional view taken along the line 31—31 in Figure 30;

Figure 32 is a sectional view taken along the line 32—32 in Figure 30;

Figure 33 is a view similar to Figure 32 but showing the parts in a different position;

Figure 34 is a sectional view taken along the line 34—34 in Figure 30;

Figure 35 is a vertical sectional view taken along the line 35—35 in Figure 4;

Figure 36 is a vertical sectional view taken along the line 36—36 in Figure 4;

Figure 37 is a vertical sectional view similar to the right-hand lower portion of Figure 13 with parts omitted;

Figure 38 is a view of the left hand lower portion of Figure 13 with parts omitted;

Figure 39 is a vertical sectional view taken along the line 39—39 in Figure 9;

Figure 40 is a sectional plan view on an enlarged scale of the right-hand portion of the main drive shaft as seen in the lower central portion of Figure 4 with parts omitted;

Figure 41 is a vertical sectional view taken along the line 41—41 in Figure 39;

Figure 42 is a vertical sectional view taken along the line 42—42 in Figure 9;

Figure 43 is a transverse vertical sectional view taken along the line 43—43 in Figure 9;

Figure 44 is a vertical sectional view taken along the line 44—44 in Figure 43;

Figure 45 is a vertical sectional view taken along the line 45—45 in Figure 9;

Figure 46 is a vertical sectional view taken along the line 46—46 in Figure 9;

Figure 47 is a vertical sectional view taken along the line 47—47 in Figure 8;

Figure 48 is a vertical sectional view taken along the line 48—48 in Figure 8;

Figure 49 appearing on the same sheet with Figure 2 is a horizontal sectional view taken along the line 49—49 in Figure 2;

Figure 50 is a sectional view taken along the line 50—50 in Figure 47 and showing the peculiar bolt for supporting a portion of the mechanism for stepping the sheet in the typewriter to new line position;

Figure 51 is a plan view, showing the front end of back-spacer drive bar No. 100b and its relation to clutch trip bail 111;

Figure 52 is a vertical sectional view taken along line 52—52 in Figure 51;

Figure 53 is a vertical sectional view taken along line 53—53 in Figure 13 and showing the mounting for the right hand end of the platen shaft with certain parts omitted;

Figure 54 is a view showing the characters and cell controls carried by the type bars of the typewriter;

Figure 55 is a schematic view of a character and its cell controls and showing one direction in which the same may be scanned by suitable scanning apparatus;

Figure 56 is a view of a portion of a control sheet produced by the typewriter;

Figure 57 is a view of the face of a type bar.

Referring more specifically to the drawings the numeral 10 indicates the right side plate, the front of the typewriter being that end having the key bars thereon. The numeral 11 indicates the left side of the frame of the typewriter, whereas 12 indicates the rear end, and 13 the front end of the frame of the typewriter. On the upper portion of the frame just described four corner posts 14, 15, 16 and 17 are secured by any suitable means such as bolts 18, and on top of these posts there is secured a top plate 19, said top plate being secured in position by any suitable means such as bolts 20.

The typewriter frame is supported by conventional resilient supports such as indicated by 21. Secured to the rear end 12 of the typewriter frame is a suitable bracket 22 for supporting a suitable electric motor 23. The electric motor has a conventional shaft 24 on which is mounted a driving pulley 25 receiving a driving belt 26.

A stud shaft 27 is secured to the side wall 10 and projects outwardly therefrom. A pinion 30 is rotatably mounted on shaft 27 and said pinion has a hub portion 31 on which is secured pulley 28. Pinion 30 meshes with an idler pinion 32 which is rotatably mounted on a stud shaft 33 secured in sidewall 10.

Pinion 32 has integral therewith and on one side thereof a smaller pinion 34 which meshes with a carriage return pinion 35 loosely mounted on carriage return shaft 36 which extends entirely across the typewriter frame and is rotatably mounted in said frame.

Carriage return pinion 35 has extending outwardly therefrom a serrated hub 37. A sleeve 38 is slidably mounted on shaft 36 and has serrated a clutch face thereon adapted to engage the serrated end of hub 37. Sleeve 38 has a flange 39 provided with a cam 40 on the face thereof disposed next to the side wall 10.

By referring to Figure 4 it is seen that on the end of shaft 36 there is secured, by means of a pin 41, a sleeve 42 having a flange 43 thereon confining the other end of compression spring 44 which normally tends to force the clutch faces of portions 37 and 38 together.

Sleeve 42 has radially disposed ribs on the end thereof disposed next to sleeve 38 which are adapted to have a sliding fit in radially disposed grooves in the end of sleeve 38, the structure being similar to that shown in Figure 28. Secured on sidewall 10 is an L-shaped bracket 45 in which is pivotally mounted a lever 46, said lever being pivoted intermediate its ends as at 47.

The rear end of lever 46 has secured thereto a tension spring 48, the other end of the tension spring being secured to pin 49 in bracket 45, the purpose of the tension spring being to cause the roller 50 on lever 46 to follow the flange 39 at all times and to engage cam 40 thereon.

The front end of lever 46 has an inwardly projecting end 51 which is adapted to engage a fork in the outer end of lever 52 pivoted in sidewall 10. Lever 52 controls the tripping of the carriage return clutch for operating the carriage return mechanism, which will be later described. Lever 52 is mounted on stud 53 disposed on the lower edge of sidewall 10.

Pinion 30 meshes with an idler pinion 54 mounted on stud shaft 55 secured in sidewall 10. Idler pinion 54 meshes with a pinion 56 loosely mounted on main drive shaft 57. Pinion 56 has integral therewith a sleeve 58 having a clutch face on the outer end thereof. By referring to Figure 28 it is seen that the main drive shaft 57 has a collar 59 secured thereon which confines pinion 56 fixedly on shaft 57.

Loosely mounted on shaft 58 is a clutch face sleeve 60 having a peripheral flange 61 thereon confining one end of a compression spring 62, the other end of compression spring 62 being confined by a peripheral flange 63 on sleeve 64 fixedly secured to shaft 57 by means of a pin 65.

By referring to Figure 28 it is seen that sleeve 64 has radially disposed ribs having a sliding fit in radial grooves in the proximate end of sleeve 60.

Although the similar structure shown on shaft 36 and previously described is not shown in section, it also has a collar in the structure thereof similar to collar 59 in Figure 28.

By referring to Figure 27 it is seen that peripheral flange 61 has a cam face 66 thereon. Secured to sidewall 10 is a bracket 67 having pivotally mounted therein, as at 68, a lever 69, the upper end of lever 69 being pulled inwardly toward the frame 10 by means of tension spring 70. Intermediate the ends of lever 69 a roller 71 is rotatably mounted which is adapted to follow the peripheral flange 61 and engage cam surface 66 due to the tension spring 70. The lower end of lever 69 has a cutaway portion 72 therein adapted to be engaged by the outer forked end of a lever 73 pivoted as at 74.

The pivot pin 74 is supported in a bracket 75 secured to the outer portion of sidewall 10 and projecting into an opening 76 in said sidewall. A bracket 77 is fixed to the sidewall on the inside thereof and supports a set screw 78 which is adapted to engage the inner end of lever 73 to prevent tension spring 79 from forcing the outer end of lever 73 further upwards from the position shown in Figure 27. The portion on the inside of the sidewall 10 is also shown in Figure 37 in elevation.

The lever 73 and associated parts are operated each time a key bar is depressed to set in operation the main drive shaft. The means for operating the lever 73 will be later described.

It is evident that each time a key bar is depressed the outer end of lever 73 will be moved towards the observer in Figure 27 or downwardly in the machine, which will release the free end of lever 69 and allow the clutch members 58 and 60 to engage and drive the main drive shaft 57 one complete revolution, at which time the cam 66 will force the parts to the position shown in Figure 27 where the levers 73 and 69 will be latched in the position as shown in Figure 27 and the clutch will be held in disengaged position.

The typewriter is provided with a plurality of key levers 80 for operating the type bars. Each of the key levers which operates a type bar has a key button 81 on the forward and upper end thereof. There are some special key buttons on special key levers for special operations which will later be given a different reference character in the detailed description relating to the same.

Each key lever which has a key button thereon is pivotally mounted on rod 83 fixed in a comb 84 secured to the sidewalls of the typewriter. Various key levers have different shapes to cause the key button to be disposed at the proper place but essentially the structure of all is the same. The rod 83 is retained in position by a bracket 85 having a plurality of resilient fingers engaging the rod 83 at intervals to hold it in position.

The rear ends of key levers 80 have a notch on their upper surface and a shoulder immediately in front of the notch which engages the rod 83. The key levers are held in position by means of each key lever having secured thereto a tension spring 86 whose upper end is secured to an adjusting screw 87 mounted in a transverse inverted U-bar 88 disposed across the machine so that each key bar can be adjusted independently of the other key bars as to tension.

The front ends of the key levers 80 are restrained from upward movement beyond a given point by a transversely disposed plate 89, the springs 86 serving to hold the key levers 80 normally against the lower surface of this plate. Each key lever which is designed for operating a driving bar has a projection 90 on the lower edge thereof to which is secured one end of a tension spring 91, the other end of said tension springs being secured to a trip lug 92 pivoted at its upper end on key lever 80.

The lower end of each lug 92 has a sloping surface on the rear edge thereof against which the front end of the drive bars, to be presently described, is adapted to strike and move the lower end of the lug 92 backwardly after it has been operated in the event the key lever for the particular lug is still depressed.

Each key lever 80 has a projection 93 on the lower edge thereof disposed immediately to the rear of the lug 92, against which the spring 91 is adapted to pull the lug 92 normally. The lug 92 is split at its upper end and has a portion thereof on each side of the key lever so that in the position shown in Figure 11 the lug 92 is held against the projection 93.

A comb 94 is mounted on plate 89 for guiding the key levers 80. Mounted in spaced relation below plate 89 is a transverse bar 95 which serves to limit downward movement of key levers 80.

For each key lever which actuates a drive bar to, in turn, actuate a type bar to print a character, and also for the key levers controlling the carriage shift, and back spacer mechanism there is a drive bar which in general shape is similar. These drive bars, unless of special contour for a special character, to be later described, are indicated by reference character 100. The drive bars 100 are supported for sliding movement on a transversely disposed rod 101 penetrating a slot 102 in the drive bars. The drive bars 100 are mounted in combs 103 and 103a to space them properly apart from each other.

Each drive bar 100 has a tension spring 104 connected to a downwardly projecting portion 105 and is also connected to a plate 106 secured to a transversely disposed shaft 107.

The above described arrangement normally raises the front end of the drive bars but their upward movement is limited by a transversely disposed bar 108 so that it is seen that the drive bars are supported mainly from the two points which are rod 101 and bar 108. The transversely disposed bar 101 is supported at intervals across the typewriter by means of brackets 109 secured to transversely disposed bar 110 disposed across the typewriter frame. Each projection 105 not only serves as a point of attachment for one end of tension spring 104 but also serves to release the cap shift mechanism or higher case shift mechanism to be later described and to be hereinafter referred to as "cap shift".

The front end of each drive bar 100 normally occupies position immediately above a leaf member 111 fixedly secured to shaft 112, pivoted on pivot screws 113 and 114 at its ends. Pivot screws 113 and 114 are mounted in bosses 478 and 471 on the sidewalls 10 and 11. Leaf member 111 operates the clutch tripping mechanism upon actuation of a key lever. It is seen by referring to Figure 37 that downward movement of the free end of trip leaf 111, having a portion 115 integral therewith, pivotally connected as at 116 to a link 117, and with the lower end of the link being connected to an adjustable end link 118 normally held upwardly by a tension spring 119 will trip the clutch.

The lower end of end link 118 is pivotally connected by a shoulder screw 120 to one end of a lever 121 which is pivotally mounted on a shoulder screw 122. The free end of lever 121 is adapted to engage lever 73 shown in Figure 27, and previously described, for tripping the clutch to engaging position.

It is therefore seen that each time a key lever is actuated to depress a drive bar that the clutch will be engaged to allow the main drive shaft 57 to make a complete revolution.

Each drive bar 100 has a projection 123 on the lower front end thereof which, when the drive bar is depressed, is adapted to be engaged by a striking bail 124.

By referring to Figures 4, 13 and 29 it is seen that a transversely disposed striking bail shaft 125 is mounted at its ends as at 126 and 127 as seen in Figure 4. Striking bail shaft 125 has secured thereon a crank 128. The lower end of bell crank 128 has a roller 129 mounted thereon adapted to follow a cam 130 on main drive shaft 57. This causes oscillatory movement in shaft 125. Integral with bell crank 128 is an upstanding portion to which is pivotally secured as at 131 an arm 132 supporting one end of a striking bail 124. A torsion spring 133 is mounted on pin 134 and has one end thereof engaging the lower edge of arm 132 for normally forcing the striking bail 124 upwardly.

Near the other end of shaft 125, from the parts just described, and shown in Figure 29, it is seen, by referring to Figure 12, that a lever 136 is fixedly secured on shaft 125 and has pivotally secured to the upper end thereof an arm 137, the free end of which supports the other end of striking bail 124. A pin 138 is secured in arm 136 and has mounted therearound a torsion spring 139 which normally forces the striking bail upwardly.

Bars 140 and 141 are disposed near each end of the striking bail and against which the upper edge of the striking bail normally rests, being pressed thereagainst by the torsion springs 133 and 139.

Tension springs 142 and 142a are secured to suitable supporting means at one end and to the upper end of bell crank 128 and to the lever 136 for normally holding the striking bail in the position shown in Figures 12 and 29.

Referring to Figures 12 and 27 it is seen that a transversely disposed angle bar 143 is supported by arms 148 and 149 in which the rollers 144 and 145 are mounted, said arms, see Figure 37, being pivotally mounted on shoulder screws 151 and 152 in the sidewalls of the typewriter and tension springs 153 and 154 cause the rollers 144 and 145 to follow the cams 146 and 147 respectively.

It is seen that as an actuated drive bar is moved towards the rear of the machine a projection 155 is disposed immediately above the horizontal portion of angle bar 143 and at this point the cams 144 and 145 raise the angle bar 143 upwardly to move the actuated drive bar upwardly out of engagement with the striking bail.

Each drive bar 100 has a downwardly projecting portion having a face 156 which is adapted to engage a pin 157 adjustably secured in a link 158 which is pivotally connected as at 159 to a lever 160 which is pivotally mounted intermediate its ends on a rod 161. Rod 161 fits into a horizontally disposed slot in a comb 162 integral with bar 110. The levers 160 fit into a vertically disposed slot 163 in bar 110.

In order to releasably hold the levers 160 in position, there is secured in the bottom of comb 162 a plurality of spring members 164 which have forwardly, upwardly, and inwardly projecting portions which are resilient and which are adapted to engage rod 161 to hold the levers 160 in position. To the upper end of each lever 160 there is pivotally connected as at 165 a link 166 which is pivotally connected as at 167 to a link 168. Link 168 is for operating the type bar and its lower end has a hole therein in which is mounted a rod 169.

Rod 169 is supported in a comb 170 and has vertically disposed slots therein for reception of the lower end of the levers 169. A spring bar 171 is secured to the lower side of comb 170 and has upwardly projecting portions spaced at intervals across the typewriter for fitting against the transverse rod 169 for holding the rod together with the levers 168 in position. The upper end of each lever 168 has a pin 172 which is adapted to operate in a slot 173 in a type bar 174 pivoted as at 175, said type bar having a type face 176 provided with means for printing a character, which in the present case is a code character and sometimes a legible character.

Each link 166 has secured thereto one end of a tension spring 180, whose other end is secured to a member 181 which in turn is secured to the rear of bar 110. Springs 180 tend to return the type bars to the position shown in Figure 11 after they have been actuated.

It is to be noted that each pin 157 which is threadably mounted in link 158 can be adjusted as to the distance it projects forwardly so as to regulate the amount of pressure applied by the type character to the sheet. In other words, the pressure which each type bar will transmit to the control sheet in preparing the same can be regulated, which is necessary especially for the type bars carrying a minimum amount of printing projections, such as a type bar having no legible characters thereon and only one or two projections for writing cell controls.

In this manner the pressure on a type bar can be regulated to prevent its applying too much pressure to the control sheet to cause the projections to cut through the control sheet.

The pins 157 are each slidably mounted in a hole extending through a bail 182 which is secured on the free ends of arms 183 which are fixedly secured on a shaft 184 having its ends pivotally mounted in the sidewalls of the typewriter. Shaft 184 has connected thereto a lever 185 which projects downwardly as shown in Figures 12 and 20 and has a pair of notches 186 and 187 in the lower end thereof. Notches 186 and 187 are adapted to receive a roller 188 mounted on lever 189 pivoted as at 190 and is normally pressed upwardly at its right end in Figures 12 and 20 by means of a tension spring 191. A link 192 is connected to lever 185 for operation of the same.

It is seen that when roller 188 is resting in notch 186 that the parts will be held in the position shown in Figures 11 and 12 so that the type bars will be actuated by the drive bars as the pins 157 are in the path of the projections 156 on the drive bars.

When it is desired to prevent actuation of the type bars by the drive bars, such as in a blot out, which will be later described, the lever 185 is moved in a counterclockwise direction in Figures 12 and 20 to cause roller 188 to rest in the notch 187 which will cause the bail 182 to be lowered to a point where, when a drive bar 100 is operated, its projecting face 156 will not engage its associated pin 157 for actuation of the type bar. The operating mechanism for the link 192 will be later described in connection with the automatic blot-out mechanism.

When a drive bar 100 is actuated it is necessary to provide means for taking accurate measurement of the space the character actuated by the drive bar occupies in regular line printing. In order to accomplish this I have devised a plurality of selectors for taking this measurement and transmitting the same to an indicator so that the operator of the typewriter will at all times know the amount of space which the actuated characters will occupy in regular line printing. It is also necessary that a record be kept of the number of space bands in a line, the expansibility of the space bands in a line, and the amount of extra spacing which is necessary to fill the line. In order to accurately take the measurements of each actuated character there is provided on the rear end of each drive bar for actuating a type bar a downwardly projecting portion having a forwardly projecting portion 200 each of which is adapted to actuate one of a plurality of vertically disposed first selector bars 201, (see Figures 11 to 19 inclusive) there being a vertically disposed selector bar 201 for each drive bar excepting the automatic blot-out bar.

It will be noted in Figure 4 that space 203 occurs in which there is no vertically disposed first selector bar and this is the position where the rear end of the drive bar for the automatic blot-out is positioned. The operation and mechanism of said automatic blot-out will be later described.

It is to be noted that the upper end of each first selector bar 201 has on the rear edge thereof a notch 227 and immediately above the notch is a sloping surface 228 which is provided for the following reasons: When the front end of a drive bar 100 is depressed by a key lever the first selector bar 201 associated with the drive bar is raised. Before the striking bail moves a drive bar towards the rear of the machine and out of the notch 227 in the upper end of its first selector bar, certain of the second selector bars are allowed to move under their spring tension to engage the certain projections on the raised first selector bar. The portion 200 of the drive bar is moved rearwardly out of the notch 227, and when the measurement has been taken it is evident that were it not for the sloping surface 228, that if for any reason the front end of the drive bar were held in lowered position the projection 200 would not again enter the notch in the upper end of the first selector bar and thus the sloping surface 228 is provided to cause the parts to assume their normal position after actuation of a type bar as shown in Figure 13.

A suitable framework is necessary for supporting the first and second selector bars. In the drawings I have shown this framework as comprising two portions. The rear portion has the upper and lower transverse bars 204 and 205 which have integral therewith upstanding posts 206, 207 and 208. This portion of the framework is secured to the rear wall 12 of the typewriter frame by any suitable means such as screws 209 and 210. The front portion of the frame is similar to the rear portion and comprises upper and lower transversely disposed bars 211 and 212 joined together by upstanding posts 213, 214 and 215. Suitable bolts 216, 217, 218 and 219 penetrate the two portions of the framework at its four corners and secure the same together.

In order to slidably support the vertically disposed first selector bars 201, the bars 220, 221, 222 and 223 are provided having coinciding vertically disposed slots in their proximate edges, these bars being spaced apart from each other. The bar 220 has a tongue 224 thereon adapted to fit into a slot in bar 204. This structure is necessary in order to guide the first selector bars and so as to permit removal of the entire magazine of first selector bars and the four transverse supporting bars for insertion of another magazine when a different size of type is to be measured.

The bars 220 to 223 inclusive are secured to the upper ends of posts 225 and 226, thus making a complete unit of the first selector bars and their supporting means so that the entire first selector can be removed and a different selector placed therein when a different style of type is to be measured. For example, if one selector was designed for measuring seven point type and the linotype or typesetting machine which must be operated by the control sheet made by the typewriter employed twelve point type, then it would only be necessary to remove the first selector and insert in lieu thereof a different first selector so designed as to projections as to measure the twelve point type instead of the seven point type. When the first selector bars are manufactured each has twelve projections extending from each side thereof and in making up the selector bars for insertion into the second selector to be presently described, each first selector bar 201 has certain of the projections removed therefrom to leave the proper amount of projections and disposed in the proper position to represent the character which is actuated by the drive bar which also actuates the first selector bar.

Any excessive movement of first selector unit toward the observer in Figure 4 is prevented by a set screw 254 mounted in sidewall 10 as seen in Figure 4.

The number of second selector bars allowed to move by the first selector bars, determines the measurement transmitted to the indicator for a character.

The posts 206, 207 and 208 and 213, 214 and 215 have open ended slots on their proximate faces, the open ends being next to each other for slidably receiving transversely disposed second selector bars 229, which bars have projections on their inside edges. All of these front second selector bars have notches and projections in equal number on their rear edges which cooperate with the projections on the first selector bars 201 for taking the measurement of the actuated characters. The description of the front second selector bars 229 applies to all of the front bars and the reference character 230 designates the rear second selector bars, their front edges being identical as to structure but their rear edges have somewhat different structure to be presently described.

The second selector bars 229 are normally pressed towards the right-hand side of the typewriter when viewed from the key board end of the machine by means of a tension spring 231 being secured to each of the bars 229 at one end and having its other end secured to an angle iron member 232 disposed on the transverse bars 211 and 212. The rear second selector bars 230 are like-wise normally moved to the right-hand side of the machine by means of tension springs 233 each spring having one end secured to a second selector bar and the other end secured to an angle iron member 234 fixed to the transversely disposed bars 204 and 205.

The second selector bars 229 and 230, as previously described, are normally pressed to the right side of the typewriter by their tension springs. They are allowed to move in combinations toward the right side of the typewriter only when their right-hand ends are released and are not locked against movement by the cap and carriage shifts. A plate-like member 235 which fits against the right-hand ends of all of the permutation or second selector bars 229 and 230 normally holds them in their inoperative position or to the left against the tension of their springs. This plate is fixedly secured on a shaft 236 which is slidably mounted in upstanding posts 214 and 215.

The other side of plate 235 has fixed therein a pin 237 which is slidably mounted in upstanding post 208 which aids in supporting the plate 235. The shaft 236 has fixed thereon a cuff 238 to which is secured a tension spring 239, the other end of the tension spring being secured to a projection 240 as shown in Figure 4.

Also secured to cuff 238 is a link 242 which is adjustable in length by means of turnbuckle 243. The other end of link 242 is pivotally secured as at 244 to a lever 245 fixedly secured on shaft 246 rotatably mounted in upstanding post 213 of the framework of the first and second selectors.

Shaft 246 is mounted in a bearing 247 fixed to the inside surface of sidewall 11 of the typewriter frame and near this bearing is fixedly secured a lever 248 which has a roller 249 in its upper end adapted to follow a drum cam 250 fixed on main drive shaft 57.

It is seen that when a type character is actuated, and its measurement is ready to be taken, and its first selector has been raised and the clutch has been tripped and the main drive shaft allowed to rotate one complete revolution, this will release the second selector bars and allow a certain combination of the same to move to the right to take the measurement of the actuated character. This measurement is transmitted to a third selector to be later described.

In the position shown in the drawings, all of the parts are in position for the typing and measuring of lower case characters. It is evident that when high case characters are actuated that a different measurement will apply as well as when the carriage is shifted for the printing of numerals and the like. It is therefore necessary to provide means for locking out of operation certain of the second selector bars for each operation.

There are three sets of second selector bars, one set being for lower case characters, another set being for high case characters and another set being for numerals and the like and of course only one set at a time of these second selectors can be allowed to operate. These second selector bars are disposed in sets of three each, one above the other, the selector bar 229a representing the high case or cap characters, the bars 229b representing the low case characters and the bars 229c representing the numerals and other characters not included in the above. The numerals are measured when the carriage is shifted, therefore I will refer to the carriage shift mechanism for controlling the measurement of numerals.

It is also evident that the second selector bars 230 are divided into groups of three each comprising bars 230a, 230b and 230c.

*Carriage shift mechanism*

All of the bars 230 have notches 251 disposed one above the other in their outer edges. The fixed bars 204 and 205 of the framework likewise have notches coinciding with the notches 251 in the rear or outer edges of the bars 230. Slidably mounted in the notches 251 and the coinciding notches in the bars 204 and 205 is a vertically movable bar 253 which is confined in the notches in bars 204 and 205 by means of plates 255 and 256. A tension spring 257 is secured to the bar 253 at its lower end and to plate 255 at its upper end for normally pressing the bar 253 upwardly. The bar 253 has a small clearance between the bar itself and the notches 251. Equal to the distance of every third bar 230 there is disposed a projection 258 on the bar 253, these projections 258 normally coincide with the selector bars 230c to lock the numeral character measuring bars 230c against operation.

The lower end of bar 253 has a laterally projecting portion 260 on which a cam surface 261 of a bar 262 is adapted to operate. This bar 262 is supported by a bracket 263 which is U-shaped and at its open upper end is secured to transverse bar 205 for slidably confining the bar 262. The bar 262 is also supported by a similar U-shaped bracket 264 secured to the lower edge of transverse bar 212.

The two U-shaped brackets 263 and 264 have secured to their lower ends a bar 265 whose upper surface is flush with the upper portion of the bottom of the U-shaped brackets so as to cause the bar 262 to slide thereon and not to cause its sloping portion 261 or notch 266 from allowing the bar 262 to move downwardly when it is moved in the U-shaped brackets 263 and 264. Slidably mounted on the front portion of the selector frame in identical manner to the mounting of bar 253 is an identical bar 267 which is slidably mounted in notches in transversely disposed bars 211 and 212 and is loosely confined therein by plates 268 and 269 and normally pressed upwardly by a tension spring 270 secured at its lower end to bar 267 and secured at its upper end to a spring perch 272 projecting from plate 268. Bar 262 also has a notch 266, one end of which is sloping to ride on projection 274 to allow bar 267 to move upwardly when bar 262 is moved toward the front of the typewriter, as shown in Figure 16.

The second selector bars 229 which have previously been described as being in sets three, namely, 229a, 229b and 229c have slots 273 in their outer edge, or the edge disposed next to the front of the typewriter, in which the bar 267 has movement but clears the same by a small margin. This bar 267 has projections 274 spaced to engage every third selector bar and are shown in normal position to lock the numeral selector bars from operation.

It will be observed by referring to Figures 14, 15, 16 and 19 that when bar 252 is moved to the right as shown in Figure 15 cam surfaces 261 and 266 will move the bars 253 and 267 downwardly to a position shown in Figures 15 and 19 and will cause the projections 258 and 274 to be disposed in the path of the second selector bars 229c, 230c and will lock them from operation and prevent their operation upon actuation of a character and the release of the second selector bars by the right-hand movement in Figure 14 of plate 235.

Bar 262 is operated by means of a lever 275 pivoted as at 276 in plate 277, secured to post 214. The lower end of lever 275 is forked and engages a pin 278 in bar 262. The upper end of lever 275 is pivoted as at 279 to a link head 280, connected to a link 281, which in turn is welded to link head 282 having a slot 283 therein for receiving the pin 284 in the lower end of a lever 285 fixed on a transversely disposed shaft 286. Shaft 286 is the carriage shift shaft and the means for operation of this shaft will be later described.

Connected to pin 284 in lever 285 and also to pin 287 in link head 280 is a tension spring 288, the purpose of which is to prevent injury to the first and second selector bars in case of any miscarriage in their operation. It is evident that counterclockwise movement of shaft 286 will operate the mechanism to move the bar 262 to the left in Figure 15 and allow the bars 253 and 267 to be pulled upwardly by their respective tension springs.

It is evident that when the bar 262 is moved to the left in Figure 15 that the tension springs 267 and 270 will move the bars 253 and 267 to shift position and in case of any miscarriage or misplacement of the position of the second selector bars 229 or 230, no damage will be done. A like arrangement is made for shift in the other direction by means of tension spring 288, because it is seen that when the shaft 286 moves in a clockwise direction that it moves the parts to the position shown in Figure 15 not by a positive connection but by the tension on spring 288 and therefore no damage can be done in this operation.

*Cap shift mechanism*

The first and second selector mechanism is normally in a position for measuring lower case characters. It is evident that since means, already described, are in operation for normally holding the numeral measuring second selector bars out of operation that means must also be provided for normally holding the high case or cap second selector bars out of operation. This mechanism which normally holds the high case characters out of operation, when shifted, releases the high case characters and locks the lower case characters from operation.

The mechanism for normally holding the high case or "cap" measuring second selector bars 229a and 230a out of operation is very similar to the numeral locking mechanism or carriage shift mechanism which has been described. On the back side of the selector mechanism the second selector bars 230 have an elongated notch 290 cut out of their rearward or outer edges in which a vertically movable bar 291 is adapted to have movement with sufficient clearance between the bars 230 and the projections on vertically movable bar 291. This bar has sliding movement in notches cut in the rearward faces of transversely disposed bars 204 and 205 and it is loosely confined for sliding movement in said notches by means of plates 292 and 293. A pin 294 is secured in plate 293 and to this pin a tension spring 295 is secured, the other end of the tension spring being secured to a pin 296 in bar 291.

Bar 291 has projections 297 spaced the distance of every third second selector bar 230, and being adapted to normally engage the second selector bars 230a which measure high case or "cap" characters. The lower end of vertically movable bar 291 is turned outwardly as at 298. On the front side of the selector mechanism, a bar 300 is mounted for vertical sliding movement which is similar to bar 290. Bar 300 has movement in cutaway portions 301 in the second selector bars 229.

The bar 300 is slidably mounted in notches cut in a front side of the transversely disposed bars 211 and 212 of the selector frame and the bar 300 is slidably confined in said notches by means of plates 302 and 303. Plate 303 has secured thereto a pin 304 to which is secured one end of a tension spring 305, the upper end of which is connected to a pin 306 fixed in bar 300, the purpose of the spring being to normally force bar 300 downwardly.

The lower end of bar 300 is turned outwardly as at 307. The bar 300 has a plurality of projections 308 thereon, each projection being so spaced as to engage every third bar 229a of the second selector. Secured on the lower surfaces of transversely disposed bars 205 and 212 are brackets 310 and 311, said brackets having a pair of spaced slots therein for slidable reception of bars 312 and 324. Bar 312 has a sloping shoulder portion 314 adapted to engage the lower outturned end 298 of bar 291.

When bar 312 is moved all the way to the right as shown in Figure 17 it causes bar 291 to be held in raised position against the tension of its spring as shown in Figure 17. Bar 312 also has a cam surface 315 on the upper edge thereof which is adapted to engage the lower out-turned end 307 of bar 300 to also move it to its highest position as shown in Figure 17 when the bar 312 is slid to the right as shown in Figure 17.

Bar 312 has a pin 316 therein which is adapted to be engaged by the lower forked end of lever 317 which is fixedly secured on shaft 318 mounted for oscillation in upright portions 214 and 215 of the selector frame. Shaft 318 has also fixedly secured thereon a collar 319 which prevents endwise movement of the shaft. Shaft 318 also has a lever 320 fixed thereon which projects upwardly along "cap" shift drive bar 100d and is adapted to be engaged by a pin 321 in said special drive bar.

The drive bar 100d is identical to the other drive bars but it does not allow actuation of any second selector bars it being connected to the "cap" shift key lever for effecting shift from lower case to higher case or "cap" characters. This special drive bar 100d operates a vertically movable first selector bar 322.

The first selector bar 322 is different from the other first selector bars in that it has all twenty-four projections thereon, namely, twelve on each side, so that when the "cap" shift drive bar is actuated this particular first selector bar 322 will be raised and having all twenty-four projections on the sides thereof will lock all second selector bars 229 and 230 against operation, and therefore, no measurements will be transmitted by the first and second selectors to the third selector and to the indicating mechanism. The drive bar 100d operates a type bar to place a code character on the control sheet to indicate "cap" shift.

As will be noted in Figures 17, 14 and 18 there is spaced from bar 312, but pivotally connected thereto by pin 323, a bar 324, the end of which can be seen in Figures 14 and 19. This bar has a cutaway portion 325 shown in dotted lines in Figure 17 and at the forward end thereof is pivotally connected as at 326 to a link head 327 which in turn is connected to a link head 328 whose upper end is connected as at 329 to a lever 330 which is fixed on shaft 331. Shaft 331 is shown in elevation in Figure 14 and is mounted for oscillation on pivot screws 332 and 333 supported by posts 213 and 215. Link head 327 has a pin 334 to which is secured the lower end of a tension spring 335, the upper end of the tension spring being secured to a bracket 336 secured on transverse bar 211.

When cap shift drive bar 100d is actuated, pin 321 (see Figure 14) engages a lever 320 which oscillates shaft 318, which moves lower end of lever 317 towards the front end of the typewriter. The lower forked end of lever 317 engages pin 316 (see Figures 17 and 18) which moves bars 312 and 324 forwardly and shoulder 325, under influence of spring 335, falls in front of plate 310 and latches the parts in the position shown in Figure 18. This locks lower case second selector bars 229a and 230a against operation and allows second selector bars 229b and 230b to operate.

Shaft 331 is oscillated to cause the parts of the cap shift mechanism to return to normal position upon actuation of a drive bar after the cap shift mechanism has been set to lock out the second selector bars 229b and 230b so as to again place in unlocked position the lower case second selector bars 229b and 230b by means of each drive bar 100 having a projection 105 which serves the double purpose of receiving one end of tension spring 104 and also engaging a U-shaped bar 338 which is integral with shaft 331 so that when the next succeeding character is actuated its drive bar will engage the U-shaped bar 338 and oscillate shaft 331 in a clockwise direction in Figure 17 to depress the left hand end of latch bar 324 in Figure 18 and allow the bars 312 and 324 to return or move to the right in Figure 17 and assume the position shown in Figure 17. The spring 339 (see Figure 13) has one end secured to member 106 and the other end secured to the lever 320 secured on shaft 318.

*Connections between second and third selectors*

The hand blot out drive bar, the back spacer drive bar 100b, the carriage shift drive bar 100c, the cap shift drive bar 100d, each have associated therewith a first selector bar.

Each of the first selector bars associated with and operable by the above-named drive bars, has twelve projections on each side thereof which, when raised by actuation of these special drive bars, prevents actuation of all second selector bars.

It is to be noted that the normal position of the first selector bars is such as to cause the projections thereon to be disposed between the second selector bars and therefore, out of the path of travel of the projections on the second selector bars.

It is to be further noted that at all times, two thirds of all second selector bars are locked against operation by means of bars 253, 261, 291, and 300 which are the bars associated with the carriage shift and the cap shift mechanisms.

It is therefore evident that eight of the second selector bars are released for movement, provided the actuated first selector bar will permit such. It is therefore evident that the selection of the points on the first selector bars at which there is an absence of projections will determine which of the eight unlocked second selector bars are allowed to move. This predetermined arrangement of projections on the first selector bars and the absence of projections thereon, determines the number and the particular ones of the second selector bars which may move to move their transfer levers to allow movement of the parts in the twin third selectors, which in turn determine the amount of rotative movement to be transmitted to the indicator moving means.

Secured by any suitable means, such as welding to bars 230a, 230b and 230c are projections 340a, 340b and 340c, there being four sets of these projections, the top set being adapted to engage an upstanding portion 341 of a transfer lever 342 pivoted as at 343 in a slot in a bracket 344 secured to any suitable support such as the sidewall of the typewriter.

Upright portion 345 of lever 346 is adapted to engage the projections 340a, 340b and 340c one at a time on the next set 230a, 230b and 230c of second selector bars. The upright portion 347 of a transfer lever 348 is adapted to engage one at a time the projections 340a, 340b and 340c one at a time whereas upright portion 350 of transfer lever 351 is adapted to engage one at a time the projections on the lowermost set of second selector bars. These transverse bars are all mounted in the same manner as described for transfer lever 342.

The upper portion of bracket 344 has pivotally mounted therein as at 343a the four transfer levers 352, 353, 354 and 355. Lever 352 has an upstanding portion 352a adapted to loosely fit into cutaway portions 359 of the top set of second selector bars 229a, 229b and 229c.

The next transfer lever 353 immediately below 352 has an upstanding portion 353a which is likewise adapted to fit loosely into cutaway portions 359 in the next succeeding set of three second selector bars 229.

The next succeeding transfer lever 354 has an upstanding portion 354a which is adapted to loosely fit into cutaway portions 359 of the next succeeding set of three second selector bars.

The lowermost transfer lever 355 has an upstanding portion 355a which is adapted to fit loosely into the cutaway portions 359 of the lowermost set of three second selector bars.

It is evident that when any one of a set of three selector bars 229a, 229b and 229c or 230a, 230b and 230c are allowed to move upon actuation of a type bar that it will engage the transfer lever associated therewith and will move the same on its pivot 343 or 343a as the case may be. It is to be understood that only one in each set of three of the second selector bars will move at a time but several of the sets may have one of their second selector bars actuated depending upon the character and the measurement to be given to said character.

Each second selector bar moves the same distance, and the number allowed to move for a character is determined by the absence of projections on the first selector bars. Regardless of the number of second selector bars which are allowed to be actuated by their springs upon actuation of the type character it is evident that one end of transfer lever being moved the other end will also be moved in an opposite direction. These other ends of the transfer levers operate to set a pair of twin selectors to be presently described.

*The third selecting mechanism*

The twin third selectors are identical but one of the transmitting selectors, which hereinafter are referred to as the third selector transmits its setting, in large units, to a mechanism which will be moved in accordance with the measurement, whereas the other of the twin selectors transfers its setting in very small units to said mechanism to further move the same means moved by the first of the pair comprising the third selector. The combined movement imparted to the transmitting mechanism by the pair of twin selectors will move the indicating mechanism to indicate exactly the amount of space the actuated character will occupy in regular line printing.

Bracket 344 has secured thereto as at 360 a bar 361 (see Figure 4). Secured to bar 361 are comb like projections 362 and 363 (see Figures 12 and 21 to 27) which have slidably mounted therein sliding bars 364, 365, 366 and 367 which form the upper portion of the third selector mechanism. These bars are used for measuring in large units. In the lower portion of the combs 362 and 363 are similar sliding bars 368, 369, 370 and 371, these bars are identical in all respects except that they are opposite hand to the ones in the upper portion of the third selecting mechanism. Sliding bar 364 is slidably mounted in slot 373 in member 362 and also in slot 374 in member 363, likewise bar 365 is slidably mounted in slot 375 in member 362 and in slot 376 in member 363.

Likewise bar 367 is located in slots 377 and 378 and bar 367 is located in slots 379 and 380. The lower portion of comb 362 and 363 has the structure as shown in Figure 26 mounted therein. This is a portion of the twin third selector for transferring minute measurements. Sliding bar 368 is mounted in slots 381 and 382 and sliding bar 369 is mounted in slots 383 and 384 whereas sliding bar 370 is mounted in slots 385 and 386. Likewise the lower bar 371 is mounted in slots 387 and 388. Sliding bar 364 has a bracket 390 thereon which is adapted to be engaged by operating lever 391, which is loosely mounted on a shaft 392.

Fixedly mounted on shaft 392 is a bell crank having a portion 393 with a set screw 394 therein and also having a portion 395 having a roller 396 adapted to follow cam 397 on the main drive shaft 57. A tension spring 398 is secured to arm 391 and spring perch 399 causing roller 396 to follow cam 397. The lever 391 is a reset lever for resetting the parts to normal position after they have been operated, and which will be presently described.

On the lower side of bar 364 as seen in Figure 25 is disposed a pair of projections 400 and 401 and the end of the bar 364 nearest the observer in Figure 25 has a lateral projection 402. The projections on the lower faces of bars 374, 365, 366 and 367 which are not shown in Figure 25, are identical to the projections shown on the top faces of bars 368 to 370 inclusive in Figure 26, the two selectors are identical and like reference characters as to projections will apply.

Bar 365 has four projections 403, 404, 405 and 406 thereon forming a channel 407 in which is slidably mounted a transversely sliding member 408. Member 408 is disposed between slide members 364 and 365 and is normally contacted by arm 352 which transmits the movement of the second selector mechanism.

In the front side of member 408 is a pair of notches 408a and 408b which are adapted to receive the projections 400 and 401, which are integral with slide 365, when the movement is transmitted from the second selector mechanism to the twin third selecting mechanism.

Slide 364 is normally contacted by a rack member 409 which has adjustably secured on the rear end thereof a set screw 410 by means of which proper setting of the clutch face may be effected.

It is evident that when arm 352 pushes bar 408 inwardly, notches 408a and 408b will be directly opposite projections 400 and 401 and therefore any movement towards the rear of the typewriter of rack 409 will cause the slide 364 to move a like amount.

Rack 410 is normally pulled to the right in Figure 4 by a suitable spring 412 which is secured to spring perch 411. The right hand end of spring 412 is secured to another spring perch 399 which in turn is secured to member 361.

Another transverse member 413, similar in all respects to transverse member 408 just described, is mounted in channel way 414 in sliding member 366. This member 413 has a pair of notches 413a and 413b which are similar to notches 408a and 408b except they are twice the depth of notches 408a and 408b.

Notches 413a and 413b are disposed opposite projections 415 and 416 which are integral with the lower side of slide 365 when the transfer lever 353 is actuated to push transverse member 413 inwardly. It is evident that with this movement member 408 will allow the rack member 409 to move a distance corresponding to the depth of the notches 408a and 408b, and when both bars 408 and 413 are pushed inwardly, the rack member 409 will be allowed to move the combined amount or the combined distance of the depth of notches 408a and 408b and notches 413a and 413b. In other words, when projections 400 and 401 contact the back side of notches 408a and 408b, the bar 408 engages the projections 403 and 406 which in turn moves bar 365 until the projections 415 and 416 on the lower side thereof contact the back side of notches 413a and 413b. Should the upper bar 408 be pushed inwardly and the lower bar 413 not be actuated, then the projections 415 and 416 would not enter the notches 413a and 413b and therefore movement of slide 365 with relation to bar 413 would not occur.

Another bar 417 is disposed transversely of slide 367 and is adapted to slide in channelway 418. This bar 417 has notches 417a and 417b therein which are similar to the notches 413a and 413b in member 413 just described with the exception that they are twice the depth of notches 413a and 413b.

The lower side of bar 366 has projections 419 and 420 integral therewith which are disposed opposite notches 417a and 417b when lever 354 actuates the transverse slide 417. Disposed transversely of sliding bar 367 is bar 422 which is adapted to slide in 421 in block 423. Bar 422 is similar to the other bars just described and has notches 422a and 422b cut therein which are disposed opposite to projections 424 and 425 on the lower side of slide 367, when the transfer lever 355 actuates bar 422 and moves it away from the observer in Figure 24. Notches 422a and 422b are twice as deep as notches 417a and 417b. It is evident that if all of the bars should be pushed inwardly, namely, bars 408, 413, 417 and 422, to cause the notches therein to be disposed opposite respective projections that the maximum movement of rack 409 would be effected. Thus the contact of bar 408 against projections 403 and 406 will push slide 365 to the right as soon as the projections have entered their notches, and likewise the other slides would be moved to the right or toward the rear of the machine in a similar manner.

Sliding bar 366 has integral with the upper side thereof projections 427, 428, 429 and 430 forming channel 414 and likewise sliding bar 367 has projections 431, 432, 433 and 434 on the upper side thereof, forming channel 418. The lower portion of the twin selectors has slides 368, 369, 370 and 371 which are duplicates of slides 364 to 367 but of opposite hand.

The lower portion also has slides 449, 450, 451 and 452 which are duplicates of bars 422, 417, 413 and 408 respectively, but of opposite hand.

Slide 368 is slidably mounted in slots 381 and 382 in combs 362 and 363 respectively. Slide 369 is slidably mounted in slots 383 and 384. Slide 370 is slidably mounted in slots 387 and 388.

In the selector mechanism disposed in the lower half of the comb as shown in Figure 25, the bars 368 to 371 have already been described.

Block 423 is double faced and really combines two elements in one as one face cooperates with one of the twin selectors and the other face cooperates with the other of the twin selectors. The channel 421, previously described, is repeated on the opposite face thereof and bears like reference characters with the prime notation added. This block 423 is disposed between combs 362 and 363 by means of suitable screws penetrating the holes 446 and holes 447 in block 423. It has already been stated that notched bar 422 is mounted in slot 421. It is evident that in the other selector slidable bar 449 operates in slot 421', whereas slidable bar 450 operates in channel 418' and cooperates with projections 419' and 420'.

Transversely slidable bar 451 is mounted for sliding movement in channel 414' and cooperates with projections 415 and 416' on bar 370. Transversely slidable bar 452 is mounted for sliding movement in channel 407' and is adapted to cooperate with projections 400' and 401' on bar 371. The notches in bar 449, 450, 451 and 452 are identical to notches in bar 422, 417, 413 and 408 respectively and bear like reference characters with the prime notation added.

The bars 364 to 371 inclusive are mounted in the combs as previously described and the transversely disposed bars 408, 413, 417 and 422, 449, 450, 451 and 452 are disposed therebetween. The parts are held in slidable operative position in the combs 362 and 363 by the means of a pair of plates 453 and 454 secured in holes 455 and 456 by means of suitable screws penetrating holes 457 and 458 in the plates 453 and 454. This causes the ends of bars 408, 413, 417, 422, 449, 450, 451 and 452 to coincide with plungers 437, 438, 439, 440 and the other four plungers bearing like reference characters with prime notations added.

Each of these plungers 437 to 440 and 437' to 440' inclusive have springs 441, 442, 443 and 444 and 441' to 444' inclusive which normally press their respective plungers outwardly against the transverse or sliding members and return them to normal position after the tension has been removed from the bars 352 to 355 inclusive and bars 342, 346, 348 and 351 inclusive. A suitable spring plate 445 is secured to member 361 which limits the outward movement of the plungers 437 to 440 inclusive and 437' to 440' inclusive.

Projection 402 is adapted to rest immediately in front of projection 459 on bar 365 when viewed in Figure 25. The term "in front of" means in front as viewed by the observer in Figure 25, but in reality, as far as operating conditions are concerned it would really be in the back of the projections so that when bar 364 is moved away from the observer in Figure 25, it will return bar 365 to normal position.

Bar 365 has a down turned projection 460 as seen in Figure 25, which is adapted to fit in front of projection 461 on bar 366 for returning bar 366 to normal position when bars 364 and 365 are returned to normal position. Bar 366 has a downturned projection 462 which is adapted to fit in front of projection 463 as seen in Figure 25, to return bar 367 to normal position when the bars 364, 365 and 366 are returned to normal position. Bar 367 has a downturned projection 464 which serves no useful purpose whatever but this projection 464 is present on account of the fact that bars 365, 366 and 367 are duplicates and are therefore interchangeable and that is the only reason why projection 464 is present.

The bars 368, 369, 370 and 371 have projections similar to bars 367, 366, 365 and 364 respectively and bear like reference characters with prime notations added, and serve the same purpose as in the selectors shown in Figure 25.

By referring to Figure 11 it is seen that spring 412 has been described for operating rack 409 and moving it towards the observer in Figure 25, along with other slides of the selector which are allowed a predetermined amount of movement by the setting of the selector. A similar spring 465 is likewise mounted in the mechanism and secured to the rack 435 for operating the second portion of the third selector mechanism for transmitting minute movement of the indicating mechanism.

It has previously been stated that bar 364 has a portion 390 integral therewith which is engaged by lever 391 for resetting the upper half of the third selector to normal position as is shown in Figure 25, which lever is mounted on shaft 392. There is a similar lever 391' also mounted on shaft 392 and adapted to engage projection 390' on bar 371 for likewise returning the other half of the third selector to normal position. It has already been stated that shaft 392 has a lever 395 with roller 396 for following barrel cam 397, the lever 395 having integral therewith lever 393 with set screw 394 therein for moving the lever 391 loosely mounted on shaft 392.

On the lower end of shaft 392 is an identical arrangement, a portion of which is shown in Figure 12, and the parts bear like reference characters with the prime notation added, with the exception of lever 395 which is not necessary on the lower part of shaft 392, as the lever, as has been stated, is fixedly secured on shaft 392 and operates the levers 393' and 391' on the lower end of the shaft.

During the operation of the third selector the clutch faces 491 and 500 are in disengaged position from their respective clutch faces 495 and 501. In this position the third selector is being set ready for operation to move the clutch faces 491 and 500. This setting comprises movement of some of the bars 408, 413, 417, 422, 449, 450, 451 and 452. It is to be noted that the notches in these bars are in duplicate. One notch would be sufficient but they are made in duplicate to present a greater amount of wearing surface and to increase their life. The depth of the notches in bars 408 and 452 are sufficient to allow movement of clutch faces 500 and 491 respectively the distance of one tooth with relation to their companion operating faces 501 and 495, whereas, the depth of notches in bars 413 and 451 respectively, are twice as deep as in bars 408 and 413 and allow movement of clutch faces 500 and 491 respectively two teeth with relation to their companion clutch faces 501 and 495.

The notches in bars 417 and 450 are four times as deep as in bars 408 and 452 and allow movement of four teeth in clutch faces 500 and 491 respectively, whereas, the notches in bars 422 and 449 are eight times as deep as the notches in bars 408 and 452 and allow movement of clutch faces 500 and 491 to move eight teeth with relation to clutch faces 501 and 495 respectively. When certain of these bars have been moved and then the third selector is operated to move the racks 409 and 435, the clutch faces 500 and 491 being disengaged with their clutch faces 501 and 495 respectively immediately preceding movement of racks 409 and 435, it is therefore seen that permutations set up in the third selectors allows the clutch faces 500 and 491 to move a predetermined amount with relation to their companion clutch faces 501 and 495 before they are engaged to move their indicator operating mechanism.

*Indicator operating means*

Secured to the lower surface of bosses 470 and 471 by any suitable means such as screws 472 and 473 is a bar 474, the purpose of which is for supporting the clutching mechanism and the indicator shaft operated thereby, which is shown in elevation in Figures 5 and 30 and in section in Figures 11, 11a and 12, and shown in plan in Figure 4. Secured to the lower surface of bar 474, by any suitable means such as screws 475 and 476, is a bracket having a downwardly projecting portion 477, a horizontally disposed portion 478 and a vertically disposed portion 479 which serve to support the indicator clutch mechanism and indicator shaft operating mechanism, to be presently described.

By observing Figure 5 it is seen that the girder bar 361 for supporting the twin third selector mechanism is secured to portion 477 by means of stud bolt 480. The downwardly projecting portion 477 has guide projections 481 and 482 having dove-tailed guides therein for reception of rack bars 409 and 435. The ends of these dove-tailed guides nearest the observer in Figure 5, are closed by means of blocks 483 and 484, having set screws 485 and 486 therein whereby the movement of said rack bars 409 and 435 in a left-hand direction in Figure 12 can be adjusted.

The means for receiving measurement transmitted through the third selector and transmitting it to the indicator moving means is shown in elevation in Figures 5 and 30 and in section in Figures 11, 11a and 12. The registering mechanism adapted to be moved by the third selectors comprises a shaft 487 secured by set screw 488 in bar 474. This shaft 487 is also supported by penetrating portion 478. Shaft 487 has loosely mounted thereon and supported by portion 478, a sleeve 489 and loosely mounted on sleeve 489 is a pinion 490 having fixedly secured on one end thereof a clutch faced disk 491. The hub of pinion 490 has a peripheral groove 492 therein adapted to be engaged by the free end of a forked lever 493 fixedly secured on a shaft 494 slidably mounted in portions 474 and 478. The shaft 494 will be presently described in detail but it may here be stated that this shaft is moved endwise for disengaging the clutch faces.

Loosely mounted on shaft 487 is a clutch faced disk 495 which has integral therewith around the periphery thereof a ratchet wheel 496 and also fixedly secured on one end of the hub of said clutch faced disk is a pinion 497. In Figures 5, 12 and 30 the clutch faced disks 491 and 495 are shown in engaged position.

Loosely mounted on the lower end of shaft 487 is a sleeve 498 which has rotatably mounted thereon a pinion 499, which has fixedly secured on one end of the hub portion thereof a clutch faced disk 500 which is adapted to engage a clutch faced disk 501 having a ratchet wheel 502 integral therewith. Fixedly secured on the upper end of the hub portion of 501 is a pinion 503.

The parts just described, disposed below the portion 478 are held in position by means of a nut 504 secured on the lower end of shaft 487. Pinion 499 has a peripheral groove 505 in the lower end of the hub portion thereof which is adapted to be engaged by the forked end of a lever 506 and is similar in all respects to lever 493, being fixed on the lower end of slidable shaft 494. The pinion 499 is adapted to engage rack 435.

Secured on shaft 494 by any suitable means such as a pin 507 is a cuff 508 (Figures 6 and 11). The cuff 508 has a circumferential groove therein into which the forked end of a lever 509 is adapted to loosely fit for raising and lowering shaft 494.

Mounted in portions 474 and 478, as will be seen in Figures 4 and 6, is an oscillatable shaft 510 which has mounted thereon a pair of dogs 511 and 512, adapted to engage respectively the ratchet wheels 496 and 502.

The upper end of shaft 510 has fixedly secured thereon a lever 513 normally moved by spring 514 secured thereto at one end and to spring perch 515 at the other end, (see Figure 4), which normally holds the dogs 511 and 512 in engagement with the ratchet wheels 496 and 502.

Also secured to lever 513 is a link 516 whose other end is secured to the upper end of a bell crank lever 517, pivoted as at 518. The horizontally disposed portion of said bell crank lever, as seen in Figure 5, is engaged by a set screw 519 disposed in the free end of lever 520 pivoted as at 521 in projection 531 on bar 474 and having in its other end a roller 522 adapted to follow a cam 523 on main drive shaft 57. This cam 523 has a high portion 524 so that when roller 522 is disposed on high portion 524 of cam 523 the dogs 511 and 512 will be disengaged from ratchet wheels 496 and 502.

In Figure 6, the left hand portion of lever 509 is shown and in Figure 5 the right hand portion is shown, the intermediate portion being broken away for sake of clearness. The lever 509 is pivoted as at 525 on bar 474 and the right hand end thereof is normally pulled downwardly by a tension spring 526 having its lower end secured to a bracket 527. The right hand end, as seen in Figure 5, of lever 509 is adapted to be engaged by a set screw 528 in lever 529 pivoted intermediate its ends as at 521 in a downwardly projecting portion 531 extending from member 474.

The front end of lever 529 or the left hand end thereof as seen in Figure 35 has a roller 532 therein adapted to follow a cam 523 having a high portion 533 and secured on main drive shaft 57.

When the roller 532 is on the high portion 533 of cam 523 it will move the right hand end of lever 509 as seen in Figure 5 upwardly, and will therefore move the left hand portion as seen in Figure 6 downwardly and will therefore cause the clutch face members 491 and 500 to disengage from their cooperating clutch faced members 495 and 501. The means whereby the dogs 511 and 512 can be disengaged from the ratchets and the means whereby the clutch faces can be disengaged from the ratchets and the means whereby the clutch faces can be disengaged from each other has been described. It is to be noted that these operations take place at different times or alternately.

After the indication of the amount of space a character will occupy in regular line printing has been indicated by the indicating mechanism to be hereinafter described, it is necessary to operate both the dogs and the clutch faces to release the same to allow the means for moving the indicator to return to normal position and in order to bring about this simultaneous operation it is to be noted in Figure 5 that a shaft 534 is mounted for oscillation in portion 479 and in portion 535 extending downwardly from bar 474.

This shaft has thereon a lever 536, shown in section in Figure 36 and in elevation in Figure 35, which is adapted to engage the lower side of both levers 520 and 529 to move the rear ends thereof downwardly and to release simultaneously the dogs from the ratchet wheels and the clutch faces from engagement from each other. This performs simultaneously a similar function performed by the high portions 524 and 533 on cam 523, because it is evident that when the shaft 534 is oscillated that the rollers 521 and 532 will be moved away from the low portion of their cam surfaces. The shaft 534 has fixedly secured thereon a lever 537 to the lower end of which is pivoted as at 538 a link head 539 to which is adjustably secured a link 541. The link 541 and the parts operated thereby, are actuated upon actuation of the carriage return mechanism to allow the indicator to return to starting position and at the same time the carriage is returned.

The operating means for link 541 will be described hereafter in connection with the carriage return mechanism.

Meshing with pinion 497, is a pinion 550 having twice the number of teeth thereon as pinion 497. This pinion is fixedly mounted on a drum 551 by having a boss thereon projecting on the inside and forming a tight fit with the inside surface of the drum. The pinion 550 has integral therewith a bearing portion 552 which is rotatably mounted in boss 553 on member 474.

Drum 551 has fixedly secured in the other end thereof a disk member 554 which has a hub portion on the exterior thereof which rotatably engages a hole in member 478. The disk 554 has a centrally disposed hole therein which is not threaded, whereby disk 554 is rotatably mounted on a worm 555.

Rotatably mounted in pinion 550 is an indicator operating shaft 556. The lower portion of indicator shaft 556 has fixedly secured thereon, by means of a pin 557, an indicator shaft lever 558. Indicator shaft lever 558 has a screw 559 in the outer end thereof which confines a roller 560 which is adapted to have movement in a helical slot 561 in drum 551.

The upper end of worm 555 has a disk like portion 562 thereon whereby one end of the worm can be loosely confined to indicator shaft lever by means of a plate 563 fitting therebelow and secured in position by means of a screw 564. Disposed immediately below bearing portion 478 is a pinion 565 which has a downwardly extending hub threaded on the inside to threadably engage the worm 555.

The hub of pinion 565 is rotatably mounted in bracket 527. Fixedly secured on the lower end of the hub of pinion 565 is a flanged pulley 566 which is adapted to have wound therearound a cord or cable 567, one end of the cord or cable being secured to the flanged pulley 566 and the other end of the cord is secured to a larger flanged pulley 568 and wound therearound, which latter pulley has a conventional spring therein, not shown, for causing the portion of the pulley 568 nearest the observer in Figure 5 to move to the right in Figure 5. The pulley is rotatably mounted on a shaft 569 secured in bracket 527 whereas one end of the spring enclosed within the pulley is secured to the pulley and the other end of the spring is secured to the shaft 569, which is a conventional structure and which is not shown in the drawings.

The lower end of worm 555 is secured to a bar 570 which has a pair of pins 571 and 572 secured thereto, pin 572 slidably projecting through suitable holes in portions 527 and 478 for supporting the same. Pin 571 where it slidably projects through a hole in bracket 527 is adapted to engage a stop plate 573 secured on the side of pinion 565.

Pin 571 is moved out of the path of stop plate 573 when the worm is moved downwardly and when the parts are returned to normal position after the indicator has been operated to indicate the length of line and when a new line is to be started by the typewriter and upward movement of worm 555 carries with it the pin 571 and causes it to move into the path of stop plate 583 and to stop the rotation of pinion 565. This causes the pinion 565 to stop in a proper position to cause the worm to be in elevated position as shown in Figure 11 so that it will be in proper position for the beginning of measuring of the characters forming another line of characters to be written by actuation of the typewriter.

Pinion 550, (see Figures 30, 31, 32 and 33), has a stop plate 575 thereon. A V-shaped bell crank lever comprising portions 576 and 577 is pivotally mounted on a shoulder screw 578. On the larger portion of shoulder screw 578 a plate 579 is slidably mounted which has a pin 580 therein which slidably penetrates a suitable hole in member 474.

A compression spring 581 surrounds shoulder screw 578 for applying pressure to plate 579 which in turn applies pressure to the V-shaped bell crank lever at its hub portion to frictionally hold the same to whatever position it may be moved.

The bell crank lever comprising portions 576 and 577, in connection with stop plate 575, is adapted to stop pinion 550 in the proper position when the indicating mechanism is moved to beginning position after a line has been written on the typewriter and the carriage return has been operated and the platen has been shifted to a new line position so that the parts will be in proper position for the beginning of measurement and indication of another line to be written by the typewriter.

In Figures 32 and 33 it will be observed that the pinion 550, during the indication of a line of written characters, will move in a clockwise direction. When the pinion 550 has made almost a complete revolution the leading edge of the stop plate 575 will pass beneath the portion 576 of the bell crank lever and raise the same. This will cause the portion 577 to move inwardly and the portion 576 will be moved out of a path of the stop plate 575.

In Figure 33 the parts are shown in the position at the beginning of a line, whereas in Figure 32, the parts are shown when the pinion 550 has made almost a complete revolution. It is seen that further clockwise movement of pinion 550 for approximately two-thirds of another revolution would cause the stop plate 575 to engage the end of the portion 577 of the bell crank lever, but this will not ordinarily occur because this amount of measurement will not be required in the writing of a line of characters for typesetting and the like.

Let us assume that during the writing of a line of characters that the pinion 550 should be moved slightly more than a complete revolution. The bell cranks 576 and 577 would be held frictionally in the position shown in Figure 32. When the mechanism is reset to initial position the pinion 550 would begin rotating in a counter-clockwise direction in Figures 32 and 33 and its trailing edge, which now becomes its leading edge, would strike portion 577 of the bell crank lever and move it to the left in Figure 32 which would pull the portion 575 down to the position shown in Figure 33 and further counter-clockwise movement of pinion 550 would cause the blunt end of the stop plate to engage the end of portion 576 of bell crank lever and the parts would stop in the position shown in Figure 33 ready for the beginning of indicating the measurement of characters in another line to be written by the typewriter.

The returning to starting position of the parts of the registering and clutch face mechanism and the indicator operating drum will be effected by mechanism associated with the indicator per se and will be presently described. The return of parts to normal position of the mechanism disposed below bar 478 is effected by pulley 568 which has already been described.

Indicator shaft 556 may be in one portion but in the drawings it is shown as having connected to the upper end thereof an auxiliary shaft 556a which is joined to the upper end of shaft 556 by means of a collar 582 having a pair of set screws 583 and 584. The upper end of shaft 556a has a cross member 585 secured therein which is adapted to operate in a vertically disposed slot 586 in a clutch coupling 587 fixedly secured as at 588 to a shaft 589. Shaft 589 is rotatably mounted in the bottom plate 590 of indicator housing having front sidewall 591 and top portion 592 and intermediate plate 593. A flanged pulley 594 is fixedly secured on shaft 589 and has a cord 595 which is wound around a tension pulley 596 rotatably mounted on bolt 597 and having disposed therein, but not shown, a suitable spring which has one end secured to bolt 597 and the other secured to the interior of pulley 596, the structure of this pulley not being shown as it is conventional. The upper end of shaft 589 is rotatably mounted in a plate 598 and immediately above plate 598 there is secured to the upper end of shaft 589 a hub 599 of a pinion 600 and the upper end of said pinion has a portion 599a which projects above and slidably and rotatably penetrates the top cover plate 592 of the indicator housing. Rigidly mounted in intermediate plate 593 are bolts 601 and 601a which slidably penetrate the lower plate 590 and have nuts 602 thereon.

Disposed around bolts 601 and 601a are compression springs 604 and 605. The purpose of this arrangement is to allow the rack bar 608 to be released from its operating means leaving it free to be moved when it is desired to set the indicator for lines of different lengths. This permits the indicator to indicate properly for whatever length of line the particular newspaper has. Fixedly secured on intermediate plate 593 is a bar 607 having a groove in the front face thereof in which rollers 609 and 610 on rack bar 608 are adapted to have movement. The rack bar has teeth on its front edge adapted to engage pinion 600.

Secured to intermediate bar 593 is a bar 613 which has a groove in the rear face thereof in which rollers 611 and 612 are adapted to have movement.

Top plate 592 has a window therein which is covered by a transparent plate such as glass 617, enclosed within a framework 618, secured to the top plate 592. Secured to each end of the upwardly projection portion of top plate 592 and resting against bar 607 is a plate 619 having a slot 620 in the left hand upper portion in which a projection 621 is adapted to have movement (see Figure 1).

Another supporting member 622 is provided similar in all respects to 621 except that it does not project outwardly through the slot in member 619. These members 621 and 622 support a chart bearing plate 623 having indications 624 thereon in "ems", it is seen that by pressing downwardly on portion 599a that pinion 600 can be moved out of engagement with rack bar 608 and by seizing member 621 the chart bearing plate 623 can be set at whatever starting point it is desired.

In Figure 5 the heavy line 625 on the transparent plate 617 is in a position to indicate 12 "ems" in case a control sheet should be prepared for a newspaper having a twelve "em" width column. In case a sixteen "em" line, for example, should be desired to be set then of course the chart bearing member 623 would be moved to cause the graduation of 16 to appear behind the line 625 on the transparent plate 617. The teeth on rack 608 are cut twelve teeth to the inch to allow the indicator to be set at "em" or one half "em" indications on the scale, as six "ems" is approximately one inch.

In seven point type having number 2 face the matrices representing the characters vary in thickness from approximately .032 of an inch to .124 of an inch. To measure a character of say .063 of an inch, bar 417 would be actuated allowing its companion bar 366 to move carrying with it in a body bars 413, 365, 408 and 364 to move the rack carried thereby. This would be one typical operation of the first half of the third selector which measures in large units. We still have .003 additional measurement because bars 417 and 366 would give .060 movement to rack bar 608. And in order to secure this .003 of an inch measurement, bars 452 and 451 in the second selector would be moved to allow bars 371 and 370 to be moved. The movement allowed between bars 452 and 371 is .015" whereas the allowed movement between bars 451 and 370 is .030" making a total of .045". Due to the peculiar arrangement of these bars actuating a worm, instead of the barrel, there would be imparted to barrel 551 1/15 of the actual measurement, which would give us the .003" which added to the .060 would give us the desired .063" movement in indicator rack bar 608. Thus we see that barrel 551 would be operated by one half of the third selectors to give a .060" measurement whereas the worm 555 would be moved downwardly to cause the roller 559 to follow groove 561 to slightly rotate indicator shaft 556 which would give the .003" additional measurement transmitted to the indicator.

In speaking of measurements in thousandths of inches, I mean the indicator rack bar 608 is allowed this movement on account of movement of portions of the twin third selectors and indicator moving means actuated thereby.

The third selector, as previously stated, carries two different units, the upper portion for large measurement and the lower portion for minute measurements for operation on the worm 555. The amount of movement allowed between bars 364 and 408 moves rack bar 608 .015" and the movement between bars 365 and 413 moves 608 .030" and the movement between bars 366 and 411 moves 608 .060" and the movement allowed between bars 367 and 422 moves 608 .120" which would give a total of .225 inch movement to 608 from the upper half of the third selector. This portion of the third selector is capable of moving indicator rack bar 608 a total of .225", but in actuality the third selector racks move enough to move the indicator rack bar 608 twice this amount but the measurement is stepped down one half by the indicator operating pinion, 600 being one half the circumference of pinion 550.

The lower half of the third selector delivers the same amount of movement to its rack 435 as the top half of the selector but the top half of the selector operates directly onto pinion 550 driving barrel 551 whereas the lower half of the selector operates indirectly on the indicating operating shaft 556 because it moves downwardly instead of imparting direct rotation to the shaft 556 as this rotation is imparted indirectly through the lowering of 555 to cause roller 559 to follow slot 561 in barrel 551 and thus only 1/30 of the actual movement of the lower half of the third selector is transmitted to the shaft 556. It would be 1/15 but pinion 565 being twice as large as pinion 503, reduces the measurement one-half.

The unit of measurement of characters by the third selectors and the indicator rack bar and the means for moving the rack bar 608 in accordance with the movement of the third selectors is .015", which unit is employed to diminish as low as possible the length of space traveled by rack bars 409 and 435 and yet not be too low to interfere with cost of manufacture of parts, and at the same time permits the clutch face teeth in clutch faces 491, 495, 500 and 501 to be coarse enough to be of proper strength so as to have long-life and maximum tolerance.

The clutch face teeth in clutch faces 491, 495, 500 and 501, are disposed radially around their clutch faces and the distance from the center of one tooth to the center of the proximate teeth is such that when clutch faces 500 and 491 after having been moved by the third selectors while disengaged from the clutch faces 501 and 495, are allowed to engage clutch faces 501 and 495, in centering, will not in the centering operation advance or move backwardly the clutch faces 501 and 495 enough to affect the combined movement imparted to indicator rack bar 608 through clutch face 495 as much as .015" or through clutch face 501 as much as .001".

*Automatic blot-out*

In the typewriter two blot-out key levers with keys thereon are provided, one of them being connected to a blot-out type bar. There is also provided an automatic blot-out type bar which has a blank key on the key board which cannot actuate its type bar as it has no clutch tripping mechanism, (see Figure 39).

When it is desired to blot out a character and actuate the automatic blot out, a special lever will be actuated to cause the striking bail to actuate the automatic blot out type bar regardless of the key bar depressed by the operator to blot out the desired character and subtract from the indicator the amount of space such blotted out character will occupy in the line. The type bar for blotting out, which is actuated by what is to be referred to as the manual blot out key lever does not subtract the space occupied by the blotted out character from the indicator but the automatic blot out does subtract the space occupied by the character from the indicator by a reversal of the means for moving the indicator mechanism.

The manual blot out would be operated usually to blot out the first character in a line to cause the scanning mechanism to automatically skip the entire line and not scan the same. In all other cases where a typographical error occurs in the writing of a line, or when the line is overset and it is desired to blot out the typographical error or overset portion to rewrite the misspelled word or shorten the line, then the automatic blot out would be employed for subtracting the space such blotted out characters occupy from the indicated space so that the words can be written properly and its measurement again transmitted to the indicating mechanism and thus the line can be completed to a proper length even though it should be necessary to blot an entire word or more on account of misspelling in the preparation of the control sheet.

In case a line is overset and has too many characters therein for a line of type on a typesetting machine and the like, then the automatic blot out would be employed to blot out a certain portion at the end of the line which would automatically subtract the measurement occupied by the blotted out characters from the indicator to cause the indicator to indicate the exact amount of space occupied by the unblotted out characters in the line. It might also be stated that when the line is overset that the carriage return operation cannot be effected on account of certain mechanism to be hereinafter described.

Let us suppose that near the end of a line the typist starts writing the word "which" and when the word is written, it is discovered that the line is overset and the last word must be blotted out or suppose intermediate the ends of a line a misspelling occurs. The operator back spaces to the first character in the word and then moves the automatic blot out lever. Then the keys representing the characters to be blotted out are actuated in succession. Instead of these typebars being actuated, the automatic blot out type bar is actuated but the measurements of the characters represented by the actuated key bars are taken and subtracted from the indicator as will be hereafter explained.

Attention is called to the fact that certain key levers may be actuated with their corresponding drive bars and no measurements will be taken by the various selecting mechanisms. Key levers and drive bars such as for operating the cap shift, carriage shift, back spacer and hand blot out are examples. It is evident that means must be provided to prevent measurements of these special key bars from being taken. Therefore each of these drive bars has a first selector bar associated therewith each of which has twelve projections on each side thereof so as to completely lock the second selector bars from operation when said drive bars are operated and thus preventing any measurement from being imparted to the mechanism.

In order to operate the automatic blot-out, a lever 630 (Figure 1) is fixedly secured to shaft 631 sidewall 11. On the inside of sidewall 11 another lever 632 is fixedly secured to shaft 631 and has horizontally projecting links 633, 634, 635 and 636 pivotally connected thereto. The right hand portion of link 633, as seen in Figure 20, is fixedly secured to the lower end of lever 638, said lever 638 being fixedly secured at its upper end to shaft 639. Shaft 639 is rotatably secured in blocks 640 and 641, which are secured to base plate 89 by means of screws 643 and 644, which penetrate the blocks 640 and 641 and are also threadably secured in plate 89. Base plate 89 is secured to sidewall members 10 and 11 by any suitable means such as screws 646 and 645 respectively.

Endwise movement of shaft 639 in one direction is prevented by a suitable collar 647, fixedly secured thereon adjacent to block 640 and the shaft 639 is likewise secured against endwise movement in the other direction by means of lever 648 which is loosely mounted thereon, and confined against endwise movement by a suitable cotter pin 649 penetrating the shaft. Lever 648 is shown in elevation in Figure 42 and has several uses which will presently be described.

Shaft 639 has fixedly secured thereon a lever 650 (Figure 39) which projects downwardly and in operation is adapted to engage one arm 651 of a suitable bell crank which is pivoted as at 652 in bearing 653. Bearing 653 is secured to base plate 89 by any suitable means such as screws 654 as shown in Figure 9. The left hand portion, see Figure 39, has a bell crank 655, which rests on the upper side of automatic blot out key lever 80a.

Automatic blot out key lever 80a is mounted in the same manner as key levers in key lever comb 84 and has a spring 86 for holding the same in mounted position as has been previously described with relation to the other key levers. It is to be noted however, that automatic blot out key lever 80a does not have the pivoted member 92 thereon as in the conventional key lever, but has a lug 656 secured thereto having a cam face disposed towards the rear of the typewriter, which is adapted to engage a lug 657 having a cam face on the front portion thereof.

The lug 657 is secured to automatic blot out drive bar 100a. Automatic blot out drive bar 100a is mounted similarly to the other drive bars but is different therefrom in two respects; firstly, the front end thereof, as will be noticed in Figure 39, is cut away thus causing it to fail to project over the clutch trip bail 111, so that when it is pressed downwardly it will not trip the clutch; secondly, the drive bar 100a instead of having a projection for engaging one of the adjustable pins 157, has mounted immediately in the rear of this projection a U-shaped cuff 658 adapted to slidably receive adjustable pin 659 mounted in bar 158. It is to be noted that pins 157 slidably penetrate suitable holes in angle member 182, but pin 659 instead of penetrating a hole in said angle member 182, penetrates a slot 660 having an open upper end, so that when the bar 182 is moved downwardly to move pins 157 out of the path of the drive bars this operation will not remove pin 659 from the path of drive bar 100a because the open end of the slot will allow the angle bar 182 to move downwardly without carrying pin 659 therewith, for pin 659 is supported in the U-shaped cuff 658 so that upon actuation of the striking bail 124 the automatic blot out type bar will be operated. The blot-out type bar and the links for operating the same are identical to the other type bars previously described except of course that it has a blot out character thereon and no legible character.

With the parts in the position as described and it is desired to blot out a character, the key lever representing the character will be depressed and will cause its respective drive bar to engage the striking bail and be operated at the same time as automatic blot out drive bar 100a is operated and the measurement of the drive bar for the particular character desired to be blotted out will be registered in the first, second and third selectors but its measurement will be transmitted to the indicating mechanism in reverse order as will be presently described.

It is to be noted that the rear end of special automatic blot out drive bar 100a does not have any first selector bar for operation, therefore, it need not have the hooked formation at the rear end thereof as drive bars 100 have. It will be noted in Figure 4 that a space 203 is shown in the first selector bars, denoting the absence of a first selector bar at that point. This is the point in the first selector mechanism at which the rear end of automatic blot out drive bar is disposed.

It has previously been described that the lower end of lever 185 has two notches therein, (see Figures 12 and 20) pin 188 normally resting in notch 186, to hold the parts in the position shown in Figures 12, 20, 39 and 40, but when the lever 185 is moved in a counter-clockwise direction in Figure 20 to cause pin 188 to rest in cavity 187, then the adjustable pins 157 will be in lowered position as previously described.

This operation of lever 185 of course is effected through link 192 as shown in Figure 20 upon movement of lever 632 in a counter-clockwise direction upon manipulation of the automatic blot out lever 630 as has been described. Lever 632 upon actuation of automatic blot-out lever being actuated in a counter-clockwise direction as shown in Figure 20, of course moves link 634 to the left in Figure 20. This will move a bell crank lever 661 in a counter-clockwise direction as shown in Figure 40. Lever 661 is pivoted as at 662 on horizontally disposed bar 474. The other end of bell crank 661 has pivotally secured thereto as at 663 an end link 664 to which is adjustably secured a link 665 whose other end is pivotally secured as at 666 intermediate the ends of lever 667 pivoted at one end as at 668 on bar 474. The other end of lever 667 has a roller thereon adapted normally to occupy a position between flanges 670 and 671 on the elongated cam 523. Movement of lever 667 upon movement of automatic blot out lever as above described, of course will shift cam 523 to the left in Figures 40 and 27.

It is to be noted that cam 523 has in the left hand end thereof, in Figures 27 and 40, a slot 672 and cooperating with this slot 672 is a collar 673 secured on main drive shaft 57, and having a pair of tongues on opposed sides of the shaft which are adapted to fit into slot 672 and has sliding movement with relation thereto when cam 523 is moved on shaft 57. The collar 673 is fixedly secured on shaft 57.

It is therefore seen that upon actuation of automatic blot out lever that lever 667 through the means heretofore described will be shifted to the left in Figures 40 and 27, and this will of course shift cam 523 to the left and will cause roller 532 to be engaged by high spot 540 on cam 523 and will cause roller 521 to be engaged by high spot 524 on cam 523. This will reverse the sequence of operation of the clutch faces and dogs engaging ratchet wheels in the indicator moving mechanism and will cause backward movement of the indicating mechanism to subtract from the space indicated the space occupied by the blotted out characters.

This subtraction of measurement is effected on account of the fact that instead of the clutch faces being moved while in disengaged position as they normally are, the clutch faces will be moved in engaged position with the dogs released from the ratchets and therefore backward movement of the indicating mechanism will be effected to subtract therefrom the space occupied by the blotted out characters.

*The overset line mechanism*

The right hand end of rack bar 608, in Figure 5, is adaptd to engage a set screw 674 when the line lacks one-half inch of being a complete line. During the setting of succeeding characters, to fill out the remaining one-half inch of the line, the rack bar 608 moves the upper end of lever 675 to the right and the lower end thereof to the left in Figure 5.

The lever 675 is fixed on the front end of the shaft 676 rotatably mounted in a bearing 677 in post 16 of the typewriter and on the rear end of said shaft 676, there is a lever 678 having pivotally connected thereto an end link 679 having adjustably secured thereto a link 680. Link 680 has the lower end thereof shown in Figure 37 and has an end link 681 on the lower end thereof having a slot 682 therein in which shoulder screw 683 is adapted to have movement. Shoulder screw 683 has disposed therearound a spring perch 684 having a tension spring 685 connected thereto, the other end of the tension spring being connected as at 686 to the end link 681.

Shoulder screw 683 is secured in one end of a bell crank lever 687 pivoted on shoulder screw 688 mounted in the sidewall 10 of the typewriter. The other end of bell crank lever 687 is forked and is adapted to receive a pin 689 secured in a sliding plate 690 having slots 691 therein in which shoulder screws 692 are mounted for supporting the plate for sliding movement, said shoulder screws being threadably embedded in the sidewall 10 of the typewriter.

To the right hand end of sliding plate 690 as shown in Figure 37, there is pivotally secured as at 693 an end link 694 and to this end link there is adjustably secured a link 695 having end link 696 secured thereto.

End link 696 has a slot 697 in the end thereof adapted to receive a shoulder bolt 698 mounted in the lower end of a lever 699 secured on a transversely disposed shaft 700 this being the blot out clutch reset shaft. Shaft 700, (Figures 12 and 20), has thereon a lever 701 whose free end is pivotally connected to one end of link 635 which has previously been described as being connected to lever 632 which is operated upon actuation of the automatic blot out lever 630.

Shaft 700 is mounted for oscillation at its ends on pivot screws 702 and 703 secured in sidewalls 10 and 11 of the typewriter respectively. During the setting of the last half-inch of a line it will be observed that on account of clock-wise movement of lever 675 and also clock-wise movement of lever 678 that link 680 will be moved upwardly in Figure 5. By now observing Figure 37, and noting that link 680 will be moved upwardly it is therefore seen that tension spring 685 will rotate bell crank lever 683 in a counter-clockwise direction which will cause the sliding plate 690 to be moved to the right in Figure 37, which will cause slot 697 and end link 696 to advance to the right in Figure 37 and will cause the left hand end of slot 697 to engage shoulder bolt 698.

If the plate 690 has been moved to the right and lever 121 is disengaged from end of latch 73 at the time the automatic blot out lever 620 is operated it is therefore seen that when the automatic blot out lever 630 is actuated that it will reset the parts to the position shown in Figure 37 if at the time they should be in unset position by being moved to the right in Figure 37.

Space band mechanism

Associated with the typewriter are means for counting the number of space bands in a line and means also operated in connection with the space band counting means for determining if the space bands in a line have sufficient expansibility to fill the line. The typewriter is practically immune from operation to prepare a control sheet having overcrowded lines or lines not of sufficient length as it is impossible to operate the carriage return mechanism and to advance the control sheet to new line position if the line is of insufficient length or is overcrowded so that it cannot be reproduced in a typesetting machine into which the control sheet is placed.

The means for controlling the carriage return, the means for counting the number of space bands in a line, the means for determining if the space bands in a line have sufficient expansibility to fill the line, the means for automatically adding extra spaces, and the means preventing the return of the carriage mechanism when the line written on the control sheet is of improper length for a line of type are all interconnected and cooperate with each other. A major part of these interconnected mechanisms are disposed immediately to the rear of the key board of the typewriter and will be seen in elevation in Figure 5, in top plan in Figure 9, sectional views being shown thereof in Figures 10, 11, 42, 43, 44, 45 and 46.

Plate 89, which has been previously described as serving for limiting the upward movement of the key levers 80 has mounted thereon bearings 640 and 641 which have previously been described. There is also disposed on plate 89 a centrally disposed bearing 704. Penetrating suitable slots 641 and 704 and slidably mounted therein is a bar 705, said bar having pivotally connected thereto as at 706 a link 707 which is pivoted as at 708 to the lower end of lever 675. The right hand end of bar 705 has an upturned projection 709. Centrally disposed on bar 705 is a bracket 710 which projects beneath and laterally of bar 705 and presents what is termed a sliding block portion 711. This block 711 determines as to whether or not the carriage return mechanism can be operated and which will presently be described.

A lug 712 is fixed on bar 705 and projects upwardly and has secured thereto one end of tension spring 713, the other end of tension spring being secured to the bearing blocks 641 to normally move bar 705 to the right in Figure 5, which right hand movement of bar 705 is limited by a projection 714 on the left hand end thereof which engages block 704.

Pivotally mounted as at 715 in bearing 640 is one end of a bar 716, said bar having a bracket 717 secured intermediate its ends. Bracket 717 has a backwardly projecting lower end for slidably supporting link 718. Link 718 has a dog 720 pivotally secured on its right hand end as at 721, said dog being normally pulled in a clockwise direction (Figure 43) by means of a tension spring 722. Adapted to have sliding engagement with the upper edge of link 718 is a downwardly projecting portion 723 on the lower edge of bar 716. Bar 716 projects through a slot 724 in bearing block 641. A plate 719 is secured to the top of block 641 by means of screws 719a and this plate limits the upward movement of the bar 716 in slot 724. Bar 716 also has pivoted as at 725 a latch finger 726, having an inturned hooked portion 727 on the lower end thereof adapted to be engaged by pin 728 on carriage return key lever 729.

Key lever 729 has a key 730 thereon disposed in the key board. Key lever 729 is similar to the other key levers and is mounted in a similar manner as shown in Figure 42 but key lever 729 does not have any projection for actuating an associated drive bar and does not therefore actuate any character on any of the type bars and does not move the indicator mechanism.

It will be noted by referring to Figures 12, 13, 42, 43 and 46 that plates 771, 772 and 773 are disposed beneath blocks 640, 641 and 704 respectively and rest upon plate 89. Plates 771, 772 and 773 support blocks 640, 641 and 704 in elevated position and allow parts 711, 751, 803 and 804 to have sliding movement between plate 89 and bars 705 and 742.

Hook 726 has projecting forwardly therefrom two projections 731 and 732. Hook 726 is normally pulled in a clock-wise direction by means of tension spring 733 having one end secured to projection 731 on the hook 726 and the other end secured to bearing block 641. The lower projection 732 on hook 726 normally rests in a cutaway portion on the lower edge of the right hand end of bar 705, and tension spring 713 being stronger than tension spring 733 causes bar 705 to pull the mechanism to the position shown in Figures 5 and 43.

The left hand end of bar 718 is pivotally connected as at 734 to the lower end of a lever 735 whose upper end is pivotally mounted on shoulder screw 736 secured in bracket 737. At a predemined point intermediate the ends of lever 735 there is pivotally mounted as at 738 a link 739 which is pivotally connected as at 740 to an upstanding projection 741 on space band rack bar 742.

Space band rack bar 742 is slidably mounted in suitable vertically disposed slots in bearing blocks 704 and 640. The front edge of space band rack bar 742 has two sets of ratchet teeth 743 and 744. Ratchet teeth 744 are adapted to be engaged by a dog 746 pivotally mounted on plate 89 by any suitable means such as shoulder screw 747. Dog 746 is normally held in engagement with ratchet teeth 744 by means of a tension spring 748 secured to the dog and to plate 89. Ratchet teeth 743 are adapted to be normally engaged by a dog 749 pivoted by any suitable means such as shoulder screw 750 on the portion 751 of a bell crank lever mounted on plate 89 by any suitable means such as shoulder screw 752 and having another portion 753. The dog 749 is normally held in engagement with ratchet teeth 743 by means of a tension spring 754 having one end secured to the dog and the other to plate 89.

Portion 753 of the bell crank lever is normally moved in a clockwise direction in Figure 9 by a tension spring 759 having its other end secured to plate 89. The portion 753 is adapted to be engaged by a lever 755 fixedly secured on oscillatable shaft 756 having its ends mounted in bearing blocks 640 and 641. On the right hand end of shaft 756 there is fixedly secured a downwardly projecting lever 757. The lower end of lever 757 projects into the path of a suitable stud 758 on the space band drive bar 100e (Figure 13).

Space bar 760 is connected to links 761 and 761a whose other ends are fixed on shaft 762 which has its ends rotatably supported by pivot screws 763 and 764 in sidewalls 10 and 11 (see Figures 4 and 13).

A link 765 has its upper end pivotally secured to lever 761 and its lower end secured to a lever 766, the forward end of lever 766 being pivoted as at shoulder screw 767 in block 768 secured to the front wall 13 of the typewriter. The rearward end of link 766 is pivotally secured as at 780 to space band key lever 80e. Space band key lever 80e is a conventional key lever except that it does not have a key tab thereon, but is operated in the manner just described.

*Extra space mechanism*

By referring to Figures 9, 10 and 11 it is seen that to the rear portion of upstanding portion 741 and rack bar 742 there is secured a stud 781 having a peripheral groove therein in which the hooked portion of the left hand end of a lever 782 is adapted to fit. Lever 782 at its other end projects through a slot 783 in bearing block 641. Intermediate its ends, bar 782 has pivoted as at 784 a dog 785 normally pressed in a clockwise direction by means of a tension spring 786 having one end secured to the dog and the other end secured to bar 782. During the setting of the last half-inch of the line by the typewriter the dog 785 is moved to the right, in Figure 10, a distance equal to the expansibility of a space band each time the space bar is actuated.

While dog 785 is moving immediately above sliding block 711, dog 720 in Figure 43, has probably moved to the right beyond this bearing block 711, due to its greater movement because of its operating means being secured in the extreme end of lever 735, whereas the operating means moving bar 782 is secured intermediate the ends of lever 735 and therefore bar 782 moves a less distance for each space band placed in the line than bar 718, as bar 782 represents the expansibility of the space bands, bar 718 represents the expansibility of the space bands plus an extra space added to each space band.

Dog 785 is split at its upper end and has a rotating fit with the sides of bar 782 as will be seen in Figure 45. This causes its clock-wise movement to be restricted by its being mounted in a cutaway portion 787, resulting in the shoulder at the left of cutaway portion 787 restricting the clock-wise movement of dog 785. Dog 720 as will be seen in Figure 45, is mounted in like manner on bar 718 and thus its clock-wise movement is likewise restricted.

Bar 782 projects a short distance to the right of bearing block 641 after passing through slot 783 and has secured thereto the lower end of a tension spring 788. The upper end of tension spring 788 is secured to an L-shaped pin 789 secured in the upper edge of bearing block 641, the purpose of this spring 788 being to normally hold the bars 782 in the position shown in Figure 10.

Lever 648 blocks the carriage return under certain conditions and operates the extra space mechanism which will be presently described. Lever 648 also projects beneath bar 716 as will be seen in Figures 5, 42 and 43. It will be seen that tension spring 788 holds bar 782 in elevated position and likewise holds lever 648 in elevated position and bar 716 resting on top of lever 648, will also be held in elevated position. When hook 727 is placed beneath stud 728 in carriage return key lever 729 it will depress not only the right hand end of bar 716 but also the right hand end of bar 782 and will likewise depress the front end of lever 648.

Each time space bar 760 is depressed bell crank lever comprising portions 751 and 753 is operated to advance the rack bar 742 one tooth and this is done through dog 749 and is held in advanced position by dog 746. After the line has been set, the rack bar 740 is returned to normal position by means of a tension spring 790 secured at one end to the rack bar 742 and at its other end to a stud 791 in bearing block 640. Before spring 790 is allowed to return the rack bar 742 to normal position, both dogs 746 and 749 must be released. This is effected upon oscillation of shaft 792 which will later be described in connection with the means for punching perforations in marginal edges of the control sheet.

Punch shaft 792 has a downwardly projecting lever 793 having connected thereto a link 794 which slides on top of plate 89 and in the forward end thereof has a pair of pins 795 and 796 projecting upwardly therefrom which are adapted to receive the forked proximate ends of a pair of levers 797 and 798 pivoted as at 799 and 800. To the outer end of links 797 and 798 there are pivoted as at 801 and 802 links 803 and 804, said links being forked at their forward ends and engaging pins 805 and 806 projecting from the lower face of dogs 746 and 749. It is seen that upon oscillation of shaft 792 in a counter-clockwise direction in Figure 11 that link 794 is moved rearwardly in the typewriter and this releases dogs 746 and 749 from ratchet teeth 743 and 744 which allows tension spring 790 to return the rack bar 742 to normal position. This returns bars 782, 718, 739, lever 735 and associated parts to normal position ready for the beginning of the operation of writing a new line on the typewriter.

The above described mechanism is operated upon the placing of space band indications on the control sheet for the setting of a line by a linecasting machine and placing space bands therein.

The operation of the space band mechanism results in the automatic operation of means for placing on the control sheet a suitable code character when needed, for causing the typesetting machine to place extra spacing in the lines when the control sheet is placed in suitable apparatus associated with a typesetting machine for setting the type therein.

As previously stated, the bar 705 begins movement to the left when the indicator rack bar 608 is moved to a point where its right hand end engages the set screw 674. At this point the line lacks one-half inch of being filled to the proper length. While additional characters are being printed on the control sheet it is therefore evident the indicator rack bar 608 will continue to move to the right and its right hand end will cause, through lever 675, left hand movement in bar 705. This will cause block 711 to move to the left also. During the writing of a line the placing of space band code indications in the line will have moved bar 782 to the right, step by step according to the number of space band code indications placed in the line. At the same time, due to the greater throw of lever 735 on bar 718 over bar 739, bar 718 will have moved to a greater degree to the right.

Let us suppose that one additional character is placed in the line after it has been written to within one-half inch of the end of a line of proper length. And let us suppose that the line is not yet long enough to where it could be filled out by expansibility of the space bands alone. In this position dog 785 would be disposed somewhere above sliding block 711. In case the total amount of space band expansibility and an extra space for each space band were not in the line sufficient to fill the line then dog 720 would also be disposed somewhere above sliding block 711. The placing of the additional character, causes the right hand end of indicator to engage set screw 674 to move the bar 705 a slight amount to the left in Figure 5, from the position shown. This allows latch 726 with its hook 727 to engage the stud 728 on carriage return key lever 729 and prevents depression of the carriage return key lever because hook 726 is pivotally mounted at its upper end on bar 716, and on account of the fact that dog 720 and projection 723 would prevent downward movement of bar 716 on its pivot 715 because sliding block 711 would be disposed beneath the dog 720. Therefore, the carriage return key lever could not be depressed because bar 716 could not move downwardly. And for the same reason no action would take place in bar 782 because bar 716 could not press bar 648 downwardly and therefore bar 648 could not move bar 782 downwardly even though its dog 785 were not disposed above sliding block 711, but as a matter of fact, it would be above sliding block 711.

Now let us suppose that one additional character should be written in the line or two additional characters in all after the right hand end of indicator bar 608 has touched set screw 674 and let us assume that dog 720 has been moved past the right hand edge of sliding block 711. Let us suppose that the line is not full enough for the normal expansion of the space bands to fill the line and in which event dog 785 would still be disposed above some portion of sliding block 711.

Depression of key lever 729, hook 727 being in engagement with stud 728, would move the right end of bar 716 downwardly because dog 720 would not engage sliding block 711. This in turn would cause bar 648 to be moved downwardly, which in turn, would move bar 782 downwardly but on account of its dog 785 being disposed somewhere above sliding block 711, then the left hand end of bar 782 would be raised upwardly and a pin 807 in the rear face thereof would engage a plate 808 secured on a lever 809 which in turn is secured to shaft 810, said shaft being mounted in bearing blocks 640 and 641 and confined therein by collars 811 and 812.

Collar 812 has an upwardly projecting portion to which is secured a tension spring 813, the other end of the tension spring being secured to pin 814 in bearing block 640 which normally holds plate 808 in engagement with pin 807. The left hand end of shaft 810 has a lever 815 projecting upwardly therefrom to which is pivoted, as at 816, an end link 817 to which is adjustably connected a link 818.

The tension spring 813, as previously stated, tends to move plate 808 downwardly. The plate 808 is moved upwardly on account of the upward movement of the left hand end of the bar 782 by its pin 807. This in turn will cause link 818 to move rearwardly in the typewriter. The rear end of link 818 is connected to a bell crank lever 819 (Figures 2 and 12) which is pivoted as at 820 to bracket 837 said bracket being secured to the top of frame 11. Lever 819 has a forwardly projecting portion 821 which at the extreme end thereof has the portion 822 projecting toward the observer in Figure 12. This portion 822 is disposed directly below a link 823 which has a tongue 824 adapted to normally rest on the head of shoulder screw 820 and to have sliding movement thereon. Link 823 also has a hook 825 secured to one side thereof which is adapted to be engaged by a hook 826 pivoted as at 827 and pressed against portion 825 by means of a tension spring 828.

Movement to the right of link 818 (see Figures 9 and 12) will raise the right hand portion 824 of link 823, it being pivoted as at 829 in type bar actuating link 168. Tension spring 828 will cause the lower end of hook 826 to engage the hook 825 on link 823 and hold it in elevated position. The upper right hand portion of link 823 has a shoulder 830 thereon adapted to be engaged by a block 831 secured on the far side of a lever 832 as viewed by the observer in Figure 12.

Lever 832 is fixedly secured to a transversely disposed shaft 833, said shaft having an arm 834 fixedly secured thereon to the upper end of which is secured a tension spring 835, the other end of the spring being secured to a pin 836 in the frame of the typewriter.

Also fixedly secured on shaft 833 is an arm 839 having a roller 840 on the end thereof adapted to follow a cam 841 on vertically disposed shaft 842. Shaft 842 is a part of the carriage return mechanism. Cam 841 has a low place 843 therein and with the parts in elevated position as described with relation to Figure 12 it is seen that when the roller 840 falls into low place 843 in cam 841 after the carriage has been returned to starting position, ready for the writing of a new line, but before the platen has been ratcheted to new line position, link 823 will be pushed to the left in Figure 12 by counter-clockwise movement of lever 832 which will actuate the type bar having the extra spacing code character thereon to automatically print the extra spacing code character at the beginning of the line so that when the control sheet is placed in the typesetting machine and the like it will automatically place in the line of matrices to be set, extra spacing to make it the proper length.

Conventional escapement in a typewriter comprises a bar 844 adapted to be engaged by raised portion 174a on each type bar. Bar 844 is pivotally secured to the upper end of a bar 846, pivoted as at 845 by means not shown in the drawings since this is conventional escapement mechanism. Link 847 which projects backwardly and which is forked at its rear end engages a shoulder screw 847a which is also a part of the conventional escapement mechanism. This allows the carriage to move one step upon actuation of each type bar.

When the carriage is returned ready for the beginning of the writing of a new line, it is returned one space beyond where the line is to begin in order for the placing therein of the extra spacing code character if necessary. It has been previously explained how the necessity for extra spacing actuates the type bar for placing the extra spacing code character on the control sheet.

In case the extra spacing code character is not needed at the beginning of a line then of course it is evident that some automatic means must be provided for allowing one escapement of the carriage mechanism before the writing of a line is begun. This is effected through means on the shaft 833 operating after the carriage is returned.

By referring to Figure 11 it will be seen that lever 848 is fixed on shaft 833 and has a set screw 849 in the free end thereof adapted to engage a lever 850 pivoted as at 851 and having its upper end adapted to engage a projection 852 on the far side of bar 847 which will operate the escapement mechanism at the beginning of each line to move the platen one step ready for the beginning of the writing of a new line.

Means for preventing overset lines

In case the line is overset, that is, set beyond the proper length, then it is evident that projection 700 in Figure 5, will have moved to the left to a point where it will be in the path of lever 648 so that this lever cannot be depressed, and therefore hook 727 being beneath stud 728 will not allow the carriage return key lever 729 to be depressed and therefore the carriage cannot be returned for the writing of a new line. With the parts in this position as has been previously explained, link 680 will have been raised upwardly, to a point where the clutch trip of the main drive shaft will have been rendered inoperative and it will be impossible to actuate a drive bar except the back space drive bar, upon depression of a key lever in the typewriting machine.

In case of an overset line, back spacing operation will be carried out and the automatic blot out as has been previously described, will be placed in operation and certain of the characters at the end of the line will be blotted out and of course the measurement will be subtracted from the indicating mechanism and cause the indicator rack bar 608 to move to the left in Figure 5, and allow the upper end of lever 675 to move to the left and the lower end to move to the right to a point where the carriage return mechanism can be operated and in which event the extra spacing mechanism if necessary will be operated to fill out the line if the line is not complete with the expansibility of the space bands therein.

Back spacing mechanism

In case of oversetting of the line the back spacing mechanism will be operated if it is desired to use the automatic blot out. Also if for any other reason it is desired to back space the carriage, means are provided whereby the back spacing operation may be effected and it is connected to the conventional back spacing mechanism in the typewriter.

A back spacer key 853 is secured on back spacer key lever 80b, and by referring to Figures 51 and 52 it is seen that clutch bail 111 has a cutaway portion 854 therein and back spacer drive bar 100b has an elongated portion 855 projecting towards the front of the typewriter, so that downward movement of the clutch trip bail will be effected to a greater degree on account of the smaller radius at which it is engaged by projection 855. This will cause the clutch trip lever 73 to be operated even though the plate 690 will be moved to the right in Figure 37, because the cutaway portion 856 on the left hand end of lever 121 in Figure 37 will be raised high enough to operate clutch trip lever 73 whereas the actuation of a normal key lever and drive bar would not depress link 117 sufficiently to trip the clutch. As will be seen in Figure 11 the back space drive bar 100b has a pin 857 shown in dotted lines in Figure 11, which is adapted to be engaged by a fork in a lever 858 secured on shaft 859 and having thereon lever 860, operating link 861 of the conventional back spacing mechanism. The back spacing drive bar 100b is the extreme left hand drive bar in the typewriter when viewed by an operator sitting at the typewriter.

This has associated with the rear end thereof, a first selector bar 862 which has twelve projections each on each side thereof so that when the back spacing drive bar is operated it will raise its first selector bar 862 and will lock all second selector bars from operation so that no measurement can be imparted to the indicator upon actuation of the back space mechanism. Back space drive bar 100b also has the peculiarity of having no connection whatsoever with any type bar for actuation of the same.

Ribbon lifting mechanism

In many typewriting mechanisms, and especially the form of typewriter shown in the drawings there are certain conventional parts in the upper portion thereof by means of which the ribbon is lifted each time a type bar is actuated. The ribbon is usually lifted by the actuation of the type bars themselves or by the key bars.

In Figure 11 the conventional ribbon lifting mechanism is shown and indicated broadly by reference character 863 which has a lever 864 pivoted as at 865 and having a stud in the lower end thereof. My special ribbon lifting means comprises a link 866 having a hook in the free end thereof for engaging stud 864. Link 866 is pivotally secured by shoulder screw 867 in the upper end of a lever 868 fixed on shaft 869.

By referring to Figure 2, it is seen that shaft 869 has a downwardly projecting lever 870 which has pivotally secured to the lower end thereof a link 871 which is pivotally secured to the upper end of a bell crank lever 873 having a horizontally projecting portion 874 having a roller 875 thereon adapted to follow a cam 878 on main drive shaft 57. Thus the raising of the ribbon is effected by power derived directly from the main drive shaft 57. The bell crank comprising portions 872 and 874 also causes the drive shaft at the end of a complete revolution to stop at a predetermined point on account of roller 875 stopping in low portion 879 in cam 878. The roller 875 is caused to follow cam 878 by means of a tension spring 880 secured to portion 872 of the bell crank lever and having its other end secured to a pin 881 secured in sidewall 11 of the typewriter.

The carriage shift mechanism

The carriage shift mechanism (Figures 1, 4, 11, 13, 38) comprises a shift key lever 80c and an auxiliary shift key lever 882 having shift keys 883 and 884 thereon respectively. Key lever 80c has means thereon similar to the other key levers for operating a drive bar and tripping the clutch mechanism but auxiliary key lever 882 has no such means thereon. Shift key lever 80c has pivotally secured to the front end thereof a link 885, the lower end being pivotally connected as at 886 to a lever 887 fixed on a transverse shaft 888 having its ends rotatably mounted on pivot screws 889 and 890 in sidewalls 10 and 11.

Shaft 888 also has mounted thereon on the opposite side of the typewriter from the point at which lever 887 is mounted, a lever 891 which has pivotally connected to the free end thereof an upwardly projecting link 892 whose upper end is connected to the front end of auxiliary shift key lever 882.

When either of shift keys 883 or 884 is depressed it actuates key lever 80c and actuates shift drive bar 100c. Drive bar 100c has a stud 893 thereon adapted to engage the upper forked end of a lever 894 pivoted in sidewall 10 by any suitable means such as shoulder screw 895. To the lower end of lever 894 there is pivotally secured as at 896, a bar 897 having a tension spring 898 connected thereto. Tension spring 898 is also connected to lever 884 whereby the right hand end of bar 897 as seen in Figure 13, or the front end of the bar, is normally pressed downwardly and caused to follow a slot in a bracket 899 secured to sidewall 10 of the typewriter by any suitable means such as screws 900.

Shaft 286 has already been described. This shaft has fixedly secured thereon a bell crank lever having a portion 901 to which is pivotally connected as at 902 the lower end of a link 903. The upper end of link 903 is connected to a transverse rod 904.

By referring to Figure 20 it is seen that said shaft 286 at the other side of the typewriter has also secured thereon a lever 905 having an upstanding link 906 which is also secured to transverse bar 904, which bar 904 when raised upwardly for the carriage shift operation is adapted to engage a roller 907 disposed centrally of the inner carriage mechanism supporting a platen whereby the carriage mechanism will be raised in suitable guides in a structure to be hereinafter described.

Bell crank lever having portion 901, previously described, also has a downwardly projecting portion 908 having a set screw 909 in the lower end thereof which is adapted to limit movement of the portion 908 in a clock-wise direction in Figure 13, if necessary, by having the set screw impinge against the edge of block 899. Pivotally mounted intermediate the ends of portion 908 is a link 910 which is adapted to have movement on the sloping bottom of the guide shown in dotted lines in block 899. This link 910 is adapted to coincide with the off-set end of link 897 to return the carriage to normal position, which operation will be presently described. The link 910 has an end cut to fit the end, shown in dotted lines, of the right-hand portion of link 897.

Pivotally mounted in sidewall 10 by shoulder screw 917 is a bell crank having horizontally disposed portion 916 and vertically disposed portion 915. Portion 915 has pivoted as at 911 a link 912 having projection 913 on the lower side thereof which is adapted to rest on the upper side of link 910. A suitable tension spring 914 has one end secured to link 912 and the other end secured to block 899, which spring forces projection 913 against the upper side of link 910 at all times (see Figures 13 and 38). A torsion spring 918 is secured around the hub portion of the bell crank lever comprising portions 915 and 916 and one end of said spring is secured to portion 915 and the other end is secured to pin 919 in sidewall 10. This spring tends to force the bell crank in a counter-clockwise direction in Figures 13 and 38.

The left-hand end of portion 916 as seen in Figures 13 and 38, has a hook thereon adapted to engage a laterally projecting portion not shown in the drawings, but disposed on the far side of the lower end of portion 908 as shown in Figures 13 and 38, to hold the parts in the position shown in Figure 13 when the shift mechanism is returned to normal position.

Links 903 and 906 (Figures 2 and 3) are normally pressed upwardly by means of tension springs 920 and 921 secured at their upper ends to spring perches 922 and 923 respectively projecting from the top frame and secured at their lower ends to pins 924 and 925 respectively in said links. When the shift keys 883 and 884 are depressed the carriage shift drive bar 100c will be actuated and lever 894 in Figure 13 will be actuated in a counter-clockwise direction. This will cause the right hand end of link 897 to engage the left hand end of link 912 which will cause bell crank lever comprising portions 915 and 916 to be moved in a clock-wise direction on their pivot point 917 and will release the lower end 908 of bell crank lever and will allow the springs 920 and 921 to move the transverse bar 904 upwardly to engage roller 907 to raise the inner carriage mechanism. The parts shown in Figure 13 will then be in the position shown in Figure 38. When the shift keys 883 and 884 are again depressed to shift the platen back to normal position the parts will be returned as previously described to occupy the position shown in Figure 13.

*The carriage mechanism*

Top plate 19 has four bosses 926, 927, 928 and 929 disposed on the upper surface thereof, to which are adapted to be secured a pair of rails 930 and 931 which have grooves in their proximate surfaces and which are adapted to receive conventional trucks 932 and 933 to support for lateral sliding movement rectangular carriage frame 934 which comprises front and rear portions 935 and 936 and end portions 937 and 938. Associated with this laterally movable outer carriage frame is a pair of conventional brackets 939 which are usually employed to cooperate with the conventional tabulating mechanism, but as a tabulating mechanism is not necessary in my typewriter, these may be employed for supporting a roll of paper for use in the typewriter if desired.

A conventional escapement rack bar 940 is shown in Figure 11 and is connected by conventional means to the outer carriage frame 934. This is adapted to have engagement with a conventional escapement mechanism 941, the details of which are not shown as they are conventional.

A conventional release bar 942 is pivoted as at 942a on the outer carriage frame and is adapted for manual operation for releasing rack bar 940 from the escapement mechanism when it is desired to move the outer carriage to the left. Integral with end portion 937 in the outer carriage frame is a vertically disposed portion 943 having fixed on the inside surface thereof a race 944 by any suitable means such as screws 945. This race receives the inner carriage for vertical movement as will be presently described.

The portion 943 has therein a hole 946 through which a suitable tool can be inserted for securing or dismounting the inner carriage mechanism. This member 937 has secured thereon a horizontally disposed wear plate 947 against which the carriage return roller 1106, to be presently described, is adapted to have movement.

*The inner carriage*

Integral with end portion 938 of the outer carriage frame is a vertically disposed portion 948 having a race 949 secured on the inside surface thereof by means of screws 950, the race being adapted to receive for vertical sliding movement the inner carriage frame to be presently described. On the front edge of portion 948 there is a vertical slot 951 in which the supporting means for the one end of the platen supporting means is adapted to have vertical movement upon shift of the inner carriage mechanism. The inner carriage comprises the rectangular frame 952 having races 953 and 954 secured on the ends thereof for movement in the races 944 and 945 on the outer carriage mechanism. Suitably disposed between the races on the inner carriage frame and the races on the outer carriage frame are suitable balls 955. These balls are held in spaced position by means of spacers 956 and 957.

Secured to the races 953 and 954 by any suitable means such as screw 960 are the upwardly and rearwardly projecting portions 958 and 959. These projecting portions have secured therein a rod 961 to which is fixedly secured the upper edge of a plate 962 supported also at point 963 for guiding the sheet into the typewriter ready for the writing operation. The inner frame has suitable pressure rolls, not shown, but which are conventional, for applying pressure to the sheet held in the typewriter.

Pivotally mounted as at 964 is a pair of fingers 965 and 966 which are disposed near each end of the platen for guiding the sheet as it is introduced into the typewriter and for applying pressure thereto. These fingers have pivotally connected thereto links 967 and 968 which have a slot 969 in the front end thereof which are slidably penetrated by a pin 970 in the lower ends of levers 971 and 972 which are fixed on a transversely disposed shaft 973 mounted in upstanding projections 974 and 975.

Secured to the control sheet punching mechanism, to be later described, is one end of tension springs 976 and 977 having their other ends connected to the links 967 and 968 respectively for applying pressure to fingers 965 and 966 to in turn apply pressure to the sheet disposed in the typewriter.

Adjustably mounted on the left hand end of the inner carriage frame and penetrating the same is a pivot screw 978 which is adapted to support for rotation the left hand end of platen shaft 979 having fixedly mounted thereon, a conventional platen 980.

By referring to Figures 8, 47, 48 and 53 it is seen that the right hand end of platen shaft 979 has fixedly secured thereon a centering wheel 981 having a hub portion on which is fixedly secured an advancing ratchet 982. The right hand end of shaft 979 is bored out to receive a projecting portion 983 on knob shaft 984. Knob shaft 984 has a flanged portion 985 having a pin 986 therein adapted to fit in a suitable cavity in centering wheel 981, so that when knob shaft 984 is rotated it will turn the platen. This peculiar mechanism in Figure 53 is also provided so that when pivot screw 978 is loosened or removed from the left hand end of the platen, the platen can be removed from the inner carriage mechanism. The inner carriage frame has fixedly secured therein a bearing 987 in which knob shaft 984 has rotative movement. The right hand end of knob shaft 984 has fixedly secured thereon a conventional knob 988 whereby the platen can be rotated by hand. The operation of the advancing ratchet and the centering wheel will be presently described.

A pair of punch supporting arms 989 and 990 are penetrated at their rearward ends by the platen shaft 979 which shaft has rotative movement in the rear ends of said punch supporting arms. These punch supporting arms are supported rigidly by means of brackets 991 and 992 fixedly secured at their rear ends to the inner carriage frame 952. Brackets 991 and 992 are secured at their front ends to the punch supporting brackets by any suitable means such as screws 993 and 994. The screws 993 and 994 penetrate suitable slots in the brackets 991 and 992 so that the forward end of brackets 989 and 990 can be vertically adjusted. This is done in order to adjust the brackets so that the control sheet prepared by the typewriter will be punched at the proper points.

Bracket 989 has integral therewith projections 995 and 996 in which is slidably mounted a punch 997 to which is secured a cuff 999 in an adjustable manner by means of a set screw 998 so that the punch can be adjusted. Pivotally connected to cuff 999 by means of pin 1000 is a link 1001 which is pivotally secured at its front end to the lower end of lever 971, by means of pin 970. Secured on bracket 989 is a punch die 1002 having a hole therein in which the cutting end of punch 997 is adapted to have movement. The edge of the control sheet is adapted to pass immediately along the front face to punch die 1002, the front face of the punch die 1102 being arcuate and having the same radius as the platen 980.

Bracket 990 has integral therewith projections 1003 and 1004 in which is slidably mounted a punch 1005 having adjustably secured thereon by means of screw 1006, a cuff 1007 to which is pivotally secured as at 1008 the rear end of a link 1009, whose other end is connected to the lower end of lever 972 by means of pin 970. Secured on bracket 990 is a punch die 1010 similar in all respects to punch die 1002. The punches 997 and 1005 are shown in operated position, that is in the position they will occupy when they have punched the perforations in the marginal edges of the control sheet. The punches are held normally in the position shown in Figure 8 and hold the control sheet by having the punches pass through the holes they punch in the control sheet during the writing of a line and when the shift of the platen to new line position is effected these punches are withdrawn from their holes for allowing the control sheet to be shifted to new line position.

Fixedly secured on the shaft 973 is a lever 1011 for operating the punches in both directions when the carriage is returned to start the writing of a new line. Secured to top plate 19 as shown in Figure 5, is a bracket 1012 in the outer end of which there is pivotally mounted a bell crank having an upstanding portion 1013 having an arcuate cavity 1014 therein into which the lower end of lever 1011, which is ball shaped, is adapted to move when the carriage is returned to the extreme right ready for the writing of a new line on the control sheet.

Bell crank lever having upstanding portion 1013 has also integral therewith an arm 1015, to the outer end of which is pivotally connected as at 1016 a link 1017, the lower end of which is connected at 1018 to a lever 1019 fixedly secured on shaft 792. By referring to Figure 2, showing the other side of the machine, which is not shown in Figure 3, it is to be observed that shaft 792 projects all the way through the machine and has fixedly secured on the outer end thereof a lever 1020 to the lower end of which is pivotally connected a link 1021.

Link 1021 projects rearwardly and is pivotally secured as at 1022 to the upper end of a lever 1023 pivotally mounted intermediate its ends as at 1024 on side wall 11. The lower end of lever 1023 has mounted therein a roller 1025 which is adapted to follow a cam 1026 on horizontal carriage return shaft 36. The roller 1025 is caused to follow cam 1026 at all times by means of a tension spring 1028 secured at its front end to lug 1029 on link 1021 and having its rear end secured to the sidewall 11 of the typewriter.

When the carriage is returned to starting position roller 1025 moves to the low side of cam 1026 which moves the punches to release the control sheet and as the carriage return shaft 36 makes a complete revolution in returning the carriage, the roller again rides to the high side of the cam to cause new perforations to be punched in the control sheet and the carriage return shaft stops in the position shown in Figure 2 which holds the punches in the control sheet during the writing of a line.

Secured to the inner side of plate 959 as shown in Figures 1 and 8 is a plate 1030 having a T-shaped horizontally disposed slot therein in which is slidably mounted a centering wedge 1031 shown in Figure 48. The centering wedge is adapted to engage teeth on the centering wheel 981 to insure that the platen stops in proper position for the placing of the line of characters thereon in proper position. Adapted to cooperate with centering wedge 1031 is a ratchet lever 1032 which is pivotally mounted on a shoulder screw 1033 as shown in Figures 8, 47, 48 and 50. A suitable washer 1034 is disposed on shoulder screw 1033 between ratchet lever 1032 and centering wedge 1031. The shoulder screw 1033 threadably penetrates centering wedge 1031, and is threadably engaged by an extension 1035 having the end thereof reduced in size and pivotally receiving a link 1036 which is held in position by means of nut 1037 on the right hand end of shoulder screw 1033 as seen in Figure 50.

Ratchet lever 1032 has a fixed pawl 1038 thereon and has a sloping end 1039 adapted to rest on set screw 1040 to ride upwardly thereon when the platen is moved to new line position to disengage pawl 1038 from the teeth in ratchet wheel 982. The ratchet lever 1032 is pressed at all times either against set screw 1040 or against ratchet wheel 982 by means of a tension spring 1041 secured as at 1042 to ratchet lever at one end and having its other end secured to projection 1043 which also serves the purpose of threadably receiving set screw 1040. Projection 1043 is mounted on end plate 959 of the secondary or inner carriage mechanism.

Secured to centering wedge 1031 by any suitable means such as rivets 1044 is a plate 1045 which projects downwardly along the left hand edge of block 1030 as seen in Figure 8, and which is more clearly shown in Figure 47. Threadably mounted in the lower portion of plate 1045 is a shoulder screw 1046 pivotally securing link 1047 to said plate. Link 1047 projects forwardly and is pivotally secured as at 1048 to a lever 1049 pivotally secured on shaft 973. Lever 1049, when the carriage is returned for the starting of a new line, rides in front of point 1050 of a bell crank lever 1051 pivotally mounted in bracket 1012 and has a forwardly projecting arm 1052, to the free end of which is pivotally connected as at 1053, (see Figures 8 and 13, and 5) a downwardly projecting link 1054 whose lower end is pivotally connected as at 1055 to a lever 1056 fixedly secured on shaft 1057.

Shaft 1057 also projects from the left hand side of the typewriter and has fixedly secured thereon a lever 1058 whose lower end is pivotally connected as at 1059 to a link 1060 whose other end is pivotally connected as at 1061 to a lever 1062 pivotally mounted intermediate its ends as at 1063 on sidewall 11 of the typewriter and has on its lower end a roller 1064 adapted to follow a cam 1065 on horizontal carriage return shaft 36. Roller 1064 is caused to follow cam 1065 by means of tension spring 1066 secured at one end to the upper half of lever 1062 and secured at its other end to a pin 1067 in sidewall 11 of the typewriter.

When roller 1064 is engaged by the high portion of cam 1065 it causes counter-clockwise movement of lever 1062 in Figure 2 and causes clockwise movement of shaft 1057 in Figure 2 which is also clockwise movement in Figure 13. This moves link 1054 downwardly, oscillating bell crank lever 1051 in a clockwise direction, which moves the lower end of lever 1049 to the right in Figure 13 which pulls centering wedge 1031 from out of engagement with centering wheel 981 and at the same time ratchet lever 1032 is moved to the right in Figure 47 allowing its pawl 1038 to engage the ratchet wheel 982 in tooth 1068 for example. It is to be observed that the ratchet wheel 982 is moved two teeth at a time which prevents the type bars from operating on the same portions of the platen for successive rotations of the platen as it will be noted the ratchet wheel 982 has an odd number of teeth therein and by moving two teeth at a time this alternate positioning of the platen is effected.

When the parts have reached the above described position roller 1064 falls off of the high place on cam 1065 and allows the bell crank lever 1051 and its associated parts to assume the position shown in Figure 13 and this allows tension spring 1041 to move the centering wedge to the position shown in Figure 48 and to move the ratchet lever 1032 to ratchet the platen to new line position. After centering wedge 1031 has engaged its proper tooth in the centering wheel 981, and before the centering wedge has quite reached its maximum travel, the sloping portion 1039 of ratchet lever 1032 rides upwardly on set screw 1040 and disengages the pawl 1038 from engagement with the teeth of ratchet wheel 982. This allows free movement of the platen in either direction by centering wedge 1031, as it is evident that if centering wedge 1031 should contact the upper sidewall of a notch backward movement of the platen would be necessary and this could not be done if pawl 1038 were in engagement with the ratchet wheel.

The above description relates to the automatic moving of the platen to new line position and centering the same after the carriage has been returned to new line position. The placing of the extra spacing code character on the control sheet of course would occur immediately before the automatic moving of the platen to new line position.

It is evident that in order to remove a control sheet from the typewriter, of course this could be effected by a plurality of operations of the carriage return mechanism, but it is evident that it might be desired to remove the control sheet from the typewriter without operating the carriage return mechanism and also it is evident that the platen must be released for inserting into the carriage mechanism a new sheet for the writing operation. In either event it is evident that manual means must be supplied for removing the centering wedge from the centering wheel and also removing the punches from their normal position of penetrating the control sheet for removal of a control sheet for insertion of a new control sheet.

In order to bring about this desired operation it is noted that the end plate of the secondary or inner carriage, or the one in which the platen is mounted, has a projection 1069 in which is pivotally mounted as at 1070 a lever 1071, the lower end of which lever is pivotally mounted as at 1072 to the rear end of link 1036 which has previously been described. On the lower rear side of lever 1071 there is an outwardly projecting portion 1073 appearing immediately below a lever 1074 pivoted as at 1075, said lever having a notch 1076 in its front end.

The upper end of lever 1074 is normally pressed against the lower end of a lever 1077 by means of a tension spring 1078. Lever 1077 is fixedly secured on shaft 1079 mounted in suitable projections on the upper portion of end plates 958 and 959. On the left hand end of shaft 1079 is fixedly secured a lever 1080 which has pivotally secured at the lower end thereof a link 1081 which is pivotally secured at its forward end to a lever 1082 which is pivotally mounted as at 1083 in end portion 937 of the outer carriage frame. The lower end of lever 1082 is adapted to contact a cam plate 1084 on top plate 19 as the carriage is being returned to a new line position.

Lever 1071 can be manually operated to oscillate the same in a clockwise direction in Figure 3. This will cause projection 1073 to fall into notch 1076 and latch the centering wedge out of engagement of centering wheel 981. With this latching operation the carriage must have been moved to the left or away from the starting of a new line position to allow the lower end of lever 1082 to move rearwardly around or down the sloping end of cam plate 1084 as seen in Figure 8 which allows spring 1078 to pull lever 1074 into engagement with projection 1073. It is evident that when manual operation of lever 1071 takes place and centering wedge is removed from engagement with its centering wheel that link 1047 will move towards the front of the typewriter which will oscillate lever 1049, loosely mounted on shaft 973.

It will be noted that in Figure 8 this lever has secured thereon a plate 1085 which projects into the path of lever 1011 and therefore lever 1011 will also be oscillated in the same direction, that is, its lower end will move towards the front of the typewriter and it being fixedly secured on shaft 973 will oscillate said shaft and therefore will move the punches from engagement with the control sheet. As the carriage is returned it is evident that the lower end of lever 1082 will ride along the front edge of cam plate 1084 which releases the centering wedge by lifting latch 1076 from projection 1073 to allow the centering wedge to engage the centering wheel.

Upon further movement of the carriage mechanism towards starting position, it is seen that a lever 1086 fixed on shaft 973 and projecting downwardly therefrom will ride along the sloping rearward surface of a cam plate 1087 fixed on top plate 19 and this will move the links 1001 and 1009 rearwardly of the typewriter and force the punches 997 and 1005 through the control sheet to punch a new set of perforations and to hold the control sheet in position.

The ball shaped end of lever 1011 is placed in a position, to enter slot 1014, by the lower end of lever 1086 being moved by cam plate 1087. It is evident that cam plate 1084 extends towards the center of the typewriter far enough so as to engage the lower end of lever 1082 at the beginning of a new line, whereas cam plate 1087 is shorter than cam plate 1084 and therefore is not in the path of lever 1086 at the beginning of a new line. This insures that lever 1074 will be held out of the path of projection 1073 during the automatic operation of moving the platen to new line position. The shortness of cam plate 1087 insures that lever 1086 will have moved past the end of cam plate 1087 and be disposed at a point to the right thereof in Figure 8, so that cam plate 1087 will not interfere with automatic operation of shaft 873 by means of automatic operation of bell crank 1013 to effect automatic punching of holes on the control sheet.

Of course it is evident that upward and downward movement of the carriage must be limited by suitable stops and in Figures 11 and 13 stops 1088 and 1089 are provided to limit its downward movement and other suitable stops, not shown, are provided for limiting the upward movement of the inner carriage and its platen with relation to the outer carriage.

All of these projections are equipped with adjustable means such as shown in Figure 3 comprising a set screw 1090.

Link 541 has previously been described in connection with the operation of the clutch faces. The rear end of this link 541 is pivotally connected to an arm 1091 pivoted at its upper end as at 1092, and having a roller 1093 intermediate its end adapted to follow a cam 1094 on horizontal carriage return shaft 36. The roller 1093 is caused to follow cam 1094 by means of a tension spring 1095 secured to the lower end of lever 1091 and has its other end secured to side portion 10 of the typewriter. This cam serves a double purpose of throwing out the carriage return clutch as shown in Figure 3 and also for effecting return of the indicator as has been previously described. For placing the carriage return horizontal shaft 36 into operation it is seen that carriage return key lever 729 has pivotally connected thereto a link 1096, the lower end of which is pivotally connected to a bell crank lever 1097, pivoted as at 1098 and having its other end pivotally connected to end link 1099 which is adjustably connected to a link 1100 whose other end is secured to trip trigger 52 for allowing the clutch on the end of horizontal carriage return shaft 36 to drive shaft 36 for causing rotation to be imparted to the carriage return shaft 36. It is seen that depression of key 730 will move link 1100 to the right in Figure 13 or toward the front of the typewriter as viewed in Figures 4 and 13.

By observing Figure 4 it is seen that when the outer end of latch 52 is removed from in front of the projection 51 it allows compression spring 44 to engage clutch 38 with the coinciding clutch face member 37 on shaft 36 and imparts one revolution to horizontal carriage return shaft 36. Upon one complete revolution the parts are again relatched in position as shown in Figure 4 as has been previously described, unless key lever 730 is still depressed, in which event the ratcheting mechanism would continue to operate to expel the control sheet.

The left hand end of horizontal carriage return shaft 36, as will be seen in Figure 2, has a bevel gear 1101 secured thereon which meshes with bevel gear 1102 on the lower end of vertical carriage return shaft 842, which in part has been previously described. Shaft 842 is mounted in bearings 1103 and 1104, secured to the sidewall 11 and top plate 19 respectively. Fixed on the upper end of shaft 842 is an arcuate-shaped lever 1105 which has a peculair shape in order to allow a roller 1106 on its ends to engage wear plate 947 on the end of the carriage mechanism for returning the carriage to a position for writing a new line without any intermediate portion of the lever engaging any other portion of the carriage frame.

The typewriter is equipped with a conventional ribbon feed mechanism comprising spools 1108 and 1109 for holding the ribbon and are disposed at each side of the machine and mounted on suitable mechanism turned by conventional mechanism, and a description of the same is not deemed necessary.

In Figure 54 the impressions which are made by the type bars in my typewriter I reproduce. These are shown as being examples of what may be reproduced, they being the characters used in a typecasting, linecasting machine and the like. It is evident that these type bars may, if desired, have the legible character omitted therefrom, but the legible character is produced so as to facilitate proof reading and is a very valuable feature for that reason.

It is of course evident that the appearance of the face of the type bars will be the reverse of the impressions as will be observed by comparison of Figures 55 and 57, Figure 55 being the impression produced by the type bar and Figure 57 showing the face of a type bar itself. The characters are reproduced on a suitable control sheet which may be of ordinary paper or of other suitable material which is inserted in the typewriter as has been previously described. This control sheet 1110 has perforations 1111 and 1112 along each margin thereof which are produced by the punches as has been previously described.

By punching the control sheet and holding the punches in the control sheet during the writing of a line, there is positive insurance provided which will cause the scanning mechanism, having means which enter these perforations to perfectly aline the line of characters with the scanning means.

In Figure 55, it is seen that the space associated with each character, whether it be a legible character or a punctuation or any other character for special operation of the machine, has places for cell controls, these places being indicated by references a, b, c, d, e, and f, and the scanning mechanism preferably traverses the cell controls from cell a up to cell c and steps over a half space and returns over cells d, e and f. All of this is fully explained in my co-pending applications, Serial Nos. 404,331 and 517,171 which terminated as Patents No. 2,067,183, and No. 2,067,184, respectively, on January 12, 1937.

On the control sheet it is seen that the first and second lines have characters thereon which represent each letter of the alphabet. In the first line it is noted that the paragraph indentation is the code character for the "em" space having darkened cell portions c and f to serve as paragraph indentation cell controls and operates the conventional indentation apparatus on a linecasting machine. It is noted that a space code character appears before each of the words in the first line. It is also noted that the characters in the first line on the control sheet properly fill the line and therefore no extra space character is needed. The second line is not complete but this is filled out with quads which are operated by "em" space code characters.

In the third line it is to be noted that the characters therein are not sufficient to form a line of proper length in a linecasting machine and the like and therefore the typewriter automatically places the extra spacing code character in the marginal portion of the line before the writing of characters begins as will be noted on the control sheet as seen in Figure 56. After the third line has been written and the space band counting means and expansibility measuring means have operated as have been previously described, and the line still is not full enough to cause the expansibility of the space bands to make a complete line but complete enough to allow extra space to be placed with each space band to properly fill the line and in which event, as has been previously described, the carriage return can be operated but this will automatically operate the extra spacing type bar to print the extra spacing code character at the beginning of the third line before the platen is moved to move the control sheet to a point where another line will be begun immediately below where the third line is on the control sheet.

It is to be noted that the extra space code character is a single cell control occupying the position a as shown in Figures 54, 55 and 56. This double use of the character a is made possible by the means associated with the typesetting machine for using the control sheet which, briefly, comprises the locking out of the means for releasing the matrices while the carriage is returning and until the carriage is brought back to the starting of line position, and therefore, while the carriage is in a position where the extra spacing code character is printed at the beginning of the line, the means for releasing the matrices, as for example, the matrix for the character a is rendered inoperative. This permits double use of the same cell control for not only operating the releasing of the character a in typesetting or any other character but also the use of this same combination of cell controls for operating the extra spacing characters. It is therefore evident that any one of the characters could be used as well as the letter a because these characters are locked against release in the typesetting means as above described, while the carriage in the typesetting machine is in a position for scanning the marginal portion immediately preceding the beginning end of the line.

After the control sheet in the scanning mechanism associated with the typesetting has advanced to the point where the lines begin then the matrix releasing means are rendered operative and the extra spacing releasing means is rendered inoperative.

In the drawings and specification there has been set forth a preferred embodiment of the invention, and although specific terms are employed, they are used in a generic and descriptive sense only, and not for purpose of limitation, the scope of the invention being set forth in the appended claims.

I claim:

1. Means for preparing a control sheet for controlling the actuation of character reproducing machines comprising a typewriter having a carriage and means for returning the same, a plurality of independently operable type bars for writing lines on the control sheet, means for measuring the amount of space the characters will occupy in regular line printing and means for automatically printing an extra space code character at the beginning of a line already written when the carriage is returned if the space bands indicated in the line and their expansibility will not fill the line to proper length.

2. Means for preparing a control sheet for operation of linecasting machines and the like comprising a carriage and means for returning the same, a plurality of independently operable type bars, means for measuring the space the characters will occupy in regular line printing, means for counting the space band code indication means which are printed on the control sheet, means movable in accordance with the counting mechanism in proportion to the expansibility of the space bands in a line and means automatically operable upon return of the carriage mechanism for printing an extra spacing code character at the beginning of the line already written if the space bands, their expansibility, and an extra spacing with each space band will fill the line to proper length in type setting and the like machines.

3. In a typewriter for preparing a control sheet for operation of linecasting machines and the like and having a carriage and means for returning the same, a plurality of independently operable type bars, carriage mechanism for holding a sheet on which the type characters are to be printed, means for measuring the space the actuated characters will occupy in regular line printing, an indication for indicating the measurements, the measuring means comprising a first selector, a second selector controlled in its movements by the first selector, a twin third selector controlled in its movements by the second selector, one portion of the third selector transmitting large units of measurements to an indicator, the other portion of said third selector transmitting small units of measurements to the indicator and means operable after the third selector has been operated for moving the indicator in accordance with the settings of all of the selectors.

4. In a typewriter for preparing a control sheet for operation of linecasting machines and the like and having a plurality of independently operable type bars, a carriage mechanism for holding the control sheet, means for measuring the amount of space the characters will occupy in regular line printing, an indicator for visually indicating the total amount of said measurements at any given time in the writing of a line, a selecting mechanism comprising a pair of duplicate selectors, each of which has a plurality of transversely movable bars having notches therein and movable in accordance with the measurements taken of the actuated characters, a plurality of slides movable transversely of said bars in accordance with the setting of said bars, means operable by the movement of said slides and bars for moving the indicator in accordance with the setting of the selecting mechanism.

5. In a typewriter for preparing a control sheet for linecasting machines and the like comprising a plurality of separately operable type bars, a first selector operable by the actuated type bars, a second selector mechanism controlled in its movements by the first selector, said second selector mechanism comprising a plurality of sets of three bars each, two of said sets being normally locked against operation, a carriage shift mechanism for normally locking one third of the second selector bars against operation, a cap shift mechanism for normally locking another third of said second selector bars against operation to allow the lower case second selector bars normally to be operated when the carriage and cap shift mechanism are not actuated.

6. In a typewriter for preparing a control sheet for operation of linecasting machines and the like having a carriage mechanism provided with a platen for holding a sheet and means for returning the carriage mechanism, means for measuring the amount of space occupied by the characters in a line, means operable in accordance with the number of space band indications placed in a line and their expansibility and means automatically operable upon the return of the carriage mechanism if the line is of at least a predetermined length for placing an extra spacing code character indication at the beginning of a line already written when the carriage is returned to starting position and before the platen is moved to a new line position, and means for moving the platen to new line position.

7. In a typewriter for preparing a control sheet for actuation of linecasting machines and the like, having a plurality of type bars, a carriage mechanism, means for returning the carriage mechanism to starting position and means for locking the carriage return mechanism against operation when the characters printed in a line are more than enough to fill a line in a linecasting machine and the like.

8. In a typewriter having a plurality of type bars and including a blot-out type bar, a key bar for each type bar, a drive bar for actuating each type bar and movable by an actuated key bar, operating mechanism for the type bars normally disconnected from the drive bars and means for moving the operating mechanism for all of the type bars except the blot-out type bar out of the path of travel of the drive bars to permit operation of the blot-out type bar when any of the drive bars are actuated.

9. In a typewriter having a plurality of type bars and means for actuation of same to write a plurality of lines on a control sheet to be used in actuation of typesetting machines and the like, means for measuring the space the actuated characters will occupy in regular line printing, an indicator for indicating the measured space of said actuated characters, a main drive shaft for operating the typewriter, motor driven means for driving the drive shaft, a clutch between the motor driven means and the main drive shaft and means for disconnecting the clutch from operation with relation to the drive shaft and holding it in disconnected position when a line has therein characters more than enough to fill a line in a typesetting machine and the like.

10. In a typewriter for preparing a control sheet for control of linecasting machines and the like, a carriage for holding the control sheet, means for returning the carriage to starting position, means for measuring the space the characters written by the typewriter will occupy in regular line printing, means movable by the measuring means, means for printing a space code character between words in a line, means for counting the number of space code characters in a written line, means movable according to the space counting means in proportion to the expansibility of the space bands in the line, and means automatically operable upon return of the carriage for printing an extra spacing code character at the beginning of the line already written if the space bands and their expansibility will not fill the line to cause it to have sufficient length in the typesetting machine and the like.

11. A typewriter having a plurality of separately operable type bars for writing lines of characters on a sheet, means for selectively actuating the type bars, means for measuring the space the actuated characters will occupy in regular line printing in typesetting and like machines, said measuring means comprising a first selector actuated by the means for actuating the type bars, second and third selectors actuated by the first selector, and indicating means operated according to the setting of the third selector for indicating the amount of space the characters will occupy in regular line printing.

12. A typewriter having type bars and means for actuating the same, means for measuring the space the characters actuated will occupy in regular line printing, means for indicating said measurements, means for blotting out characters already printed and means for subtracting the measurements of the blotted out characters from the indicator.

13. A typewriter having type bars and means for actuating the type bars, means for measuring the space the actuated characters will occupy in regular line printing, means for indicating the total amount of space the actuated characters will occupy in regular line printing, means for blotting out actuated characters and at the same time reversing the indicator to subtract therefrom the measurements of the blotted out characters.

14. A typewriter having a plurality of key bars, a plurality of type bars including a blot-out type bar, a plurality of drive bars for actuating the type bars and each drive bar being controlled by a key bar, a striking bail for operating the drive bars, operating means for the type bars normally disposed in the path of the drive bars, means for moving the operating means for all of the type bars except the blot-out type bar out of the path of the drive bars so that actuation of the drive bar for the blot-out type bar will operate only the blot-out type bar.

15. A typewriter having a plurality of type bars and means for selectively actuating the same, a first selector movable by the means for actuating the type bars, a second selector controlled in its movements by the said first selector, a third selector controlled in its movements by the second selector, means for moving the second selector, other means for moving the third selector, an indicator for indicating the movements in the said selectors and means controlled by the movements of the said selectors for moving the indicator.

16. A typewriter having means for measuring the amount of space the actuated characters therein will occupy in regular line printing, a carriage, and means for preventing return of the carriage to new line position when the characters written in the line do not have sufficient measurement when associated with spacing members to form a complete line of proper length in typesetting and like machines.

17. In a typewriter having a plurality of independently operable type bars and means for measuring the space a character represented by an actuated type bar will occupy in regular line printing, an indicator, means for moving said indicator, said measuring means comprising a first selector, a second selector controlled in its movement by the first selector, transfer levers actuated by the second selector, a third selector comprising two identical portions and actuated by said transfer levers, said third selector also comprising a plurality of transversely movable notched bars and a plurality of longitudinally movable notched bars, means for moving said longitudinally notched bars after the transversely disposed notched bars have been actuated and means for transferring the movement of said longitudinally disposed bars to said indicator.

18. A machine for preparing a control record, for actuation of linecasting machines and the like and having a plurality of independently operable means for placing control characters on the control record, means for measuring the space the characters will occupy in regular line printing, an indicator for indicating said space, means for transmitting the measurement of the characters to the indicator comprising an indicator shaft for operating the indicator and being directly connected to a portion of the measuring means and indirectly connected to another portion of the measuring means whereby large units of measurement may be transmitted directly to the indicator shaft and small units of measurement may be transmitted indirectly to the indicator shaft.

19. In a typewriter having a source of power for operating the same, a carriage mechanism, means for returning the carriage mechanism to starting position, means for connecting the source of power to said carriage returning means, a vertically disposed shaft driven one complete revolution at a time by said source of power, means for automatically disconnecting said source of power from said carriage returning means when said vertically disposed shaft has completed a revolution, and a lever on the upper end of said vertically disposed shaft for slidably engaging one end of the carriage mechanism for returning it to starting position.

20. Means for preparing a control record for operation of character reproducing machines comprising means for measuring the space the characters appearing on the control record will occupy in regular line printing, means for indicating said measurements, the measuring means comprising a first selector operated in accordance with the actuated characters appearing on the control record, a second selector controlled by the first selector and a third selector controlled by the second selector and means controlled by the third selector for moving the indicating mechanism.

21. Means for preparing a control record for actuation of linecasting machines and the like comprising a plurality of members and means for selectively actuating said members for preparing the control record, means for measuring the space the characters appearing on the control record will occupy in regular line printing, means for indicating said measurement, means for blotting out characters appearing on the control record and means for subtracting the measurements of the blotted out characters from the indicator.

22. A typewriter having a plurality of type bars and means for selectively operating the same, means for measuring the space a character on an actuated type bar will occupy in regular line printing, the measuring means comprising a first selector operable by the means for operating the type bars, a second selector controlled in its movement by the first selector, a third selector comprising two portions in duplicate and actuated by the second selector, an indicating mechanism, means for transmitting movement of the third selectors to the indicating mechanism comprising an indicator shaft, means for driving the indicator shaft directly from one of the third selectors, a worm, means for rotating said worm from the other half of said third selectors and means for transferring the rotating movement of said worm to said indicator shaft to operate the indicator in addition to its operation by the first half of the third selector.

23. In a typesetting machine having a plurality of key bars, a plurality of type bars adapted to be actuated by the key bars and including a blot-out type bar, a plurality of drive bars and a striking bail for actuating the drive bars, means associated with each type bar adapted to be engaged by a key bar for actuating the type bar, an automatic blot-out type bar, means operable upon actuation of the key bar for the automatic blot-out type bar for moving the means for operating all of the type bars except the automatic blot-out type bar from the path of the striking bail.

24. A typewriter having selectively operable type characters, means for measuring the amount of space the characters written by the typewriter will occupy in regular line printing, said means comprising a first selector bar movable in accordance with the actuation of a character, said first selector bars having projections thereon, a plurality of second selector bars movable transversely of the first selector bars, the second selector bars having notches therein into which projections on the first selector bars are adapted to move when the first selector bars are operated, a third selector movable in accordance with the number of second selector bars allowed to move by a first selector bar, an indicator and means for transmitting the measurements taken by the first, second and third selectors to the indicator.

25. A typewriter having means for measuring the space actuated characters therein will represent in regular line printing, an indicator for indicating the space such actuated characters will occupy in regular line printing, means for operating the indicator comprising an indicator shaft, a cylindrical member secured directly to said indicating shaft, a ratchet pinion arrangement for driving said indicator shaft in accordance with measurements of a character, a worm disposed in said cylindrical member, a helical slot in said cylindrical member, a lever mounted on said worm, means for rotating said worm in accordance with some of the measurements of an actuated character to impart slight rotative movement to said cylindrical member to move the indicator shaft in addition to its movement by the ratchet pinion arrangement.

26. A typewriter having means for measuring the space actuated characters will occupy in regular line printing, means for indicating said measurements, means for operating the indicating means in accordance with the measurements taken, said means comprising a clutch face movable by the measuring means, a second clutch face normally disengaged from the first clutch face, means connecting the second clutch face to the means for moving the indicator, and means operable upon the taking of measurement of a character and moving the first clutch face for engaging the two clutch faces to cause movement of the indicator operating means and indicator in accordance with the measurement taken of the character.

27. In a typewriter having type bars and a carriage provided with a rotatable platen for holding a sheet, means for returning the carriage to starting position, means for automatically printing a character in the first space in the line already written and moving the platen to a new line, and means automatically operable upon return of the carriage to starting position for moving the carriage one space when no printing operation is carried out in the space in advance of the previously written line.

28. Means for preparing a control sheet for controlling the actuation of character reproducing machines comprising a typewriter having a carriage and means for returning the same, a plurality of independently operable type bars for writing lines of characters on the control sheet, means for measuring the amount of space the written characters will occupy in regular line printing and means for automatically printing an extra space code character at the beginning of a line already written when the carriage is returned if the space bands indicated in the line and their expansibility will not fill the line to proper length, and means automatically operable after the writing of the extra space character for moving the control sheet to a position ready for the writing of a new line.

29. A type-writer having type bars for writing characters and means for actuating the type bars, means for measuring the space the characters on the actuated type bars will occupy in regular line printing, an indicator controlled by the measuring means for indicating the total amount of space the actuated characters will occupy in regular line printing, means for blotting out written characters and at the same time reversing the indicator to subtract therefrom the measurements of the blotted out characters.

30. A type-writer having type bars for writing characters and means for actuating the type bars, means for measuring the space the characters written by the actuated type bars will occupy in regular line printing, an indicator controlled by the measuring means for indicating the total amount of space the characters written will occupy in regular line printing, means for blotting out a written character and at the same time reversing the measuring means to move the indicator backwards to subtract therefrom the measurements of the blotted out character.

31. In a typewriter having a plurality of type bars, and a special type bar, actuating means for the type bars, a plurality of drive bars for engaging the actuating means, a key bar for each type bar, a striking bail for engaging the drive bars when they are depressed by the key bar therefor, means for moving all of the actuating means except those for the special type bar out of the path of the striking bail and moving the drive bar for the special type bar to where it will be engaged by the striking bail so that actuation of any of the key bars will actuate the special type bar.

32. In a typewriter having a plurality of type bars, and a special type bar, actuating means for the type bars, a plurality of drive bars for engaging the actuating means, a key bar for each type bar, a striking bail for engaging the drive bars when they are depressed by the key bar therefor, means for moving all of the actuating means except those for the special type bar out of the path of the striking bail and moving the drive bar for the special type bar to where it will be engaged by the striking bail so that actuation of any of the key bars will actuate the special type bar, means for measuring the amount of space the characters represented by the actuated type bars will occupy in regular line printing, and means for reversing the movement of the measuring means while the special type bar is being operated by actuation of any of the key bars.

33. In a typewriter having means for writing characters, means for measuring the space the written characters will occupy in regular line printing, means for effecting a shift operation, and means for locking the measuring means against operation during the shift operation.

34. In a typewriter having means for writing characters, means for measuring the space written characters will occupy in regular line printing, means for effecting functional non-writing operations in the typewriter, and means for rendering the measuring means inoperative during such functional non-writing operations.

35. In a typewriter having means for writing characters, means for measuring the space the written characters will occupy in regular line printing, means for indicating such measurements, the measuring means including a pair of selectors, one of which transmits large units of measurement to the indicator and the other of which transmits relatively small units of measurement to the indicator.

36. In a typewriter having means for writing characters, means for measuring the space the written characters will occupy in regular line printing and including a pair of selectors movable in units of measurement, one selector being movable in large units of measurement, and the other being movable in small units of measurement, and common means movable by the combined movements imparted to the selectors for indicating the total measurement of a written character.

37. In a typewriter having key bars, drive bars movable by the key bars, type bars for writing characters movable by the drive bars, a selector mechanism controlled by the drive bars for measuring the amount of space the characters represented by the actuated type bars will occupy in regular line printing, a plurality of functional drive bars for effecting functional operations of the machine, key bars for the functional drive bars, and means for locking the selector mechanism against operation when any one of the functional drive bars is actuated.

38. In a typewriter having type bars including a blot-out type bar, type bar actuating means, drive bars for actuating the type bar actuating means one at a time, key bars for actuating the drive bars, means for engaging and moving the actuated drive bars one at a time, means for moving all of the type bar actuating means out of the path of the drive bars except the drive bar for the blot-out bar, and means associated with the blot-out bar actuating means whereby actuation of any drive bar for any type bar will actuate the blot-out bar.

39. In a typewriter having type bars for writing characters including a blot-out type bar, type bar actuating means, drive bars for actuating the type bar actuating means one at a time, key bars for actuating the drive bars, means for engaging and moving the actuated drive bars one at a time, means for moving all of the type bar actuating means out of the path of the drive bars except the drive bar for the blot-out bar, means associated with the blot-out bar actuating means whereby actuation of any drive bar for any type bar will actuate the blot-out bar, means for measuring a space a character represented by an actuated type bar will occupy in regular line printing, means on the drive bars for moving the measuring means, and means operable upon positioning of the drive bars for actuation of the blot-out bar for reversing the direction of travel of the measuring means to subtract from the total measurement of a line the blotted out character in that line.

40. In a typewriter having type bars for writing characters, drive bars for actuating the type bars, key bars for moving the drive bars, a striking bail for engaging and moving a drive bar moved by a key bar, a motor for imparting motion to the striking bail, means actuated by the moved drive bars for measuring the space the characters represented by the actuated type bars will occupy in regular line printing, and means for disconnecting the motor from the striking bail when a written line has more than enough characters therein to fill a line of a given length in regular line printing.

41. In a typewriter having type bars and means for actuating the same to write a line of characters, a selecting mechanism for measuring the space the characters represented by the actuated type bars will occupy in regular line printing, a carriage mechanism, means for returning the carriage to starting position, means for shifting the carriage, and means for locking the selecting mechanism against operation while a carriage shift or carriage return operation is being effected.

42. In a typewriter having a carriage mechanism, means for effecting a carriage shift including a drive bar and a striking bail for moving the drive bar, a button, means controlled by the button when depressed for causing the striking bail to engage the drive bar to effect a shift operation and other means controlled by said button when it is again depressed for effecting an unshift operation in the carriage mechanism.

43. In a typewriter having type bars and means for actuating the same, means for measuring the space high case characters will occupy in regular line printing, means for measuring the space low case characters will occupy in regular line printing, a shift mechanism, means for effecting a shift operation of said measuring means, and means operable by actuation of a type bar for automatically effecting an unshift operation of said measuring means after the character has been measured before the next actuated type bar reaches printing position.

44. A typewriter having type bars, drive bars for operating the type bars, key bars for controlling the drive bars, and also having a main drive shaft for actuating the drive bars and adapted to be rotated one complete revolution upon actuation of a key bar, constantly driven means for driving the shaft, and automatic means for disconnecting the driving means from said shaft when said shaft has made a complete revolution.

45. A typewriter having type bars, drive bars for operating the type bars, key bars for controlling the drive bars, and also having a main drive shaft for actuating the drive bars and adapted to be rotated one complete revolution upon actuation of a key bar, constantly driven means for driving the shaft, automatic means for disconnecting the driving means from said shaft when said shaft has made a complete revolution and means preventing the actuation of another key bar until the said shaft has made a complete revolution.

46. In a typewriter having key bars, drive bars slidable rearwardly of the typewriter and being downwardly movable by said key bars, type bars movable by the drive bars, means engageable by the drive bars for moving the type bars, a striking bail for engaging a downwardly moved drive bar, the means engageable by the drive bars for each type bar being adjustable as to length to determine the force applied to a type bar to thereby regulate the intensity of printing.

47. In a typewriter having a plurality of type bars, including an automatic blot-out type bar, a key bar for each type bar except the automatic blot-out type bar, a drive bar for each type bar and including the automatic blot-out bar, a striking bail for moving the drive bars, means engageable by an actuated drive bar for actuating its associated type bar, means for removing the actuating means for the type bars out of the path of the drive bars and holding the actuating means for the blot-out type bar in the path of the drive bars therefor, so that actuation of any key bar will cause the striking bail to actuate the automatic blot-out type bar.

48. In a typewriter having a plurality of type bars for writing characters, including an automatic blot-out type bar, a key bar for each type bar except the automatic blot-out type bar, a drive bar for each type bar and including the automatic blot-out type bar, a striking bail for moving the drive bars, means engageable by an actuated drive bar for actuating its associated type bar, means for removing the actuating means for the type bars out of the path of the drive bars and holding the actuating means for the blot-out type bar in the path of the drive bars therefor so that actuation of any key bar will cause the striking bail to actuate the automatic blot-out type bar, measuring means associated with the drive bars for measuring the amount of space a character produced by an actuated type bar will occupy in regular line printing, an indicator for indicating said measurements and means operable by the removing of the actuating means out of the path of the drive bars for reversing the direction of travel of the indicating means to subtract the measurement of the blotted out characters from the total of measurement for a line.

49. In a typewriter having type bars and a carriage provided with a rotatable platen for holding a sheet, means for returning the carriage to starting position, means for automatically printing a character in the first space in the line already written and moving the platen to a new line, means automatically operable upon the return of the carriage to starting position for moving the carriage one space and moving the sheet to new line position when no printing operation is carried out in the space in advance of the previously written line.

50. Means for preparing a control sheet for controlling the actuation of character reproducing machines comprising a typewriter having a carriage and means for returning the same, a plurality of independently operable type bars for writing lines on the control sheet, means for measuring the amount of space the characters will occupy in regular line printing and means controlled by the measuring means for automatically printing an extra space code character at the beginning of a line already written when the carriage is returned if the space bands indicated in the line and their expansibility will not fill the line to proper length.

51. A machine for preparing a control sheet for character reproducing machines comprising means for placing a line of control characters on said sheet, means for measuring the space the characters in a line will occupy in regular line printing, means for blotting out one or more characters in a line, and means for subtracting the measurement of the blotted out character or characters from said measuring means.

52. A typewriter having means for measuring the space actuated characters will occupy in regular line printing, means for cancelling an actuated character, and means for subtracting the measurement of a cancelled character from said measuring means.

53. Means for producing a line of characters, means for measuring the space the characters in a line will occupy in regular line printing, means for cancelling a character, and means for subtracting the measurement of a cancelled character from said measuring means.

54. Means for producing a line of characters, means for measuring the space the characters in a line will occupy in regular line printing, means for cancelling a character, and means operable by a cancelling operation for subtracting the measurement of a cancelled character from said measuring means.

55. A typewriter having type bars and means for actuating the same, means for measuring the space the character actuated will occupy in regular line printing, means for indicating said measurements, means for cancelling characters already printed and means for subtracting the measurements of the cancelled characters from the indicator.

56. A typewriter having type bars and means for actuating the type bars, means for measuring the space the actuated characters will occupy in regular line printing, means for indicating the total amount of space the actuated characters will occupy in regular line printing, means for cancelling actuated characters and at the same time reversing the indicator to subtract therefrom the measurements of the cancelled characters.

57. Means for preparing a control record for actuation of linecasting machines and the like comprising a plurality of members and means for selectively actuating said members for preparing the control record, means for measuring the space the characters appearing on the control record will occupy in regular line printing, means for indicating said measurement, means for cancelling characters appearing on the control record and means for subtracting the measurements of the cancelled characters from the indicator.

BUFORD L. GREEN.